US012731302B2

(12) United States Patent
Day

(10) Patent No.: US 12,731,302 B2
(45) Date of Patent: Sep. 8, 2026

(54) RAPID RENDERING AND/OR REALISTIC VISUALIZATION OF APPAREL DESIGN DRAFT FILES THROUGH APPLICATION OF ONE OR MORE GENERATIVE ARTIFICIAL NEURAL NETWORKS

(71) Applicant: Eric Michael Day, Inglewood, CA (US)

(72) Inventor: Eric Michael Day, Inglewood, CA (US)

(73) Assignee: Eric Michael Day

( * ) Notice: Subject to any disclaimer, the term of this patent is extended or adjusted under 35 U.S.C. 154(b) by 59 days.

(21) Appl. No.: 18/594,373

(22) Filed: Mar. 4, 2024

(65) Prior Publication Data

US 2025/0278876 A1 Sep. 4, 2025

(51) Int. Cl.

*G06T 7/12* (2017.01)
*G06T 7/50* (2017.01)
*G06T 11/10* (2026.01)
*G06T 11/60* (2006.01)

(52) U.S. Cl.

CPC ................ *G06T 11/60* (2013.01); *G06T 7/12* (2017.01); *G06T 7/50* (2017.01); *G06T 11/10* (2026.01); *G06T 2200/24* (2013.01); *G06T 2207/20081* (2013.01); *G06T 2207/20084* (2013.01); *G06T 2210/16* (2013.01)

(58) Field of Classification Search

CPC .......... G06F 3/012; G06T 13/40; H04L 51/04
USPC .......................................................... 345/589
See application file for complete search history.

(56) References Cited

U.S. PATENT DOCUMENTS

| | | | | |
|---|---|---|---|---|
| 2017/0347043 | A1 * | 11/2017 | Rephaeli | H04N 25/60 |
| 2022/0051479 | A1 * | 2/2022 | Agarwal | G06N 3/045 |
| 2023/0162481 | A1 * | 5/2023 | Yuan | G06T 9/00 382/159 |
| 2024/0135514 | A1 * | 4/2024 | Pakhomov | G06T 7/11 |
| 2025/0166237 | A1 * | 5/2025 | Zeng | G06T 7/70 |

* cited by examiner

*Primary Examiner* — Samantha (Yuehan) Wang
(74) *Attorney, Agent, or Firm* — Peter Jensen-Haxel

(57) ABSTRACT

Disclosed is a method, a device, and/or a system of rapid rendering and/or realistic visualization of apparel design draft files through application of one or more generative artificial neural networks. In one embodiment, a system includes a coordination server, a generative server, and a network. A draft receipt agent receives a draft file including a sketch of an apparel item. The description module receives a text description of attribute(s) of the apparel item. A generative model selection routine selects a generative image model configured to generate an output image constrained by the draft file and latent representations of a text-image relation model. The model parameterization subroutine selects the text-image relation model and parameterizes the generative image model. A generative model execution engine generates a first rendering file including modified by the text description to allow for rapid visualization, prototyping, and/or construction of the one or more apparel items.

20 Claims, 29 Drawing Sheets

Draft File
102

Design Visualization Process Flow 750

Rendering File 104A

Line Map File
(hard edge map)
632B

Color Map File
636

Rendering File
104B

Graph Data Structure 2108B

Rendering File 104

Draft File 102

Draft File
102

Rendering File 104B

RAPID RENDERING AND/OR REALISTIC VISUALIZATION OF APPAREL DESIGN DRAFT FILES THROUGH APPLICATION OF ONE OR MORE GENERATIVE ARTIFICIAL NEURAL NETWORKS

FIELD OF TECHNOLOGY

This disclosure relates generally to data processing devices and, more particularly, to a method, a device, and/or a system of rapid rendering and/or realistic visualization of apparel design draft files through application of one or more generative artificial neural networks.

BACKGROUND

Apparel is traditionally conceived and designed by an apparel designer. The designer may initially imagine an apparel item, or a set of apparel (also referred to as an "apparel line"), consisting of two or more items that may share similar aesthetics, design goals, or other attributes. For example, the apparel item might be a shirt, pants, overgarments such as jackets, undergarments such as underwear or bras, socks, scarves, bathing suits, and many other wearable items. The apparel line may include a themed collection, a seasonal collection, and/or a set of matching apparel to be worn by one or more persons, possibly intended to be together. The designer may sketch or otherwise draw drafts of the apparel item and/or apparel line to develop an initial concept from which patterns and prototypes can be developed.

Following this conceptual phase, numerous challenges may arise in realizing the finished product. The designer may have to convince a clothing manufacturer that the apparel item and/or apparel line is likely to sell and can be reasonably prototypes and manufactured. Typically, the designer may hire one or more persons to produce example apparel items, or a prototype of the entire proposed line. Often, prototypes are advantageous or even required just so that the apparel can be photographed so that it can be visualized by the fashion brand or potential apparel distributor. This process can be expensive and time consuming, sometimes costing thousands (or tens of thousands) of dollars and taking months of time. During this time, fashion trends or other factors (e.g., material availability) affecting the apparel line may change. The process also may cause iteration or modification to be difficult and/or expensive, lowering innovation and increase the risk of trying bold ideas.

A related problem may arise in the designer use of certain styles, designs, trade dress, or intellectual property assets of an apparel or fashion brand. For example, a fashion brand may have unique materials, textures (e.g., the Louis Vuitton patterning), preexisting apparel lines or design libraries with which visual consistency (or contrast) is encouraged or required, etc. Some of these assets may be carefully guarded secrets or copyrighted raw digital files (especially for unreleased designs which could be stolen, counterfeited, or released into the market early). The fashion brand owner may have difficulty authorizing and controlling these assets.

Artificial intelligence (AI) models have provided a potential avenue for visualization of certain products. However, AI systems may be difficult to predict or control. For example, it may be challenging to organize and formulate inputs, parameters, and outputs to efficiently utilize the AI models, especially given the potentially heavy use of computing resources that can result in expensive computational costs and long model runtimes. As just one example, it can be difficult to slowly or selectively vary outputs to achieve desired results.

There is a continuing need for new systems, devices, and methods for designers to rapidly visualize and iterate their designs so that products can be rapidly tested, manufactured, and eventually brought to market.

SUMMARY

Disclosed are a method, a device, and/or a system of rapid rendering and/or realistic visualization of apparel design draft files through application of one or more generative artificial neural networks.

In one embodiment, a method for rapidly digitally rendering apparel a draft apparel design includes receiving a draft file of a first image including a sketch of one or more apparel items and receiving a text description including a description of the one or more apparel items. The text description that includes a positive description of one or more attributes to be present in the one or more apparel items and a negative description of one or more attributes to be excluded from the one or more apparel items. The method selects a text-image relation model configured to relate the text description to one or more latent representations of the text-image relation model and selects a generative image model configured to generate an output image constrained by both the first image of the one or more apparel items and a first set of latent representations that includes at least one of the one or more latent representations of the text-image relation model.

The method parameterizes the generative image model with a set of model parameters including (i) a convolution step value, (ii) a constraint divergence value, (iii) a quality value of the output image; (iv) a size value of the output image; (v) a generative seed, (vi) a sampler model, and (vii) a decoding algorithm, and/or (viii) a denoise algorithm. The first set of latent representations is output from the text-image relation model.

The method inputs into the generative image model a set of inputs of the generative image model that include (i) the draft file including the first image of the one or more apparel items, (ii) the first set of latent representations of the text-image relation model, and (iii) the set of model parameters. The method then generates a first rendering file that includes a second image of the one or more apparel items modified by the text description to allow for rapid visualization, prototyping, and/or construction of the one or more apparel items.

The method may further generate a second set of model parameters. The second set of model parameters differs from the set of model parameters in the constraint divergence value, the generative seed, the text description, the positive description, the negative description, and/or the sampler model. The method may generate a second set of latent representations of the one or more latent representations of the text-image relation model that may be based on reduced constraint in the of the text-image relation model. The method may also generate an alternative rendering file that may include a third image of the one or more apparel items. The method may transmit the rendering file and the alternative rendering file to a user, receive a preference selection from the user for the alternative rendering file, and store the second set of model parameters and optionally locking the generative seed.

The method may also include a generating a graph data structure. The graph data structure may include a model selection node that includes attributes and associated values specifying a directed edge from the model selection node to an image generation model node, a directed edge from the model selection node to a text-image relation node, and a directed edge from the model selection node to a decoding algorithm node. The graph data structure may also include the text-image relation node that includes attributes and associated values specifying a directed edge from the model selection node to the image generation model node and storing (i) the positive description of the one or more apparel items and a directed edge to the generative image model, and/or (ii) the negative description of the one or more apparel items. The graph data structure may include a base parameterization node that includes attributes and associated values storing the size value of the output image and a directed edge from the base parameterization node to the image generation model node and/or from the image generation model node to the base parameterization node. The graph data structure may further include the image generation model node, including attributes and values storing the set of model parameters and a directed edge from the image generation model node to the decoding algorithm node.

The method may also input the draft file and the first rendering file into a computer vision model trained with a first set of training images including data distinguishing apparel items. Generation of a segmentation file including one or more boundary designations of the one or more apparel items may also be included in the method, as can be receiving a selection of a boundary designation of the one or more boundary designations of the one or more apparel items to select an apparel item bounded by the boundary designation. A new text description including a description of the apparel item bounded by the boundary designation can be received, and a second set of latent representations from the text-image relation model and/or a different text-image relation model based on the new text description can be output. The method may then input into the generative image model at least a portion of the first rendering file within the boundary designation, the second set of latent representations of the text-image relation model, and a different set of model parameters, and generate a second rendering file re-rendering the apparel item bounded by the boundary designation.

The computer vision model may be further trained with a second set of training images that includes data designating apparel elements of apparel items. The method may include generating a second segmentation that include a second set of one or more boundary designations of one or more apparel elements of each of the one or more apparel items. The segmentation file further may further include one or more boundary designations of the one or more material elements. A selection of a different boundary designation of one or more boundary designations of the one or more material elements may be received, and a material value associated with an apparel material selected. At least one of the following may be loaded: (i) a different text description that may include a description of the apparel material, (ii) a third set of latent representations based on the text description of the apparel material that is output from the text-image relation model and/or the different text-image relation model, and/or (iii) one or more material images of a material image library. The method may then generate a third rendering file re-rendering the apparel material bounded by the different boundary designation.

The method may include inputting the draft file and/or the first rendering file into a computer vision model trained with a set of training images that include data designating a material value associated with an apparel item and/or an apparel element. The method may also include authenticating a generative user and/or a device of the generative user, and determining the generative user is authorized to access at least one of the following: (i) two or more image files each including one or more apparel elements; (ii) the text description of the one or more apparel items; and/or (iii) an adaptation tuning model including a model trained on the two or more image files each including the one or more apparel elements. Inputs to the generative image model may further include the adaptation tuning model.

The method may still further include inputting the draft file into a linage mapping model outputting a line map file of at least one of the material-material boundaries of the one or more apparel items, material-skin transition boundaries, and material-background boundaries of the one or more apparel items. The draft file may be input into a depth mapping model outputting a depth map file designating a perceived depth of (i) a first apparel item of the one or more apparel items relative to a second apparel item of the one or more apparel items; and/or (ii) a first material of the one or more apparel items relative to a second material of the one or more apparel items. The draft file may also be input into a color mapping model outputting a color map file designating a color of (i) the first apparel item relative to the second apparel item; and/or (ii) the first material relative to the second material. The set of inputs of the generative image model further include the line map file, the depth map file, and/or the color map file.

In another embodiment, a device for rapid apparel prototyping and design visualization includes a computer including a processor and a memory. A draft receipt agent includes computer readable instructions that when executed receive a draft file of a first image that includes a sketch of one or more apparel items. A description module of the device includes computer readable instructions that when executed receive a text description that include a description of the one or more apparel items. The text description includes a positive description of one or more attributes to be present in the one or more apparel items and a negative description of one or more attributes to be excluded from the one or more apparel items. The device includes a generative model selection routine that includes computer readable instructions that when executed select generative image model configured to generate an output image constrained by both the first image of the one or more apparel items and a first set of latent representations that includes one or more latent representations of a text-image relation model. A model parameterization subroutine of the device includes computer readable instructions that when executed select the text-image relation model configured to relate the text description to the one or more latent representations of the text-image relation model, and parameterize the generative image model with a set of model parameters. The set of parameters include (i) a convolution step value, (ii) a constraint divergence value, (iii) a quality value of the output image; (iv) a size value of the output image; (v) a generative seed, (vi) a sampler model, (vii) a decoding algorithm, and/or (viii) a denoise algorithm.

The device further includes a latent image storage routine that includes computer readable instructions that when executed store the first set of latent representations from the text-image relation model. The device also includes a generative model execution engine that includes computer readable instructions that when executed input into the generative image model a set of inputs of the generative image model that include (i) the draft file including the first image of the one or more apparel items, (ii) the first set of latent representations of the text-image relation model, and (iii) the set of model parameters. The device also includes a generative model execution engine that includes computer readable instructions that when executed generate a first rendering file that includes a second image of the one or more apparel items modified by the text description to allow for rapid visualization, prototyping, and/or construction of the one or more apparel items.

In yet another embodiment, a system for rapid apparel prototyping and design visualization, the includes a coordination server, a generative server, and a network communicatively coupling the coordination server and the generative server. The coordination server includes a processor of the coordination server, a memory of the coordination server, a draft receipt agent, a description module, a generative model selection routine, and a model parameterization subroutine. The draft receipt agent includes computer readable instructions that when executed receive a draft file of a first image including a sketch of one or more apparel items. The description module includes computer readable instructions that when executed receive a text description that may include a description of the one or more apparel items. The text description may include a positive description of one or more attributes to be present in the one or more apparel items and a negative description of one or more attributes to be excluded from the one or more apparel items. A generative model selection routine includes computer readable instructions that when executed select generative image model configured to generate an output image constrained by both the first image of the one or more apparel items and a first set of latent representations that include at least one of the one or more latent representations of a text-image relation model. The model parameterization subroutine includes computer readable instructions that when executed: (i) select the text-image relation model configured to relate the text description to the one or more latent representations of the text-image relation model, and (ii) parameterize the generative image model with a set of model parameters. The set of model parameters includes (i) a convolution step value, (ii) a constraint divergence value, (iii) a quality value of the output image; (iv) a size value of the output image; (v) a generative seed, (vi) a sampler model, (vii) a decoding algorithm, and/or. (viii) a denoise algorithm.

The generative server includes a processor of the generative server, a memory of the generative server, a latent image storage routine, and a generative model execution engine. The latent image storage routine includes computer readable instructions that when executed store the first set of latent representations from the text-image relation model. The generative model execution engine includes computer readable instructions that when executed input into the generative image model a set of inputs of the generative image model that include (i) the draft file including the first image of the one or more apparel items, (ii) the first set of latent representations of the text-image relation model, and/or (iii) the set of model parameters. The generative model execution engine also includes computer readable instructions that when executed generate a first rendering file including a second image of the one or more apparel items modified by the text description to allow for rapid visualization, prototyping, and/or construction of the one or more apparel items. The system may further include an authorization server and a fractionation server.

BRIEF DESCRIPTION OF THE DRAWINGS

The embodiments of this disclosure are illustrated by way of example and not limitation in the figures of the accompanying drawings, in which like references indicate similar elements and in which:

FIG. 1A further illustrates a generative structuring engine enabling repeatable and controllable results from a generative image model and the text-image relation model, along with a model specialization control routine that may selectively authorize one or more controlled libraries such as available materials or proprietary patterns, according to one or more embodiments.

Other features of the present embodiments will be apparent from the accompanying drawings and from the detailed description that follows.

DETAILED DESCRIPTION

Disclosed are a method, a device, and/or system of rapid rendering and/or realistic visualization of apparel design draft files through application of one or more generative artificial neural networks. Although the present embodiments have been described with reference to specific example embodiments, it will be evident that various modifications and changes may be made to these embodiments without departing from the broader spirit and scope of the various embodiments.

Figure 1A:
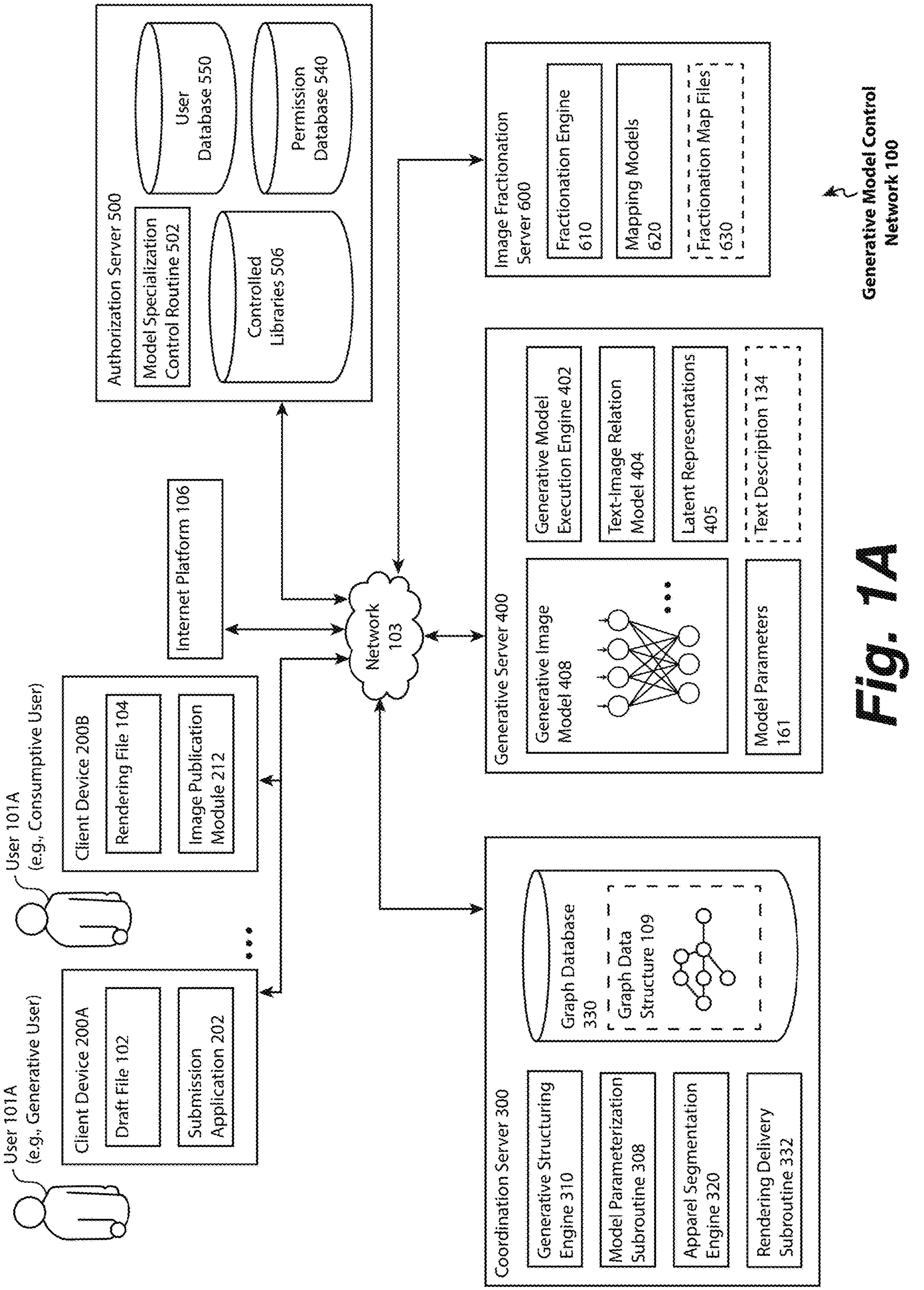
FIG. 1A illustrates a generative model control network in which one or more servers may receive a draft file from a user which may include an apparel design and utilize a generative execution engine, a text-image relation model, and/or a fractionation engine to rapidly convert the draft file into a rendering file for visualization and prototyping, according to one or more embodiments.

FIG. 1A illustrates a generative model control network 100, according to one or more embodiments. The generative model control network 100 may include one or more client devices 200 (which may be associated with one or more users 101), a coordination server 300, a generative server 400, an authorization server 500, a fractionation server 600, and/or an internet platform 106, each of which may be connected through a network 103.

In one or more embodiments, the user 101 may be an apparel designer, clothing designer, and/or wearable accessory designer that may sketch, draw, digitally design, and/or produce concept art for clothing designs. The user 101 may generate a draft file 102, for example a scan of a hand-drawn sketch, a digital sketch drawn in vector format, a digital sketch in raster format, and/or another form of digitized sketch of apparel and/or clothing. Examples of the draft file 102 are shown and described in conjunction with the embodiment of FIG. 13, FIG. 22, and FIG. 24. In one or more embodiments, the draft file 102 may include a first image that includes a sketch of one or more apparel items. The user 101 may use the submission application 202 on the client device 200 to submit the draft file 102 through the network 103 to one or more servers running. The client device 200 may be, for example, a desktop computer, a tablet device, a smartphone, and/or a server computer.

In one or more embodiments, the coordination server 300 may receive the draft file 102 and initialize a generative rendering project and/or session for the submission. In one or more embodiments, and as more particularly shown and described in conjunction with the embodiment of FIG. 1B and FIG. 3, a generative structuring engine 310 may initiate definition and storage of a graph data structure 109 within a graph database 330. The graph data structure 109 may be utilized to describe a repeatable, controlled, and/or iterative rendering process for the draft file 102, according to one or more embodiments.

In one or more embodiments, a model parameterization subroutine 308 may gather parameters from the user 101 and/or the client device 200, for example model parameters 161. The model parameterization subroutine 308 may gather and define the model parameters 161 for structuring and storage in the graph data structure 109 and/or to input into generative models. In one or more embodiments, a text description 134 also may be received from the client device 200 and/or the coordination server 300. The model parameters 161 and/or the text description 134 may be utilized by a generative image model 408, and potentially iteratively varied, as further shown and described throughout the present embodiments.

The draft file 102 and/or a resulting rendering file 104 also may be parsed and/or analyzed for selective generative rendering. In one or more embodiments, the coordination server 300 may further include an apparel segmentation engine 320 which may be utilized to identify and/or segment apparel items (e.g., shirts, pants, scarfs, hats, socks, shoes), apparel elements (e.g., collar, chest, sleeve, pocket, placket cover, button), and/or apparel materials (cloth, felted wool, leather, sequins, hounds' tooth weave, twill weave, etc.). Each of these apparel items, apparel elements, and/or apparel materials may be segmented for potential selective rendering to control the generative image model 408, adjust the rendering file 104, and/or generate alternative versions of the rendering file 104.

Following sufficient parameterization, the rendering file 104 may be generatively constructed. The draft file 102, the model parameters 161, any text description 134, and/or other model input data may be transmitted through the network 103 to the generative server 400. A text-image relation model 404 may utilize the text description 134 to generate the latent representations 405, which also may be used as inputs to the generative image model 408. A generative model execution engine 402 may be utilized to provide all necessary inputs to one or more selected instances of the generative image model 408, including for example the draft file 102, the latent representations 405, and/or the model parameters 161. In one or more embodiments, each input may be received from a remote procedure call to or from the model parameterization subroutine 308 and/or queried from the graph data structure 109 and/or files or data referenced therein.

The generative image model 408 may include an artificial neural network capable of image generation. In one or more embodiments, the generative image model 408 may include Stable Diffusion v1-5 or StableDiffusion XL. The generative image model 408 is further shown and described in conjunction with the embodiment of FIG. 4, and throughout the present embodiments.

The generative image model 408 may output the rendering file 104. In one or more embodiments, the rendering file 104 may be a photorealistic rendering, a stylized rendering, and/or an enhanced concept art. Examples of the draft file 102 are shown and described in conjunction with the embodiment of FIG. 13, FIG. 22 and FIG. 24. A rendering delivery subroutine 332 (e.g., of the coordination server 300) may transmit the rendering file 104 for preview, review, selection for further modification, and/or deliver final raw image files for the rendering file 104.

The user 101 may review the rendering file 104, may save the rendering file 104 to a local memory and/or remote storage location, and/or optionally perform one or more additional actions. The user 101 may, for example, resubmit the draft file 102 under a new request with modified or alternative parameters, may select a segment of the rendering file 104 to be re-rendered, and/or may perform other editing or iterative actions. Alternative parameters and/or re-generative segments may be added to the graph data structure 109, for example as shown and described in conjunction with the embodiment of FIG. 1B.

In one or more embodiments, some or all input data used in generating the rendering file 104, including libraries of images, latent images, text descriptions, parameters, and/or other input data may be stored and/or logged within the graph data structure 109. In one or more embodiments, the graph data structure 109 and logged data therein may help a designer to document intellectual property ownership, creative contribution, comparative control, copyrightability, and/or sufficient creative contribution for copyrightability when utilizing AI tools.

However, one or more libraries may be controlled, confidential, trade secret, and/or proprietary data. In one or more embodiments, the generative model control network 100 may include an authorization server 500 comprising a model specialization control engine 502. The model specialization control engine 502 may authorize the user 101 and/or the client device 200 of the user 101 to utilize one or more libraries. Authorization may occur through authentication of the user 101 and/or the client device 200 within a user database 550 and/or authorization against records in a permission database 540. In one or more embodiments, the controlled libraries 506 may include a material image library 510 that may include images and/or latent representations of particular materials, textures, and/or fashion patterns for rendering, a text description library 520 comprising one or more text descriptions 134 (which may be confidential, for example because some instances of the generative image model 408 have a strong influence on the quality of the outcome), and/or a tuning model library 530 comprising one or more adaptation tuning models which may be applied before, during, or after the generative image model 408. The text description library 520 may store carefully engineered prompts (e.g., developed via "prompt engineering") to be used within the text description 134. As further shown and described herein, the controlled libraries 506 may enable designers, such as the user 101, to license or "borrow" proprietary generative data assets from an owner of the assets, for example a fashion brand, possibly without compromising the disclosing those assets to the user 101. It may also allow for individual tracking of the effect of the controlled libraries on the output, enabling the user 101 to distinguish the core of their design in the draft file 102 from other "creative" contributions and further reinforce copyrightability of the rendering within the rendering file 104.

In one or more embodiments, the draft file 102 (and/or the rendering file 104) may be fractionated into constituent components and/or mapped for certain features that can increase control and quality of the rendering file 104. For example, the draft file 102 may have one or more image recognition models applied to extracts patterns, linage, coloration, depth (e.g., perceived three-dimensional depth of a two-dimensional image), and/or other graphical attributes or qualities. In one or more embodiment, a fractionation server 600 may initially receive the draft file 102 from the client device 200 and/or the coordination server 300. A fractionation engine 610 may apply one or more mapping models 620 to result in one of more fractionation map files 630. The fractionation map file 630, along with parameters for generation of the fractionation map files 630, may be stored in the graph data structure 109. The fractionation map files 630 may be returned to the coordination server 300 and/or the generative server 400 for use in the generative image model 408, which may further enhance the accuracy of the rendering file 104, quality of the rendering file 104, and/or overall adherence to an artistic and/or stylistic intent of the user 101.

In one or more embodiments, there may be multiple users 101 and/or client devices 200. For example, in the embodiment of FIG. 1A, a user 101A utilizing a client device 200A may act as a generative user who may submit the draft file 102, while a user 101B utilizing a client device 200B may act as a consumptive user. For instance, the user 101B may review the rendering file 104 and determine that the rendering file 104 should be published to the internet platform 106, for example through the image publication module 212. In one or more embodiments, each of one or more users 101 may make creative contributions and/or assist in parameterization or iteration of the rendering. For example, the user 101A may submit the initial instance of the draft file 102, whereas the user 101B may select segmentations for further re-rendering and/or generation of alternative instances of the rendering file 104.

The rendering file 104 may be optionally uploaded to the internet platform 106. The internet platform 106 may include, for example, a social media platform, an ecommerce platform, or another website or web application that may receive and utilize the rendering file 104. For example, in one or more embodiments the rendering file 104 can be automatically uploaded to an e-commerce site or crowdfunding site to test interest, market demand, potential pricing, and/or gather additional feedback. The internet platform 106 may be available through an API.

The user 101 may be a person or, in one or more embodiments, a machine-user such as another computer or computing system. The network 103 may include one or more network, for example a wide area network (WAN), a local area network (LAN), a virtual private network (VPN) operating one or more hardware networks, and/or the internet.

The draft file 102 may include a sketch, a design, and/or a concept art. The draft file 102 may be in a file format such as .ai (e.g., Adobe® Illustrator), .psd (e.g., a Photoshop file), .jpg, .png, .pdf, .tiff, .jpeg. In one or more embodiments, the draft file 102 may be automatically converted into one or more different file formats prior to being utilizing by the generative image model 408 and/or other processes of one or more of the present embodiments.

Figure 1B:
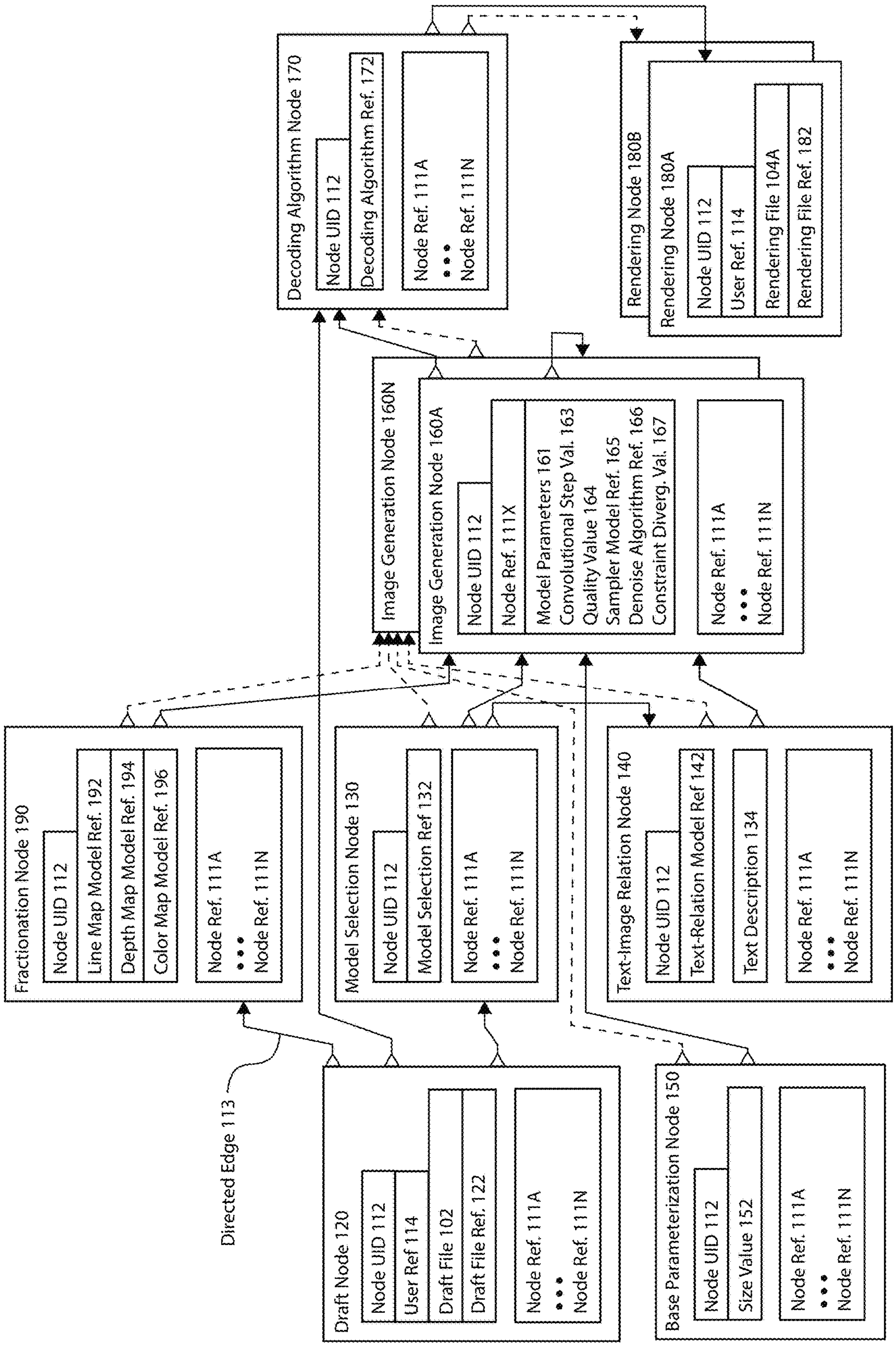
FIG. 1B illustrates a graph data structure including a set of nodes connected through directed edges, the graph data structure defining a storable, editable, and easily tracked dataset usable to predict, control, and iterate the conversion of one or more draft files into one or more rendering file, according to one or more embodiments.

FIG. 1B illustrates a graph data structure 109, according to one or more embodiments. The graph data structure 109 may be used to store the parametrization of the rendering, track creative contribution of one or more users 101, track iteration and/or alternative versions of the rendering, and/or log utilization of controlled libraries 506, according to one or more embodiments. The graph data structure may comprise a plurality of the nodes 110, each connected to at least one or node 110 through a directed edge 113. Each directed edge 113 may be effected through a reference (abbreviated "node ref" herein) from one instance of the node 110 to another instance of the node 110. In one or more embodiments, a graph data structure 109 may be generated for each generative session of the user 101 (and/or a previous graph data structure 109 may be queried and/or loaded). In one or more embodiments, the graph data structure may be a directed acyclic graph.

Each of the nodes 110 may include a node UID 112 which may be an attribute storing a value that is a unique identifier and/or globally unique identifier usable to address the node 110 with a query and/or reference the node 110 through a directed edge 113 or other pointer. Each node 110 may also include a user reference 114 which may include an attribute storing a unique identifier of a user profile (e.g., the user profile 559 of FIG. 5). Each of the nodes may further include one or more node references 111 (e.g., the node reference 111A through the node reference 111N) which may reference one or more additional instances of the node 110. The graph data structure 109 may be implemented with one or more commercial database application, including for example a database application designed for native use in storing graph data structures (e.g., Aerospike®, GraphDB®, etc.). However, in one or more embodiments, the graph data structure 109 may be implemented through traditional commercial databases, including SQL databases, relational databases, and/or through NoSQL databases such as document databases (e.g., MongoDB®), columnar databases (e.g., Cassandra®), etc.

In one or more embodiments, the graph data structure 109 may include a draft node 120 describing, storing, and/or referencing the draft file 102. The draft node 120 may directly store the draft file 102, and/or may reference the draft file 102 through the draft file reference 122. The draft node 120 may further include a session UID, session data, a timestamp, and/or additional data. The draft node 120 may reference (e.g., through a node reference 111 implementing a directed edge 113) a model selection node 130, a fractionation node 190, and/or a decoding algorithm node 170.

In one or more other embodiments, a session node (not shown) may act as a root of the graph data structure 109, and may reference both the draft node 120 and/or the base parameterization node 150). In such case, the session node may include a session UID, session data, a timestamp, and/or additional data.

The model selection node 130 may include one or more model selection references 132 specifying one or more generative image models 408. The model selection node 130 may reference, through a directed edge 113, the image generation node 160. Specifically, in the embodiment of FIG. 1B, and one or more other embodiments, two instances of the image generation node 160 are illustrated, the image generation node 160A and the image generation node 160B, as further described below. The model selection node 130 may reference one or both, where the broken line indicates a possible directed edges 113 drawn to, and drawn from, the image generation node 160B.

In one or more embodiments, the graph data structure 109 may include one or more text-image relation nodes 140. The text-image relation node 140 may include one or more model selection references 142 specifying one or more text-image relation models 404. The text-image relation node 140 may further include the text description 134, including optionally a positive description 136 and/or a negative description 138, as further shown and described herein. The text description 134 may be input into the specified text-image relation models 404. Optionally, output of the text-image relation models 404 may be stored in association with the text-image relation node 140 to save computing resources of re-running the text-image relation model 404. The text-image relation node 140 may draw a directed edge 113 to the image generation node 160 (including to either or both of the generation node 160A and the generation node 160B). In one or more alternative embodiments, there may be multiple instances of the text-image relation node 140 for a single render (e.g., a text-image relation node 140.1, a text image relation node 140.2), each with a portion of the text description (e.g., one for the positive description 136, and one for the negative description 138).

In one or more embodiments, the graph data structure 109 may include a base parameterization node 150. The base parameterization node 150 may include a size value 152 specifying a default size of a "canvas" and/or "latent image" (not to be confused with the latent representations 405 and/or latent images of the controlled libraries 506) upon which the generative image model 408 may begin building the rendering file 104. As known in the art of artificial intelligence engineering, the size value 152 may dictate the graphical resolution and/or image size (e.g., in pixels) of the rendering file 104, and may impact the rendering time and computational resources required to generate the rendering file 104. The base parameterization node 150 may reference the image generation node 160A and/or the image generation node 160B.

The image generation node 160 may include a set of model parameters 161 usable for one or more generative models that will be employed to generate the rendering file 104. The model parameters 161 may include, for example, a convolutional step value 163, a quality value 164, a sampler model reference 165, a denoise algorithm reference 166, and additional parameters, each of which are shown and described in conjunction with the embodiment of FIG. 4. The image generation node 160 may reference the decoding algorithm node 170.

The image generation node 160 is also shown in FIG. 1B as having two versions: a "primary" version which may represent a first rendering (e.g., the image generation node 160A), and an alternate version, the image generation node 160B. Specifically, the image generation model 160B may have selected one or more different model parameters 161, such as a different number of convolutional steps and/or a different denoise algorithm. The image generation node 160A may reference the image generation node 160B, for example through the node reference 111X. An arbitrary number of instances of a node 110 may be defined representing varied and/or iterative design for the session (e.g., five, one hundred, or one thousand alternative versions).

Although the image generation node 160 has been used as an illustration, it will be recognized for one skilled in the art of computer science and/or software engineering that any of the nodes 110 illustrated in FIG. 1B, or other instances of nodes 110 described herein, may have an arbitrary number of alternative versions. For example, alternate use of fractionation files that were each generated by different algorithms. Each rendering request made by the user 101 for the same draft file 102 may result in generation of new nodes 110, logging changes and providing for repeatable, "non-destructive" editing. Outputs for each step may be saved such as to save computing resources so models don't need to be re-run unless explicitly instructed.

The decoding algorithm node 170 may include a decoding algorithm reference 172 specifying a decoding algorithm, and reference the rendering node 180. The rendering node 180 may include the rendering file 104, a rendering file reference 182 to the rendering file 104, and/or a user reference 114 (e.g., a "owner" of the resulting rendering file 104). In one or more embodiments, an iterative or alternative version of a node 110 (e.g., varying the model parameters 161 in the image generation node 160B) may result in generation of a distinct instance of the rendering file 104 and therefore, optionally, the rendering node 180. For example, defining the image generation node 160B may result in generation of the rendering node 180B storing a rendering file 104B (for clarity of presentation, the rendering file 104B associated with the rendering node 180B has been omitted).

In one or more embodiments, optional fractionation may also be utilized and stored in the graph data structure 109. A fractionation node 190 may include a line map model reference 192 to an instance of the linage mapping model 622 to be employed, a depth map model reference 194 to a depth mapping model 624 to be employed, and/or a color map model reference 196 to a color mapping model 626 to be employed. In one or more embodiments, discrete instances of the fractionation node 190 (e.g., a fractionation node 190A, a fractionation node 190B, etc.) may be defined for each mapping model 620 to be employed. The fractionation node 190 may draw a directed edge 113 to the image generation node 160A and/or the image generation node 160B. Although the fractionation maps are shown for illustrate purposes, more, fewer, or different fractionation map files may be generated, stored, or referenced (e.g., a "soft" line map and a "hard" line map, a subject depth map and a background depth map, etc.).

Although not shown, additional instances of the node 110 may be included for loading controlled libraries 506. In such case, the node 110 specifying and/or referencing the controlled library 506 may be utilized to log access and document authorization for use. In one or more embodiments, metadata and/or watermarking of controlled libraries 506 may be integrated into the rendering node 180. The node 110 specifying and/or referencing the controlled library 506 may include a reference to a collection UID (e.g., the collection UID 507). In one or more embodiments, the node 110 specifying and/or referencing the controlled library 506 may be referenced by the draft node 120, and such node 110 may reference the image generation node 160.

Figure 2:
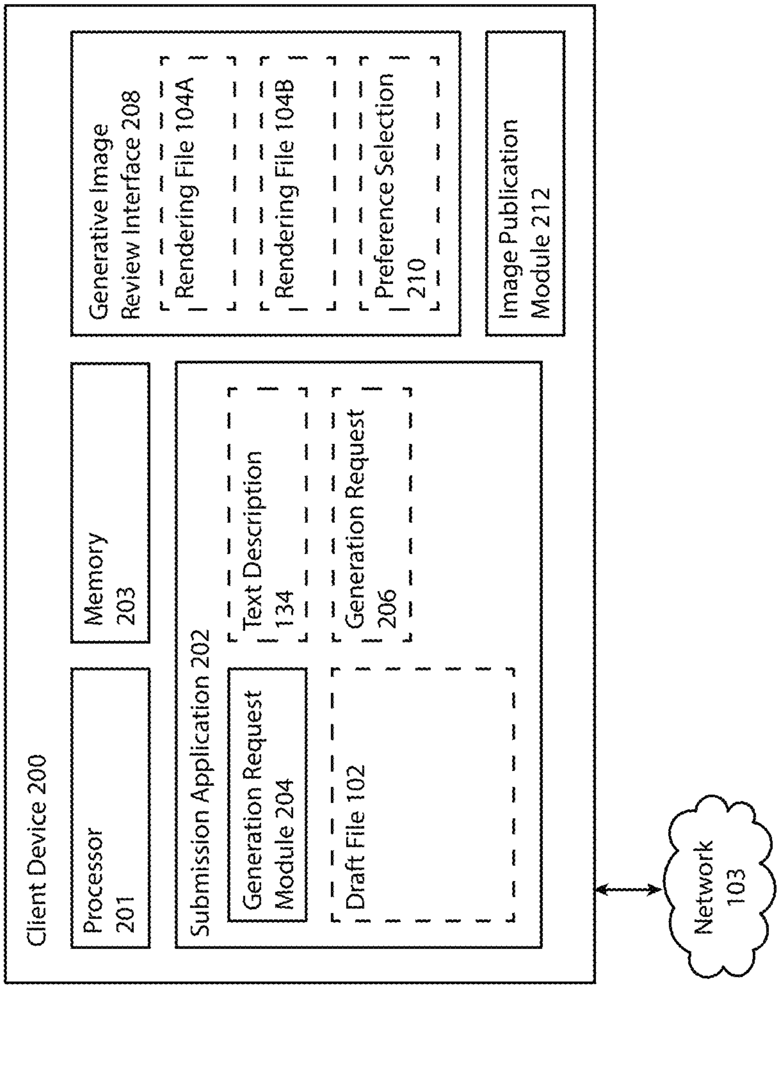
FIG. 2 illustrates a client device which may be used by a user to prepare and submit the draft file and/or review the rendering file, according to one or more embodiments.

FIG. 2 illustrates a client device 200, according to one or more embodiments. The client device 200 may, for example, include a personal computer (PC), a laptop computer, a server computer, a notebook computer, a tablet computer, and/or a smartphone. The client device 200 may include a processor 201 that may include one or more computer processors and/or central processing units (CPUs). The client device 200 may include a memory 203 that may include one or more readable memories (e.g., RAM, ROM, solid state memory, hard drive memory, etc.).

The client device 200 may include a submission application 202 for loading, viewing, formatting, and/or pre-processing the draft file 102, and then submitting the draft file 102 for rendering (e.g., over the network 103 to one or more servers of the generative model control network 100). The submission application 202 may include a generative request module 204 that may formulate a generation request 206 for generation of a rendering file 104 from the draft file 102. In one or more embodiments, the generation request 206 may include a user UID (e.g., the user UID 551) associated with the user 101 and/or the client device 200, the draft file 102 or an identifier of the draft file 102, one or more parameter selections (e.g., of the model parameters 161), one or more segmentation selections, and/or the text description 134. In one or more other embodiments, the generation request 206 may initially request creation of a generative session (or loading of a previous generative session, for example from the graph data structure 109), which may then receive additional inputs and parameters from the user 101. The draft file 102 may have been created or scanned by the client device 200, and/or may be referenced in a different computer, system, server, and/or database (e.g., a cloud storage system).

The client device 200 may also receive and view the rendering file 104. In one or more embodiments, a generative image review interface 208 may be utilized to review, edit, and/or select one or more aspects of the rendering file 104. For example, the user 101 may select, and/or the client device 200 may generate a selection for, one of a number of instances of the rendering file 104 (e.g., a rendering file 104A, a rendering file 104B, etc.). The rendering file 104A and the rendering file 104B, for example, may be renderings generated from the same draft file 102 utilizing differing parameters. The user 101 may generate the preference selection 210 for one of the two or more rendering files 104 to further refine, vary, iterate, and/or finally select the rendering file 104 for use. The client device 200 may include an image publication module 212, for example to publish the rendering file 104A or an image generated therefrom to the internet platform 106 or another local or remote network location, according to one or more embodiments.

Figure 3:
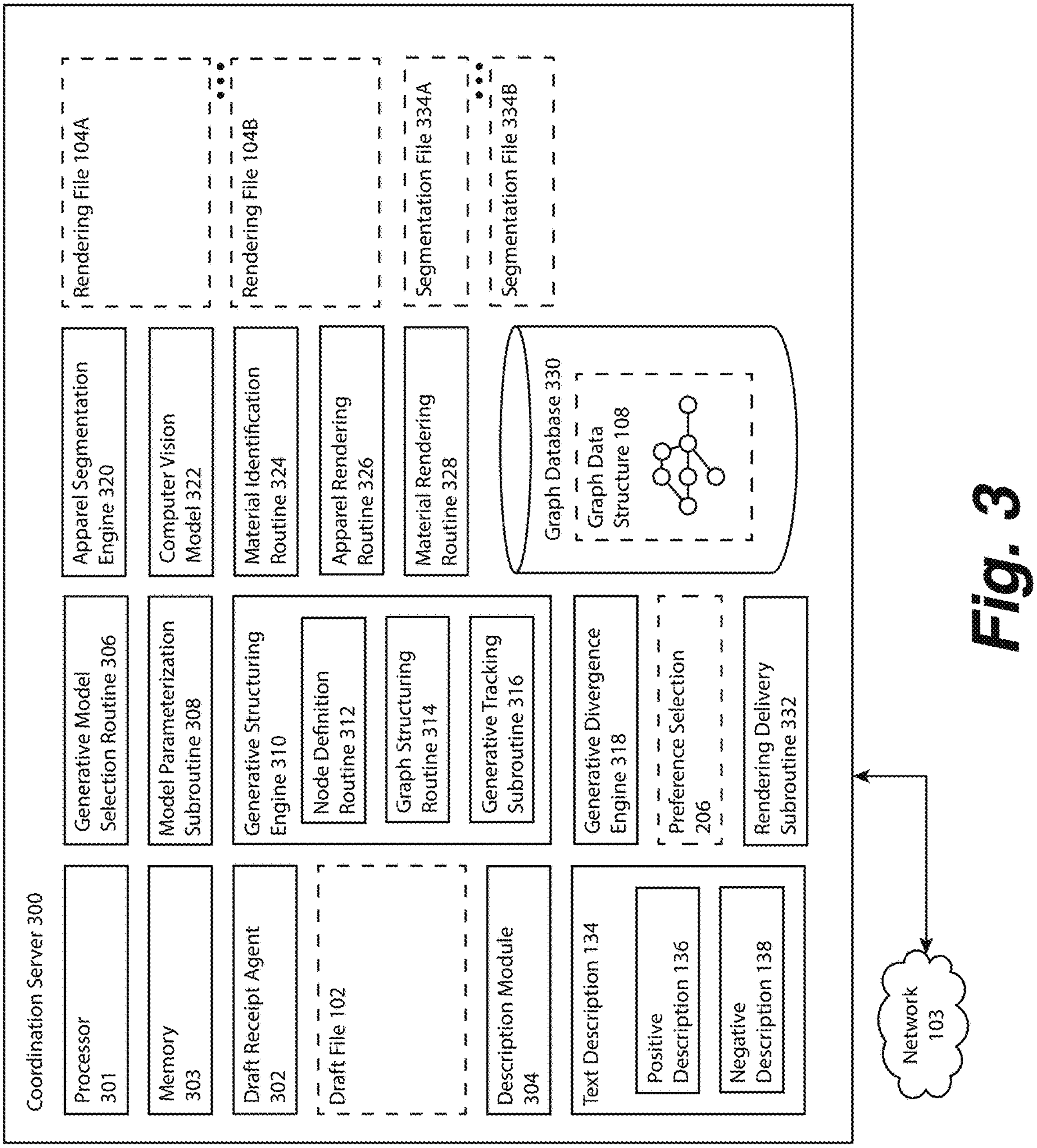
FIG. 3 illustrates a coordination server including a generative model selection routine for selecting the generative image model, a model parameterization subroutine for parameterizing the generative image model, a generative structuring engine for defining and storing the graph data structure of FIG. 1B, and many additional components, according to one or more embodiments.

FIG. 3 illustrates the coordination server 300, according to one or more embodiments. The coordination server 300 may, for example, include a server computer, but in one or more alternative embodiments may be a different computing device (e.g., a personal computer (PC), a laptop computer, a notebook computer, a tablet computer, and/or a smartphone). The coordination server 300 may include a processor 301 that may include one or more computer processors and/or central processing units (CPUs). The coordination server 300 may also include a memory 303 that may include one or more readable memories (e.g., RAM, ROM, solid state memory, hard drive memory, etc.).

The coordination server 300 may include a draft receipt agent 302. The draft receipt agent 302 may be configured to receive and process the generation request 206 and/or the draft file 102. In one or more embodiments, the draft receipt agent 302 may include computer readable instructions that when executed receive the draft file 102 of a first image that includes a sketch of one or more apparel items. The coordination server 300 may further include a description module 304. The description module 304 may be configured to receive a text description 134 from the user 101, query and retrieve a text description 134 (e.g., from the text description library 520), and/or otherwise generate a text description 134 usable as an input to the text-image relation model 404 and/or otherwise usable for the generative image model 408.

The text description 134 may include natural text prompts, keywords, descriptive words, style words, and other words describing attributes, style, qualities, and/or nature that the rendering file 104 should include or exclude. The text description 134 may be divided include a positive description 136 and/or a negative description 138. The positive description 136 may describe attributes, style, qualities, and/or nature that the rendering file 104 should include, whereas the negative description 138 may describe attributes, style, qualities, and/or nature that the rendering file 104 should exclude. For example, the text description 134 for a generative image of a new shirt might be: "brick-red shirt, satin, with blue hemmed short sleeves made of cotton, ". This generative image of this new shirt would, for example, would have a high likelihood of including a specific-colored red shirt having a satin sheen with blue hemmed short sleeves made of cotton. The text description 134 is further shown and described in conjunction with the text-image relation model 404 of FIG. 4 and the example embodiment of FIG. 21. In one or more embodiments, the description module 304 may include computer readable instructions that when executed receive a text description 134 comprising a description of the one or more apparel items. The text description 134 may include a positive description 136 of one or more attributes to be present in the one or more apparel items and a negative description 138 of one or more attributes to be excluded from the one or more apparel items.

The coordination server 300 may include a generative model selection routine 306. The generative model selection routine 306 may be configured to select and/or receive a selection specifying a generative image model 408 to be utilized, and/or selecting a generative image model 408 to be utilized. The selection may also occur automatically depending on the type of draft file 102, the type of text description 134 provided (e.g., detection of the word "photorealistic", and/or other keywords), etc. In one or more embodiments, the generative model selection routine 306 may include computer readable instructions that when executed select a generative image model 408 configured to generate an output image. As further shown and described in conjunction with the embodiment of FIG. 4, the generative image model 408 may be constrained by both the first image of the one or more apparel items (e.g., within the draft file 102) and a first set of latent representations 405 that includes at least one of one or more latent representations 405 of a text-image relation model 404. In one or more alternative embodiments, the generative model selection routine 306 also may be configured to select and/or receive a selection specifying the text-image relation model 404.

The coordination server 300 may further include a model parameterization subroutine 308. The model parameterization subroutine 308 may be configured to receive and/or query parameters (e.g., the model parameters 161 from the graph data structure 109) in association with a generative session and/or generation request 206. In one or more embodiments, the model parameterization subroutine 308 may include computer readable instructions that when executed select the text-image relation model 404 configured to relate the text description 134 to the one or more latent representations 407 of the text-image relation model 404, and parameterize the generative image model 408 with a set of model parameters 161. The set of model parameters 161 may include, for example, a convolution step value 163, a constraint divergence value 167, a quality value 164 of the output image, a size value of the output image, a generative seed 162, a sampler model reference 165 to a sampler model, and/or a denoise algorithm reference 166 to a denoise algorithm, as each are further shown and described in conjunction with the embodiment of FIG. 4.

The coordination server 300 may further include a generative structuring engine 310. The generative structuring engine 310 may be configured to define, store, and/or edit one or more nodes 110 and directed edge 113 forming the graph data structure 109. In one or more embodiments, the generative structuring engine 310 may include a node definition routine 312 configured to define and store one or more nodes 110, and a graph structuring routine 314 configured to define one or more directed edges 113 between and/or among the nodes 110.

In one or more embodiments, the generative structuring engine 310 may include computer readable instructions that when executed generate a graph data structure 109. The graph data structure 109 generated by the generative structuring engine 310 may include a model selection node 130 including attributes and associated values specifying a directed edge 113 from the model selection node 130 to an image generation model node 160, a directed edge 113 from the model selection node 130 to a text-image relation node 140, and a directed edge 113 from the model selection node 130 to a decoding algorithm node 170.

In one or more embodiments, the generative structuring engine 310 may include computer readable instructions that when executed generate the text-image relation node 140. The text-image relation node 140 may include attributes and associated values specifying a directed edge 113 from the text-image relation node 140 to the image generation model node 160, storing the positive description 136 of the one or more apparel items, and/or the negative description 138 of the one or more apparel items.

In one or more embodiments, the generative structuring engine 310 may include computer readable instructions that when executed generate the base parameterization node 150, including generating attributes and associated values storing the size value 152 of the output image (e.g. the output image generating the rendering file 104) and/or a directed edge 113 drawn from the base parameterization node 150 to the image generation node 160 (and/or a directed edge 113 from the image generation node 160 to the base parameterization node 150). In addition, in one or more embodiments, the generative structuring engine 310 may include computer readable instructions that when executed generate the image generation model node 160, including attributes and values storing the set of model parameters 161 and a directed edge 113 from the image generation model node 160 to the decoding algorithm node 170.

A generative divergence engine 318 may be configured to generate additional, alternative, and/or one or more different parameters, inputs, and/or generative models for use in generating the rendering file 104. For example, the generative divergence engine 318 may receive alternative instances of the model parameters 161, for instance generating a new generative seed 162. The generative divergence engine 318 may execute automatically (e.g., to initiate generation of two alternative instances of the rendering file 104 from which the user 101 may choose) and/or at the request of the user 101 (e.g., to generate an alternate instance if the user 101 is unsatisfied with a first result). The generative divergence engine 318 may be configured to cause generation of alternative nodes 110, for example the image generation node 160B as shown and described in conjunction with the embodiment of FIG. 1B.

In one or more embodiments, the generative divergence engine 318 may include computer readable instructions that when executed generate second set of model parameters 161 (e.g., a set of model parameters 161B), wherein the second set of model parameters 161 differs from a first set of model parameters (e.g., a set of model parameters 161A). For example, the variation may occur in the constraint divergence value 167, the generative seed 162, the text description 134, the positive description 136, the negative description 138, and/or the sampler model (e.g., specified in the sampler model reference 165). The generative divergence engine 318 may also include computer readable instructions that when executed initiate a first request for generating a second set of latent representations 407 (latent representations 407B) of the one or more latent representations 405 of the text-image relation model 404 based on reduced constraint in the of the text-image relation model 404. The generative divergence engine 318 may also include computer readable instructions that when executed initiate a second request for generating an alternative rendering file 104 (e.g., a rendering file 104B, which also may be referred to as the alternative rendering file 105). The generative divergence engine 318 may further include computer readable instructions that when executed receive a preference selection 210 from the user for the alternative rendering file 105.

A rendering delivery subroutine 332 may be configured to transmit the rendering file 104 and any associated metadata to the client device 200. In one or more embodiments, the rendering delivery subroutine 332 includes computer readable instructions that when executed transmit the rendering file 104 and optionally the alternative rendering file 105 (e.g., the rendering file 104B) to a user 101, for example over the network 103 to the client device 200.

Where a rendering file 104 is selected by the user 101 as the sufficient, accurate, and/or desired rendering, the parameters of the generation may be primarily or partially locked to allow fine tuning without major changes in the rendering. For example, multiple rendering files 104 may be presented to the user 101 as an intermediate point for further iteration or tuning, where each rendering file 104 may have been generated a different generative seed 162. When the user 101 generates the preference selection 210, the selected parameters or a subset thereof may be locked (e.g., read-only locked within the graph data structure 109) and only certain parameters allowed to vary to protect the overall look, feel, and nature of the selected rendering file 104. In one or more embodiments, the generative tracking subroutine 316 of the generative structuring engine may include computer readable instructions that when executed store the second set of model parameters 161 (e.g., the model parameters 161B) and optionally lock the generative seed 162, and/or other model parameters 161. The generative tracking subroutine 316 may be generally configured to track, for example with storage of temporary or permanent alternative instances of the node 110, each iteration of the inputs to the text-image relation model 404, the generative image model 408, and/or other selections affecting the outcome of the rendering file 104.

In one or more embodiments, the coordination server 300 may include an apparel segmentation engine 320. The apparel segmentation engine 320 may be configured to segment an image, such as the draft file 102 and/or the rendering file 104, into two or more segments designating apparel items (e.g., shirts, pants, belts, undergarments, gloves, hats, shoes, shawls, overclothes, jackets, etc.), apparel elements (e.g., cuffs, kneepads, pleats, belt loops, intentional holes or wearing, fasteners), and/or material element (e.g., a designated location of a material type, such as a yarns, natural fibers, synthetic fibers, woven cloth, knit cloth, leather, imitation leather, fur, imitation fur, etc.). In one or more embodiments, the apparel segmentation engine 320 may utilize one or more computer vision models (e.g. Segment Anything Model (SAM) by Meta) to identify the apparel item, the apparel element, and/or apparel material in the draft file 102 and/or the rendering file 104.

In one or more embodiments, the apparel segmentation engine 320 may include computer readable instructions that when executed input at least the draft file 102 and the rendering file 104 into a computer vision model 322 trained with a first set of training and optionally text descriptions images that include data distinguishing apparel items, for example through supervised or unsupervised machine learning methods. The computer vision model may include a recognition model based on artificial neural networks and/or deep learning networks. In one or more embodiments, the training data set may include segmentations with specific descriptions associated therewith.

The apparel segmentation engine 320 may include computer readable instructions that when executed generate a segmentation file 334 comprising one or more boundary designations of the one or more apparel items. An example of the segmentation file 334 is shown and described in conjunction with the embodiment of FIG. 18B and FIG. 19. The computer vision model 322 may be further trained with a second set of training images that include data designating apparel elements of apparel items, and the apparel segmentation engine 320 may include computer readable instructions that when executed generate a second segmentation that includes a second set of one or more boundary designations (e.g., the boundary designations 1802 of FIG. 18A) of one or more apparel elements of each of the one or more apparel items. The segmentation file 334 may further include one or more boundary designations of the one or more material elements.

The coordination server 300 may include a material identification routine 324. The material identification routine 324 may be configured to identify a material, probabilistically likely material based on statistical models, and/or a range of possible materials within the draft file 102 and/or the rendering file 104. This may be a related, but distinct role from recognizing and segmenting regions of differing materials, as may occur with respect to the apparel segmentation engine 320, as described above. The material identification routine 324 also may be configured to detect patterning and textures, for example a repeating fashion brand patterning, a dimpled texture, a gloss texture, etc.

In one or more embodiments, the material identification routine 324 includes computer readable instructions that when executed input the draft file 102 and/or the first rendering file 104 into a computer vision model 322 trained with a set of training images that include data designating a material value associated with at least one of an apparel item and/or an apparel element. For example, the material specified by the material value may be cloth, wool, synthetic fibers, and weaves and patterns thereof. The material value may be a text name, description, and/or identifier (e.g., an industry-recognized material code, SKU, UID, GUID, etc.). In another example, the material may be leather, textures and patterns thereof, sequin, imitation leather, fur, imitation fur, etc. In one or more embodiments, there may be multiple instances of the computer vision model 322 specialized in identifying the image boundaries of apparel items, in identifying the image boundaries of apparel elements, in identifying the image boundaries of material elements, and/or identifying apparel materials within bounded material elements.

An apparel rendering routine 326 may be configured to discretely render and/or re-render an apparel item within the draft file 102 and/or the rendering file 104, for example an apparel item identified by the apparel segmentation engine 320 and/or the computer vision model 322, and as may be stored in the segmentation file 334. In one or more embodiments, the apparel rendering routine 326 may include computer readable instructions that when executed receive a selection of a boundary designation (e.g., the boundary designation 1802) of the one or more boundary designations of the one or more apparel items to select an apparel item bounded by the boundary designation. For example, the selection may occur on the generative image review interface 208, where the segmentation file 334 is displayed in conjunction with, and/or overlayed on, the draft file 102 or the rendering file 104, as the case may be. The apparel rendering routine 326 may include computer readable instructions that when executed receive a new text description (e.g., a text description 134) including a description of the apparel item bounded by the boundary designation (e.g., the boundary designation 1802). For example, the user 101 may be prompted to provide keywords, descriptors, or other text describing, positively or negatively (e.g., what is to be included or excluded) regarding the attributes of the apparel item bounded by the boundary designation.

In one or more embodiments, the coordination server 300 may include an apparel rendering routine 326 configured to render and/or re-render an identified and/or segmented apparel item within an image file, for example the draft file 102 and/or the rendering file 104. In one or more embodiments, the apparel rendering routine 326 may include computer readable instructions that when executed request a set of latent representations (e.g., the latent representations 405 of FIG. 4) from at least one of the text-image relation model 404 (e.g., a text-image relation model 404A utilized to originally generate the rendering file 104) and/or a different text-image relation model 404 (e.g., a text-image relation model 404B that may be selected to specifically render apparel or portions thereof) based on the new text description (e.g., a new instance of the text description 134 which may describe the apparel item to be rendered and/or re-rendered).

In one or more embodiments, the apparel rendering routine 326 may include computer readable instructions that when executed input into the generative image model 408 at least a portion of the first rendering file 104 (and/or the draft file 102) within the boundary designation (e.g., the boundary designation 1802), the set of latent representations 405 of the text-image relation model 404 (e.g., the text-image relation model 404B), and a different set of model parameters 161. For example, the different set of model parameters 161 may be more appropriate to rendering and/or re-rendering the apparel, for example by selecting a different instance of the quality value 164, and/or a denoise algorithm specified by the denoise algorithm reference 166. The generative model execution engine 402, as further shown and described in conjunction with the embodiment of FIG. 4, may then generate a second rendering file 104 (e.g., a rendering file 104B) that re-renders the apparel item bounded by the boundary designation. Alternatively, or in addition, the rendering file 104B may be a file solely rendering the apparel item, which can then be combined, overlayed, superimposed, and/or flattened on to the original rendering file 104 (e.g., the rendering file 104A). Selective re-rendering may save computing resources (e.g., bandwidth, memory storage space, computation, and services, API calls, and/or electricity required therefore).

The coordination server 300 may also include a material rendering routine 328, according to one or more embodiments. In one or more embodiments, the material rendering routine 328 may be configured to render and/or re-render an apparel item, and/or apparel element within an image file, with one or more graphical images as the basis for a material. The graphical rendering of the material may include properties of the material such as color, luster, texture, patterns, translucency, opacity, and other properties. In one or more embodiments, the material rendering routine 328 may generate a call to the material image library 510 (for example using a material UID 512), to return images 514 and/or latent representations of images of the material (not to be configured with the latent representations 405) for use in farther parameterizing and/or constraining the generative image model 408.

In one or more embodiments, the material rendering routine 328 may include computer readable instructions that when executed receive selection of a different boundary designation of one or more boundary designations of one or more material elements and receive a selection of a material value associated with an apparel material. For example, the material value might be general, such as "cloth" or "leather," or might be more specific, for example "twill weave blue and white cloth," or identifying a make, model, or SKU of a fabric and/or material that is in inventory in a warehouse. In one or more embodiments, the material rendering routine 328 may include computer readable instructions that when executed load (i) a different text description 134 that includes a description of the apparel material, (ii) a set of latent representations 407 based on the text description 134 of the apparel material that is output from at least one of the text-image relation model 404 and the different text-image relation model 404B (e.g., one that may be specifically selected for material rendering), and/or (iii) one or more material images 514 of a material image library 510. The material rendering routine 328 may include computer readable instructions that when executed initiate generation of a rendering file 104 re-rendering the apparel material bounded by the different boundary designation.

Figure 4:
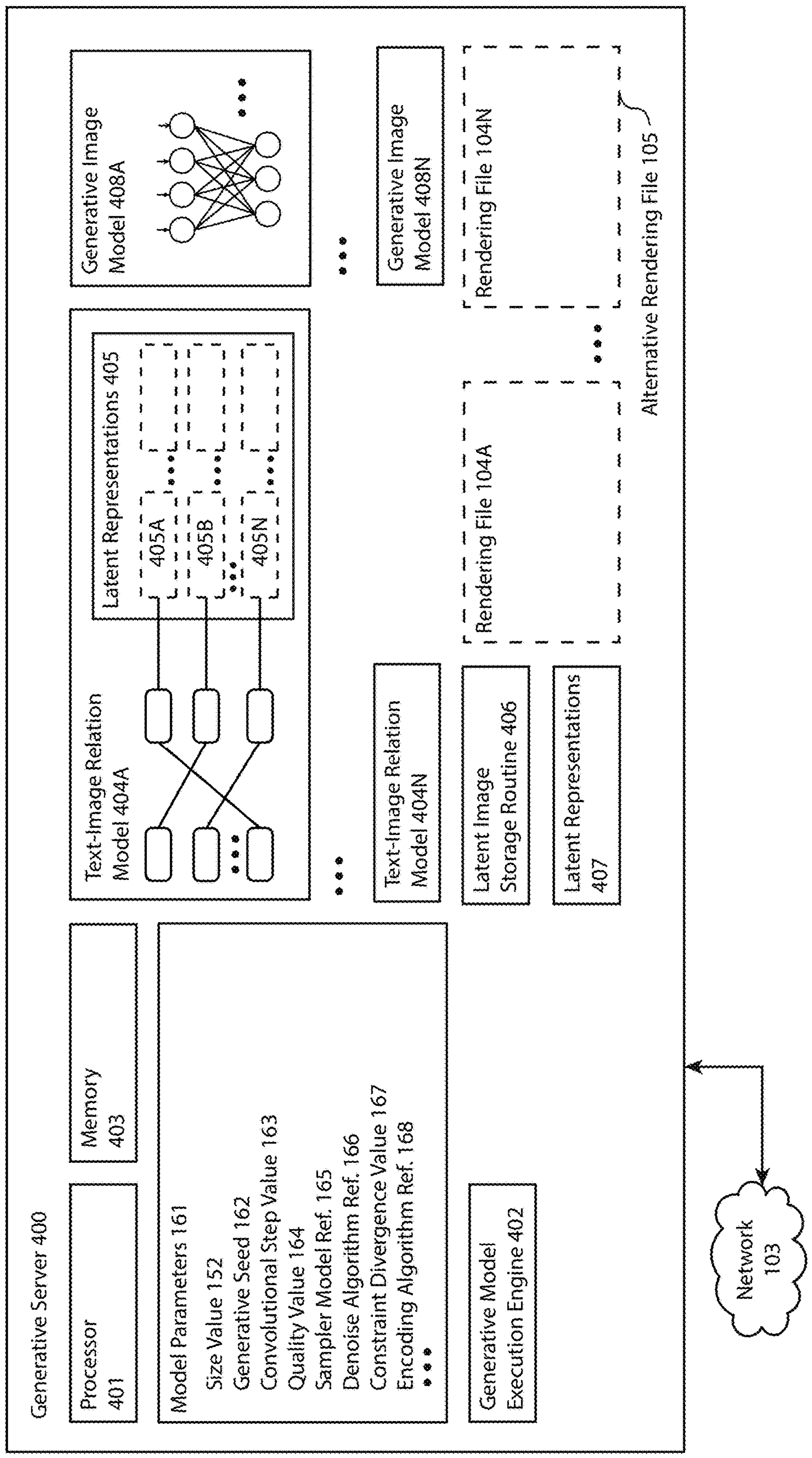
FIG. 4 illustrates a generative server, including the model parameters, one or more searchable text-image relation models, and one or more selectable generative image models that may be utilized to generate one or more rendering files, according to one or more embodiments.

FIG. 4 illustrates a generative server 400, according to one or more embodiments. The generative server 400 may be and/or may include a server computer. However, in one or more alternative embodiments, the coordination server 300 may be or include a different computing device (e.g., a personal computer (PC), a laptop computer, a notebook computer, a tablet computer, and/or a smartphone). The generative server 400 may include a processor 401 that may include one or more computer processors and/or central processing units (CPUs). The generative server 400 may also include a memory 403 that may include one or more readable memories (e.g., RAM, ROM, solid state memory, hard drive memory, etc.).

The generative server 400 may be configured to receive parameters and inputs for a generative image model 408 and execute the generative image model 408 to output a rendering file 104, according to one or more embodiments. In one or more embodiments, the generative server 400 may include a generative model execution engine 402, one or more text-image relation models 404 (e.g., the text-image relation model 404A through the text-image relation model 404N), each text-image relation model 404 associated with a set of latent representations 405 (e.g., the text-image relation model 404A associated the latent representations 405A), a latent image storage routine 406, and one or more generative image models 408 (e.g., the generative image model 408A through the generative image model 408N). The generative server 400 may also receive and store the possible inputs to the generative image model 408, including the draft file 102, the latent representations 407 extracted from the latent representations 405, the model parameters 161, and/or other inputs. The generative server 200 may also store, permanently or temporarily, one or more outputs of the generative image model 408, the rendering file 104A through the rendering file 104N. Where a new rendering file 104 (e.g., a rendering file 104B) has been generated as an alternative to an original rendering file 104 (e.g., a rendering file 104A), the new rendering file 104 also may be referred to as an alternative rendering file 105.

The text-image relation model 409 may be configured to receive text, for example keywords, engineered prompts, and/or natural language descriptions, parse the text, and relate the text to one or more images and/or latent representations 405, according to one or more embodiments. The text-image relation model 409 may be configured to link visual representations with natural language, and may be trained through supervised machine learning. For example, in one or more embodiments, the text-image relation model 409 may be, or may include, Contrastive Language-Image Pre-training ("CLIP"), offered by Stable Diffusion®. In another example, the text-image relation model 404 may be an one or more algorithms based on Word2Vec model architectures. In one or more embodiments, the text embedding, including any embedded vectorization thereof, may be matched to visual encoding by the generative image model 408. In one or more embodiments, the text-image relation model 409 may comprise a text encoder that processes input text prompts (e.g., the text description 134) to guide image generation towards the desired outcome based on textual descriptions. The text encoder may interpret (e.g., "understand") complex textual prompts, which is useful for the performance of the generative image model 408 in generating images that closely match the intent of a user 101.

The generative image model 408 may be configured to receive one or more inputs and generate an image. The generative image model 408 may be based on, and/or utilize an artificial neural network trained through machine learning techniques. In one or more embodiments, the generative image model 408 may use a horizontal and/or vertical detection kernel. The kernel may be n-dimensional across multiple convolutional layers, for example the image fractionations. The generative image model 408 may apply computer vision based on semantic segmentation and/or instance segmentation, as known in the art of AI engineering.

In one or more embodiments, the generative image model 408 may be Stable Diffusion v1-5 or Stable Diffusion XL, offered by Stability.ai®. In one or more other embodiments, the generative image model 408 may be or include Imagen by Google®, Dall-E by OpenAI®, Midjourney®, and/or future versions and/or releases of Sable Diffusion®.

It should be noted that the generative server 400 may include multiple instances of the text-image relation model 404, as well as multiple instances of the generative image model 408. In one or more embodiments, the instances to be utilized may be selected automatically based on inputs of the user 101, selected based on licensing rights or fees paid by the user 101, may be selected by the user 101, queried (e.g., from the model selection node 130 of the graph data structure 109), selected at random, and/or otherwise selected.

The model parameters 161 may include attributes and associated values specifying parameters affecting the outcome, quality, properties, and/or features and qualities of the text-image relation model 404 and/or the generative image model 408. In one or more embodiments, the model parameters 161 may include specification of additional algorithms, processes, and/or methods employed by the generative image model 408 as pre-processing before, post-processing after, and/or during application of the generative image model 408. The model parameters 161 include values automatically selected based on detected properties of the draft file 102 (and/or re-submitted rendering file 104), may include values authorized for use (e.g., a proprietary decoding algorithm), and/or many include values selected by the user 101, for example through a drop-down menu or command line interface (CLI) of the submission application 202 and/or the generative image review interface 208.

In one or more embodiments, the model parameters 161 may include a generative seed 162, a convolutional step value 163, a quality value 164, a sampler model reference 165, a denoise algorithm reference 166, a constraint divergence value 167, and/or a decoding algorithm (which may be specified by a decoding algorithm reference 172). The generative seed 162 may be a value, for example an alphanumeric string or other binary value, that may "seed" and/or provide initial randomness. Depending on the decoding algorithm utilized, an identical value for the generative seed 162 may result in the identical output of the generative image model 408 (e.g., the same rendering file 104) given all other unchanged model parameters 161 and other inputs. This may be useful for recreating, checking, verifying, and/or incrementally changing the rendering of the draft file 102. For example, where the sampler model (e.g., referenced by the sampler model ref. 165) is a deterministic algorithm (rather than probabilistic algorithm), the same value for the generative seed 162 may result in the same rendering file 104. In one or more embodiments, the generative seed 162 may be generated as a random or pseudo-random value and/or number.

Where the generative image model 408 is a convolutional neural network and/or convolutional model, the convolutional step value 163 may specify a number of convolutional steps the generative image model 408 will undergo. The convolutional step value 163 may be constrained by the instance of the generative image model 408 selected, computer resources available for execution of the generative image model 408, the permissions of the user 101, and/or other constraints. As an example, where a generative image model 408 such as Stable Diffusion v1-5 is utilized, the convolutional step value 163 may be between 1.2 and 9.

A quality value 164 may specify a quality of the rendering file 104. For example, the quality value 14 may be measured in pixel resolution and/or visual fidelity and/or sharpness. As an example, where a generative image model 408 such as Stable Diffusion v1-5 is utilized, the quality value 164 may be between 1024px by 1024px (and/or 1K) and 15,360px by 15360px (and/or 16K).

The sampler model reference 165 may store a value specifying a sampler model. The sampler model may be configured to assist a denoising process of a latent image (e.g., the starting image to which convolutional steps may be applied) and/or convolutional steps thereafter, which may guide the transformation from noise to a coherent image that may match a text prompt. As an example, where a generative image model 408 such as Stable Diffusion is utilized, the sampler model may include Euler A, DDIM, and DPM Solver++.

The denoise algorithm reference 166 may store a value specifying a denoise algorithm. The denoise algorithm may be configured to create variations in the garment visualization allowing alterations to deviate from the source image. For example, the denoise algorithm may include and/or may be based on a Gaussian noise filter. As an example, where a generative image model 408 such as Stable Diffusion v1-5 or Stable Diffusion XL is utilized, the denoise algorithm may include 0.55. Other examples of the denoise algorithm include 0.15, 0.45, 0.65, 0.75, and 0.9.

The constraint divergence value 167 may be a value specifying the extent to which the generative image model 408 and/or the text-image relation model 404 may “diverge” from expected probability distributions. The constraint divergence value 167, for example, may represent a “creativity” of the generative image model 408 and/or a freedom to incorporate additional adjacent concepts and/or content. The constraint divergence value 167, may also be referred to as a “cfg”, and may be utilized to balance creativity and adherence to a text prompt (e.g., the text description 134). A lower value may increase creativity, while a higher value may increase adherence to the text description 134. For example, where a generative image model 408 such as Stable Diffusion v1-5 is utilized, a constraint divergence value 167A of 1.00 may result in results that may diverge significantly from a prompt, a constraint divergence value 167B of 7.00 may adhere to the prompt and generate an image within most expectations of the user 101, and a constraint divergence value 167C of 20.0 may result in strict adherence to the prompt, overly literal interpretation, and/or high degrees of saturation and contrast. For example, in the case of utilizing Stable Diffusion, a value of ‘7’ may provide a balanced output (See: OpenArt Blog, “CFG GuidanceScale”: https://blog.openart.ai/2023/02/13/the-most-complete-guide-to-stable-diffusion-parameters/).

The decoding algorithm reference 172 may store a value specifying the decoding algorithm. The decoding algorithm may be utilized in one or more initial stages of image generation from the latent image to encode images into a lower-dimensional latent space and/or in the later stages of image generation to decode the latent representations back into images. In one or more embodiments, the decoding algorithm may be a variational autoencoder (e.g., a VAE): The VAE may be used for managing the generative model’s efficiency and the quality of the generated images by working within a compressed latent space. However, in one or more embodiments, the decoding algorithm may be included within the generative image model 408, for example included within fine-tuned Stable Diffusion checkpoints and/or models.

The generative server 400 may include one or more text-image relation models 404. The text-image relation model 404 may be configured to learn (e.g., via supervised machine learning methods) visual concepts from natural language. In one or more embodiments, the text-image relation model 404 may be configured to relate one item of text (e.g., a letter, a word, a phrase, etc.) to another, and then to one or more latent representations 405. The latent representations 405 may be one or more latent images resulting from training a model, such as an artificial neural network, to recognize digital images describe with the letters, words, phrases, etc., or combinations thereof. As an example, where a generative image model 408 such as Stable Diffusion v1-5 is utilized, the text-image relation model 404 may include a Contrastive Language-Image Pre-training (CLIP) model. Other examples of the text-image relation model include Stable Diffusion XL, Kadinsky 3.0, or DeepFloyd-IF.

The generative server 400 may include one or more instances of the generative image model 408. The generative image model 408 may be configured to receive the draft file 102 or data derived therefrom, and one or more additional inputs (such as the model parameters 161 and/or the text description 134), to produce an output such as a rendering of the draft file 102 that may be stored as the rendering file 104. In one or more embodiments, the generative image model 408 may be based on generative image models developed and/or offered by OpenAI® (e.g., DALL-E), Midjourney®, Stability.ai® (e.g., DreamStudio), Firefly (e.g., offered by Adobe®), etc. The generative image model 408 may execute on the generative server 400 and/or may be accessed through a remote procedure call to an external service, including a generative model available as software-as-a-service (SaaS). In one or more embodiments, the generative image model 408 may also execute on the client device 200. Specific examples of the generative image model 408 can include Stable Diffusion v1-5 or Stable Diffusion XL.

The generative server 400 may include a generative model execution engine 402. The generative model execution engine 402 may be configured to input parameters into the text-image relation model 404 and/or the generative image model 408. In one or more embodiments, the generative model execution engine 402 may include computer readable instructions that when executed initiate an encoding algorithm to parse the text description 134 and/or apply the text-image relation model 404 to the text description 134 and/or the parsed result of the text description 134 from the decoding algorithm. In one or more embodiments, the encoding algorithm may influence the latent representations 407 drawn from the latent representations 405, for example by affecting determined relatedness of text words and/or phrases within the text-image relation model 404.

The generative server 400 may include a latent image storage routine 406 configured to extract and/or store the latent representations 407 from the latent representations 405, for example as the output of the text-image relation model 404. In one or more embodiments, the latent image storage routine may include computer readable instructions that when executed store a set of latent representations 407 from the text-image relation model. The set of latent representations 407, for example, may be used as an input to the generative image model 408, according to one or more embodiments. The latent image may include a random noise pattern based on the generative seed 162.

The generative model execution engine 402 may further include computer readable instructions that when executed input into the generative image model 408 a set of inputs of the generative image model that include (i) the draft file 102 comprising the first image of one or more apparel items, (ii) the set of latent representations 407 of the text-image relation model 404, and (iii) the set of model parameters 161. The generative model execution engine 402 may further include computer readable instructions that when executed generate a first rendering file 104 that includes a second image of the one or more apparel items modified by the text description 134. As a result, the user 101 may be able to rapidly visualize, prototype, and/or construct the one or more apparel items initially drafted in the draft file 102.

As further described through the present embodiments, different versions of the text-image relation model 404 and the generative image model 408 may be stored and/or accessed depending on the type of draft file 102 to be rendered, the type of rendering file 104 to be output (e.g., photorealism, photoshoot mock-up, apparel-only rendering, material-only rendering, watercolor painting concept art, etc.). In one or more embodiments, additional generative image models 404 may stored and/or accessed for specialized purposes, for example rendering human appendages (e.g., hands, fingers, feet, and toes), facial features, modifying background or setting behind a subject of a photorealistic rendering, etc.

Although artificial neural networks, deep learning models, convolutional models, and additional technologies are specified herein, it will be expressly understood to one skilled in the art that the generative image model 408 may come to be based on, utilize and/or include different and/or newer generative image technologies. For example, new techniques may be utilized for the relation of text to images and/or latent images usable for generating images with at least partially text prompts.

Figure 5:
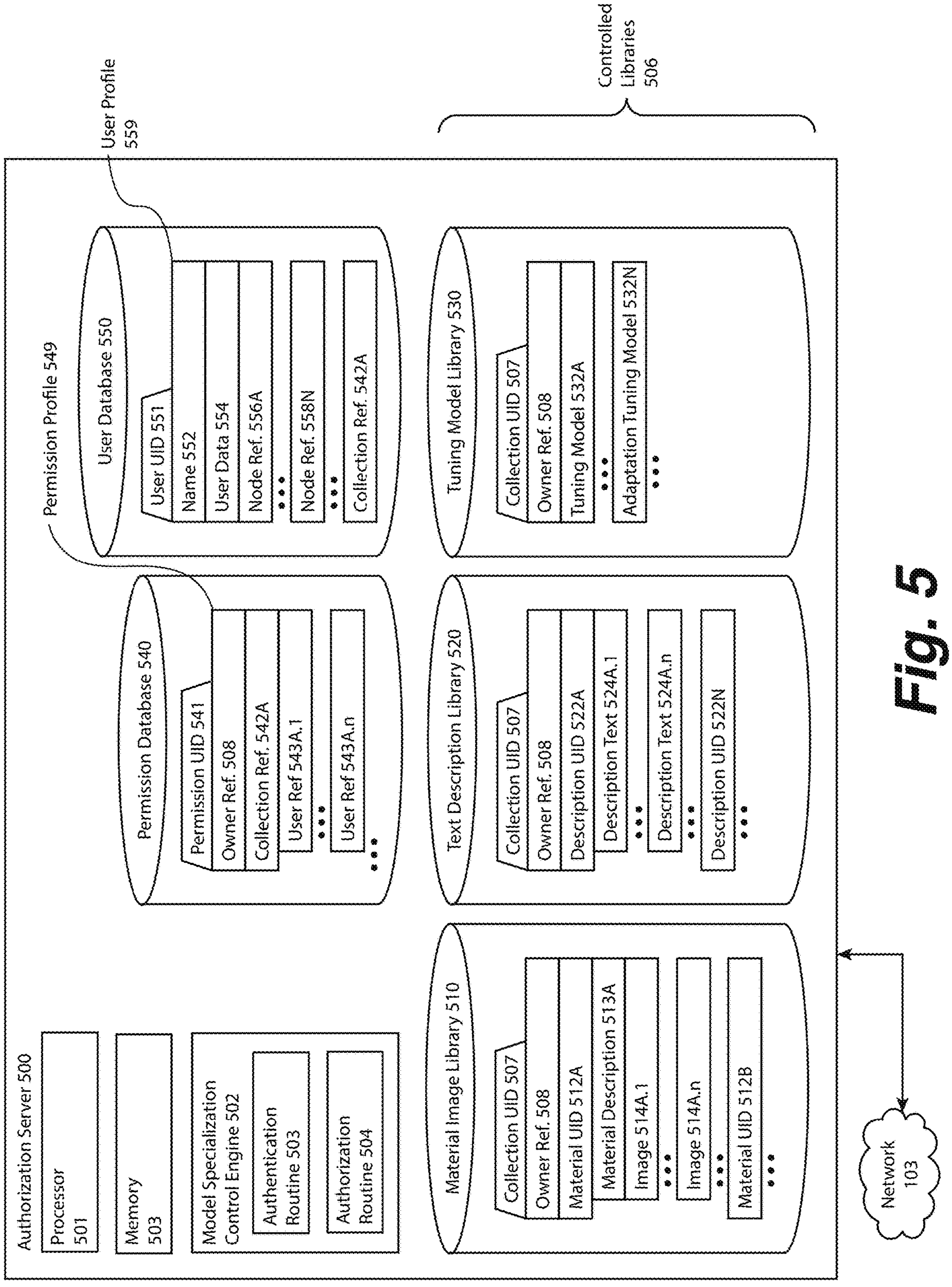
FIG. 5 illustrates an authorization server including a user database, a permission database, and a set of controlled libraries (e.g., a material image library, a text description library, and/or a tuning model library) storing digital assets usable in association with the generative image model and which may be controlled through the model specialization control engine, according to one or more embodiments.

FIG. 5 illustrates an authorization server 500, according to one or more embodiments. The authorization server 500 may include, for example, a server computer, but in one or more alternative embodiments may include a different computing device (e.g., a personal computer (PC), a laptop computer, a notebook computer, a tablet computer, and/or a smartphone). The authorization server 500 may include a processor 501 that may include one or more computer processors and/or central processing units (CPUs). The authorization server 500 may also include a memory 503 that may include one or more readable memories (e.g., RAM, ROM, solid state memory, hard drive memory, etc.).

The authorization server 500 may include a model specialization control engine 502 (which may include an authentication routine 503 and/or an authorization routine 504). The authorization server 500 may further include a set of controlled libraries 506 that store data and/or digital files that may be utilized in generating the rendering file 104 from the draft file 102, including, for example, data inputs and/or data or files utilized to generate data inputs for the text-image relation model 404 and/or the generative image model 408. In one or more embodiments, the controlled libraries 506 may include a material image library 510, a text description library 520, and/or a tuning model library 530, for example including data as described below. The authorization server may also include a permission database 540 specifying one or more permission profiles 549 that may be used to authorize access to one or more of the controlled libraries 506 or portions thereof. The authorization server 500 may further include a user database 550 including one or more user profiles 559 that may be associated with the user 101 and/or the device 200 such that authentication of either may occur, including prior to any authorization evaluation.

In one or more embodiments, the model specialization control engine 502 may be configured to evaluate an authorization request to query, retrieve, view, extract, and/or otherwise utilize data usable to specialize and/or control a generative image model 408, such as the data stored in the controlled libraries 506.

In one or more embodiments, the authentication routine 503 may be configured to receive an authorization request (e.g., to utilize data of one or more controlled libraries 506) and/or to receive an authentication request (e.g., the user 101 and/or the device 200 logging in to a generative image platform) and then authenticate the user 101 and/or the device 200. The authentication routine 503 may utilize one or more authentication factors, for example something the user 101 knows, something the user 101 has (e.g., a fob, a security card, a hardware encryption key), and/or something the user 101 "is" (e.g., a biometric, such as a thumb print, face scan, and/or other biological identifier). The authentication routine 503 may also utilize verifications, such as out-of-band token loop authentication (e.g., sending a verification number to a cell phone or email address of the user 101). In one or more embodiments, the authentication routine 503 may include computer readable instructions that when executed authenticate at least one of a user 101 (e.g., such as the generative user 101) and a device 200 of the user 101.

In one or more embodiments, the authorization routine 504 may be configured to evaluate whether a user 101 and/or a device 200 is authorized to access a data usable as an input to a generative image model 408 and/or the text-image relation model 404 and grant access, for example to allow the user 101 and/or the device 200 to query, view, download, or otherwise utilize such data.

In one or more embodiments, the authorization routine 504 may include computer readable instructions that when executed determine the user 101 (e.g., the generative user 101) is authorized to access (i) two or more image files each comprising one or more apparel elements (e.g., images 514, as described below); (ii) the text description 134 of the one or more apparel items (e.g., the description text 524, as described below); and/or (iii) an adaptation tuning model comprising a model trained on the two or more image files each comprising the one or more apparel elements (e.g., the adaptation tuning model 532). In one or more embodiments, the inputs to the generative image model 408 may further include one or more adaptation tuning models 532.

The material image library 510 may include two or more image files each including one or more apparel elements, descriptions thereof, and/or latent images derived therefrom. In one or more embodiments, the material image library 510 may include one or more collections, for example organized into collection profiles (e.g., a material collection profile, one of which is shown in the embodiment of FIG. 5). The material collection profile may include a collection UID 507 which may be a unique identifier used to uniquely address the collection. The material collection profile may include an owner reference 508 designating one or more owners (which may include a user profile 559), according to one or more embodiments. The material collection profile may specify one or more materials, each of which may be identified with a material UID 512 (e.g., a material UID 512A, a material UID 512B, etc.). Each material may include database associations to and/or grouped data including a material description 513 (e.g., all or a portion of which may be utilized for the text description 134), and one or more images 514. In one or more embodiments, the description may include one or more engineered prompts.

As just one example, a material UID 512A may defined for a denim material offered by a certain fashion brand, where the material description 513A describes the denim material and the image 514A.1 through the image 514A.n are a set of images and/or latent images showing examples of the denim. In one or more embodiments, the material description 513A may simply be utilized to name and described the material depicted in the images 514. However, the material description 513 also may be utilized as a text description 134, and/or reference a separate text collection profile within the text description library 520.

The text description library 520 may store one or more text collection profiles (e.g., one is shown in the embodiment of FIG. 5) that may be utilized as the text description 134. The text collection profile may include a collection UID 507, an owner reference 508 and one or more descriptions designated by a description UID 522 (e.g., a description UID 522). The description UID 5122 may include one or more sets of description text 522, which may be usable as the text description 134 or portions thereof (e.g., a description text 522A.1 through a description text 522A.n).

The description text 522 may have been carefully crafted and/or include known text useful in generating a rendering that is exciting, aesthetically appropriate, consistent, and/or has other advantageous properties when used as the text description 134. It will be recognized that the material description 513A may be confidential and/or a carefully guarded trade secret which may take many attempts of trial and error to craft, and/or careful application of experience and skill from an AI engineer (e.g., through prompt engineering). In one or more embodiments, the material description 513A may be transmitted to the generative server 400 without the user 101 able to download, view, and/or edit the material description 513A. Alternatively, or in addition, the user 101A may be able to view or modify the material description 513A. In still other cases, an authorized instance of the user 101 may have full access to view and/or customize the material description 513A prior to utilization as an input, and/or the user 101 may even be able to edit the material description 513 within the material image library 510, for example if their modifications yield even better results and they wish to commit the updates for other authorized users 101 to use.

The tuning model library 530 may include data or files used to tune, fine-tune, and/or specialize the text-image relation model 404 and/or the generative image model 408, according to one or more embodiments. The tuning model library 530 may store one or more tuning model collection profiles (e.g., one is shown in the embodiment of FIG. 5). The tuning model collection profile may include a collection UID 507, an owner reference 508, and one or more adaptation tuning models 532. Each adaptation tuning model 532 may be unique identified (e.g., by a tuning model UID). As one example, the adaptation tuning model 532 may be a Low-Risk Adaptation model (LoRA), for instance trained on selective data and/or images.

The permission database 540 may store data specifying one or more users 101, devices 200, and/or user profiles 559 that are authorized utilize one or more data resources of the controlled libraries 506, according to one or more embodiments. The permission database 540 may include one or more permission profiles 549. The permission profile 549 may include a permission UID 541 that may act as a profile UID, an owner reference 508 (e.g., to a user profile 559 that may own and/or act as an administrator of the permission profile 549), and/or one or more collection references 542 (e.g., a collection reference 542A through a collection reference 542N) that may reference one or more of the collections (e.g., the material collection profile of the material image library 510, the text description profile of the text description library 520, and/or the tuning model profile of the tuning model library 530). The collection reference 542 may store a value includes an instance of the collection UID 507. The permission profile 549 may include, associated with each collection reference 542, one or more user references 543 (e.g., a user reference 543A.1 through a user reference 543A.n), for example referencing instances of the user profile 559 which are authorized to utilize the referenced collection profile.

In one or more other embodiments, it will be recognized that the permission profile 549 may be integrated into each of the controlled libraries 506. For example, a list of user profiles 559 authorized to access a text description profile may be stored within the text description profile.

The user database 550 may store one or more user profiles 559, as may be known in the art of electronic profile and/or user management. The user profile 559 may be associated with one or more users 101 and/or user devices 200, such that the one or more users 101 and/or user devices 200 may log into, authenticate, and/or utilize the user profile 559 within the generative model control network 100. The user profile 559 may include a user UID 551, a name 552 of the user 101 (e.g., a username, a real name) and a set of user data 554 (e.g., where the user 101 is a human user, the user's location, address, demographic information, profile information, personal information, payment details, etc.). The user profile 559 may also include a reference to one or more node 110 owned or controlled by the user profile 559. Although not shown in FIG. 4, the user profile 559 may also include a reference to one or more collections owned by the user profile 559, or which the user profile 559 may have authorization to access. It will be further recognized to one skilled in the art that the user profile 559 may store information sufficient to authenticate the user 101 associated with the user profile 559 (e.g., by processes of the authentication routine 503), for example a password for the user 101 and/or a hash output when the password is utilized as the input to a hashing algorithm.

Figure 6:
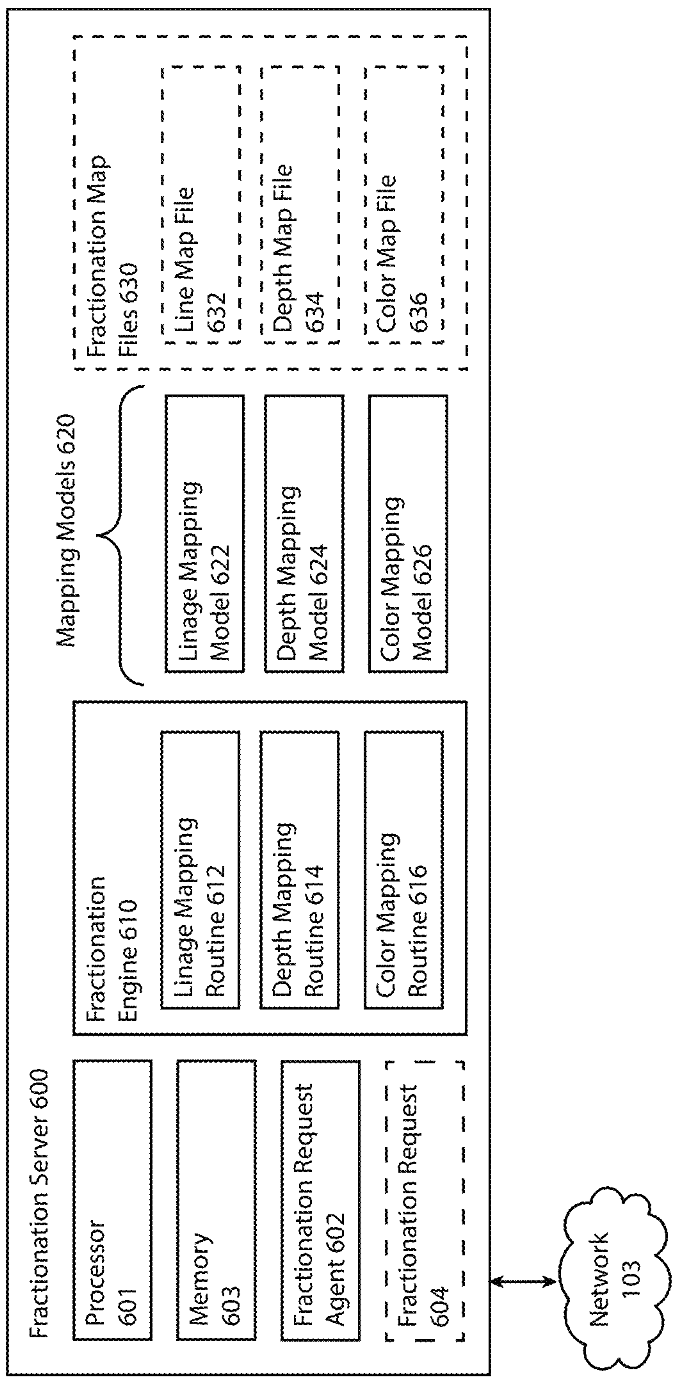
FIG. 6 illustrates a fractionation server which may include a fractionation engine that may improve and/or assist in mapping the draft file for potential increased efficiency and quality of the rendering file, according to one or more embodiments.

FIG. 6 illustrates a fractionation server 600, according to one or more embodiments. In one or more embodiments, the fractionation server 600 may be configured to fractionate the draft file 102 and/or a rendering file 104 into additional visual aspects and/or qualities to help guide, reinforce, and/or influence the generative image model 408 for instance, a convolutional neural network. For example, and depending on the generative image model 408, the generative image model 408 may produce a higher quality and/or more consistent result if linage, depth, and/or color analysis is performed on the input (e.g., the draft file 102) to the generative image model 408.

The fractionation server 600 may include, for example, a server computer. However, in one or more alternative embodiments may include a different computing device (e.g., a personal computer (PC), a laptop computer, a notebook computer, a tablet computer, and/or a smartphone). The fractionation server 600 may include a processor 601 that may include one or more computer processors and/or central processing units (CPUs). The fractionation server 600 may also include a memory 603 that may include one or more readable memories (e.g., RAM, ROM, solid state memory, hard drive memory, etc.). The fractionation server

600 may include a fractionation request agent 602, a fractionation request 604, a fractionation engine 610, a set of one or more mapping models 620, and/or a set of one or more fractionation map files 630, according to one or more embodiments.

The fractionation request agent 602 may be configured to receive and process a fractionation request 604 for fractionation of a model input image (e.g., the draft file 102, the rendering file 104 or portion thereof for re-generation). The fractionation request 604 may be automatically generated, for example by the coordination server 300 upon receipt of the generation request 206. Alternatively, or in addition, the user 101 and/or device 200 may have control over which fractionation occurs, including through selection on the user interface of the submission application 202. Fractionation also may be a varied parameter when generating alternative instances of the rendering file 104 and/or defining the graph data structure 109. For instance, and referring to FIG. 1B, a first rendering generated from the draft file 102 may include a no fractionation node 190, a second rendering generated from the draft file 102 may include a first instance of the fractionation node 190 (e.g., a fractionation node 190A), and a third rendering generated from the draft file 102 may include a second instance of the fractionation node 190 (e.g., a fractionation node 190B) which may vary fractionation parameters from the first fractionation node 190A.

The fractionation engine 610 may include one or more image map routines for parsing an input image. For example, the fractionation engine 610 may include a linage mapping routine 612, a depth mapping routine 614, and/or a color mapping routine 616. In one or more embodiments, the linage mapping routine 612 may be configured to call a linage mapping model 622 which may recognize and/or map lines within the image file (e.g., the draft file 102, the rendering file 104), including at various weights depending on the prominence of the lines within the image. The linage may naturally identify boundaries that transition between various materials, apparel items, apparel elements, contrasting color or shading, the background and the subject (e.g., a generated fashion model), and/or visual items or aspects of the background (e.g., the horizon between ground and sky). In one or more embodiments, the linage mapping model 622 may utilize a computer vision algorithm which identifies linage within the input image. An example of the output line map file 632 is shown and described in conjunction with the embodiment of FIG. 15A and FIG. 15B.

In one or more embodiments, the linage mapping routine 612 includes computer readable instructions that when executed input the draft file 102 into a linage mapping model 612 to output a line map file 632. The line map file 632 may include material-material boundaries of the one or more apparel items, material-skin transition boundaries, and/or material-background boundaries of the one or more apparel items.

In one or more embodiments, a depth mapping routine 614 may be configured to call a depth mapping model 624 which may recognize and/or map perceived visual depth within the image file (e.g., the draft file 102, the rendering file 104). The depth may be designated through a "heatmap" and/or greyscale intensity map, where black may represent an area of increased depth (e.g., a perceived farther distance from the viewing point of the image) and where white may represent an area of decreased depth (e.g., a perceived closer distance from the viewing point of the image). The depth map may help to render shadows, curvature and folding of cloth, and also may contribute to transitions between various materials, apparel items, apparel elements, subject(s), and background(s). In one or more embodiments, the depth mapping model 624 may utilize a computer vision algorithm which identifies depth within the input image. An example of the output depth map file 634 is shown and described in conjunction with the embodiment of FIG. 16.

In one or more embodiments, the depth mapping routine 614 may include computer readable instructions that when executed input the draft file 102 into a depth mapping model 624 that outputs a depth map file 634 designating a perceived depth (i) a first apparel item of the one or more apparel items relative to a second apparel item of the one or more apparel items; and/or (ii) a first material of the one or more apparel items relative to a second material of the one or more apparel items. In another example, depth may be perceived by identifying a midpoint and determining relative positioning of the subject's body parts and apparel thereon.

In one or more embodiments, a color mapping routine 616 may be configured to call a color mapping generation model 624 which may recognize and/or map color within the image file (e.g., the draft file 102, the rendering file 104). The depth may be designated through boundaries with a color code or abstracted to a single color within a limited range (e.g., 8 bit color). The color map may help to render shadows, coloration, curvature and folding of cloth, and also may contribute to transitions between various materials, apparel items, apparel elements, and/or background. In one or more embodiments, the color mapping model 626 may utilize a computer vision algorithm which identifies color within the input image. An example of the color map file 636 is shown and described in conjunction with the embodiment of FIG. 17.

In one or more embodiments, the color mapping routine 616 may include computer readable instructions that when executed input the draft file 102 into a color mapping model outputting a color map file 636 designating a color of at least one of (i) the first apparel item relative to the second apparel item; and/or (ii) the first material relative to the second material.

Any of the image fractionations may be utilized to improve the output of the generative image model 408, including without limitation a convolutional neural network model. For example, in one or more embodiments, the set of inputs of the generative image model 408 may further include of the line map file 632, the depth map file 634, and/or the color map file 636. Additional types of image mapping are possible and may be included within the fractionation server 600, for example, perceived texture mapping, ControlNet IP-Adapter, ControlNet Scribble with pre-processor Extended Difference of Gaussian (xDoG).

Figure 7:
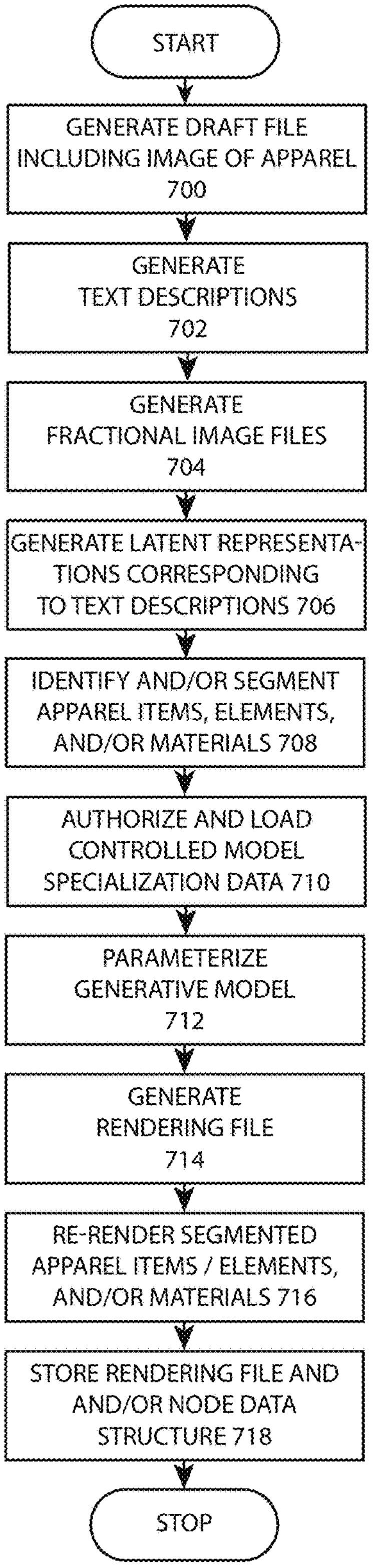
FIG. 7 illustrates a design visualization process flow, according to one or more embodiments.

FIG. 7 illustrates a design visualization process flow 750, according to one or more embodiments. Operation 700 generates a draft file 102 that includes an image of apparel. For example, the apparel may be a shirt, a pair of pants, a shawl, gloves, a hat, leg warmers, a dress, a vest, a jacket, and/or other worn items. The apparel may be worn by a subject or displayed on its own, e.g., in the style of a still life. The draft file 102 may be drawn in a digital art application (e.g., Adobe® Illustrator, Adobe® Photoshop, CorelDRAW, etc.), or may have been hand-sketched (e.g., with pencil, pen, charcoal) and photographed, scanned, or otherwise digitized. The draft file 102 could also be a photograph or scan of a mock up sculpture, pinned-together fabric prototype (e.g., on a manakin), and/or other three dimensional draft. The draft file 102 may have one or more contributing users 101 that may be human or a machine-user. An example of a draft file 102 drawn on Adobe® Illustrator is shown and described in conjunction with the embodiment of FIG. 13.

Operation 702 generates one or more text descriptions 134 of the draft file 102 and/or its intended qualities, styles, aesthetic, and/or other properties when rendered. The text description 134 may include a positive description 136 and/or a negative description 138 and may include prmpts that may be "prompt engineered". The text description 134 may be custom drafted by the user 101 that may have created the draft file 102, and/or by a different instance of the user 101. In one or more embodiments, a premade instance of the text description 134 may be utilized, including one queried from a database (e.g., one or more controlled libraries 506 and/or the graph database 330).

Operation 704 may generate one or more fractional image files to assist in rendering. The fractionation may help to determine certain boundaries, transitions, and/or other visual properties of the draft file 102. The fractionation may, for example, determine linage (e.g., hard lines and/or soft lines), visual depth, perspective, color, color saturation, hue, texture, and/or other properties intended to be communicated visually and/or pronounced within the draft file 102.

Operation 706 may generate latent representations (e.g., the latent representations 407) corresponding to the text descriptions 134. In one or more embodiments, one or more letters, words, phrases, and/or sentences of the text description (as may be decoded) may be linked with one or more latent representations that can be utilized for "AI" image generation. The algorithm and/or model providing the association may be general (e.g., useful for a wide ranch of natural language), or may be specific (e.g., utilize common words, concepts, and phrases from the apparel, art, and/or fashion arts). For example, text description 134 or portion thereof may be parsed and input into a text-image relation model 404, where the latent representations 407 may be extracted for use from the complete set of latent representations 405 of the text-image relation model 404. Alternatively, or in addition, operation 706 may associate one or more words or phrases of the text description 134 with one or more images that are usable to influence the output of the generative image model 408, according to one or more embodiments.

Operation 708 identifies and/or segments apparel items, apparel elements, and/or apparel materials. For example, one or more recognition algorithms may be utilized to identify, segment, and bound apparel items. Computer vision models, including those utilizing artificial neural networks trained using machine learning techniques known in the art (e.g., supervised or unsupervised learning) may be utilized to identify, bound, and/or segment the apparel items, apparel elements, and/or apparel materials. In one or more embodiments, one or more files specifying the identification and/or boundaries (e.g., a segmentation file 334) may be output and stored. In one or more embodiments, the segmentation file 334 may be implemented as an image file, a mask file (e.g., a black and white image), and/or a spatial probability map file (e.g., which may be visually represented in greyscale or heatmap).

Operation 710 may authorize and/or load controlled model specialization data. For example, the user 101 and/or the device 200 initiating a generation request 206 may request access to and/or authorization to access data usable to influence the text-image relation model 404 and/or the generative image model 408. In one or more embodiments, the specialization data may include: textures; colors (e.g., Pantone® colors); libraries of images or latent representations of existing apparel items or fashion brands; libraries of images or latent representations of materials, patterns or textures; text descriptions 134 or portions thereof (e.g., specific text descriptions 134 useful for generating art deco design, text descriptions 134 carefully crafted to provide a Victorian era influence for costume design, etc.); and/or adaptation tuning models (e.g., such as LoRAs). In one or more embodiments, operation 710 also may be utilized to authorize access to a particular text-image relation model 404 and/or generative image model 408.

Operation 712 may parameterize a generative image model 408. The parameters may include all inputs to the generative image model 408 necessary to produce an output image (e.g., the rendering file 104), and any additional optional inputs. Operation 712 may include receive both selected parameters (e.g., from the user 101), automatically set parameters (e.g., in response to detection of a certain property or quality of the draft file 102), and/or by default (e.g., the same for all instances of the draft file 102 unless specifically overwritten). Operation 712 may vary depending on the generative image model 408 selected. The parameters may include the model parameters 161. In one or more embodiments, the model parameters 161 may include a generative seed 162, a convolutional step value 163, a quality value 164, a sampler model reference 165, a denoise algorithm reference 166, and/or a constraint divergence value 167.

Operation 714 may generate the rendering file 104. For example, each of the parameters and all other necessary and optional inputs may be provided to the generative image model 408, along with an instruction to execute. Necessary input will generally depend on the target generative image model 408. The rendering file 104 may be help in computing memory and/or stored. The rendering file 104 may then be returned for review to the user 101 and/or the device 200 of the user 101. As a result, the user 101 may have rendered and/or visualized (e.g., in photorealism) the user's first initial sketch, design art, concept art, and/or other unfinished design.

Operation 716 may re-render one or more segmented apparel items, segmented apparel elements, and/or segmented apparel materials. For example, for a draft file 102 having both a shirt and pants, the user 101 may view the rendering and be satisfied with the rendering of the shirt, but not like the rendering of the pants. The user 101 may select a segmentation identifying the pants (and/or manually draw boundaries for re-rendering). In another example, a jacket may be comprised of both brown and black leather. The user 101 may wish to re-render the portions of black leather such that they have the same luster of the brown leather. Alternatively, or in addition, one or more additional identification models may be executed on and/or against the rendering file 104 to determine quality, consistency, and/or other desired properties. As one example, a model may be executed to recognize consistent shadowing from perceived light sources within the image, and/or realistic fabric wrinkling. Following selection, the selected portion of the rendering file 104 and/or the draft file 102 may be re-submitted for rendering, for example repeating the processes of operation 700 through 714. The re-rendered image may be presented to the user 101. In one or more embodiments, each re-rendered instance may be stored as a separate image to allow for rapid comparison. In one or more embodiments, each re-rendered instance may only store the re-rendered portion, which may save computing memory, where an application (e.g., the generative image review interface 208, Photoshop®, etc.) may be able to overlay and/or non-destructively combine the image files into a whole for review (e.g., layers within Photoshop®).

Operation 718 may store the rendering file 104 and/or data, optionally within a graph data structure 109. The graph data structure 109 may be a graph data structure in which nodes 110 and directed edges 113 may model the collection of inputs and outputs to the generative image model 408. In one or more embodiments, each change to the parameters for a session or project may be independently logged such as to create a "non-destructive" editing and revision process. Similarly, the output can be re-rendered upon re-running the generative model. The storage of the description of all necessary information utilized to generate the rendering file 104 may additionally assist in tracking intellectual property rights (both those going into the rendering file 104 and those resulting from the rendering file 104), rights of publicity, moral rights, attribution rights, authorized use rights (e.g., of controlled libraries 506), and/or other legal rights and obligations. The storage of the graph data structure 109 may also enable easy collaboration between multiple instances of the user 101 (e.g., two designers working together), as each may be able to access and instantiate the data therein.

Although the draft file 102 is specified in FIG. 7, it will be recognized that the rendering file 104 also may be re-rendered through a process similar or identical to that illustrated in FIG. 7.

FIG. 8 illustrates a generative design render process flow 850A, according to one or more embodiments. Operation 800 receives a draft file 102, which includes an image of one or more apparel items. The draft file 102, for example, may be received on a server from a client device 200 over the network 103. Operation 802 receives a text description 134 of the apparel items (which may optionally include description of apparel elements and/or apparel materials). Operation 804 may then select a text-image relation model 404 that relates text (e.g., an alphanumeric string) to data usable to influence image generation, for example a set of latent representations (e.g., the latent representations 405 of FIG. 4). In one or more embodiments, operation 804 may select the text-image relation model 404 based on the access rights of the user 101, the text description 134, the draft file 102, and/or other aspects related to a generation request 206 or context therefrom. Operation 806 selects a generative image model 408. The generative image model 408 may be similarly manually selected, and/or selected based on the access rights of the user 101, the text description 134, the draft file 102 and/or other aspects related to a generation request 206. The selected text-image relation model 404 and the generative image model 408 may be automatically checked for compatibility, and/or one may be at least partially selected based on compatibility with the other.

Figure 12:
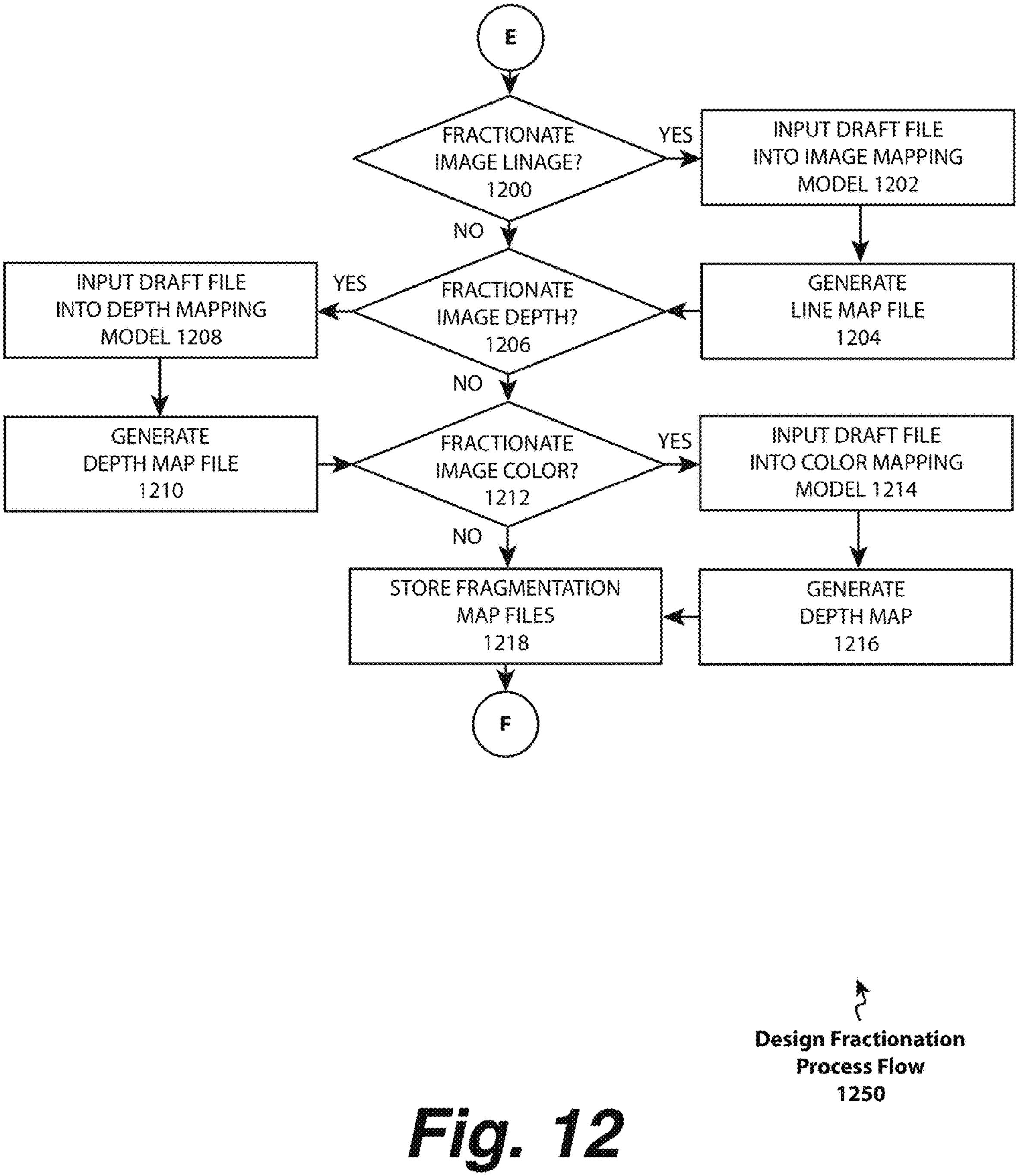
FIG. 12 illustrates a design fractionation process flow, according to one or more embodiments.

Operation 808 determines whether to fractionate the draft file 102, in which case operation 808 may proceed along path 'Circle E' to the process flow of FIG. 12. If no fractionation is to occur, operation 808 may proceed to operation 810. Operation 810 parameterizes the generative image model 408. The parameterization may gather all necessary and optional inputs for generating the rendering file 104. The necessary inputs vary for each instance of the generative image model 408, but may include the draft file 102 or data derived therefrom, a previous instance of the rendering file 104 or data derived therefrom, one or more fractionation map files 630, one or more of the parameters from the parameterization data, e.g., within the model parameters 161, and/or other data.

Operation 812 may generate one or more latent representations 407 (or other images usable by the generative image model 408) from the text description 134. In one or more embodiments, operation 812 may generate the latent representations 405 from a text-image relation model 404, for example a CLIP. Operation 812 then proceeds along path 'Circle X' to the process flow of FIG. 8B.

Figure 8A:
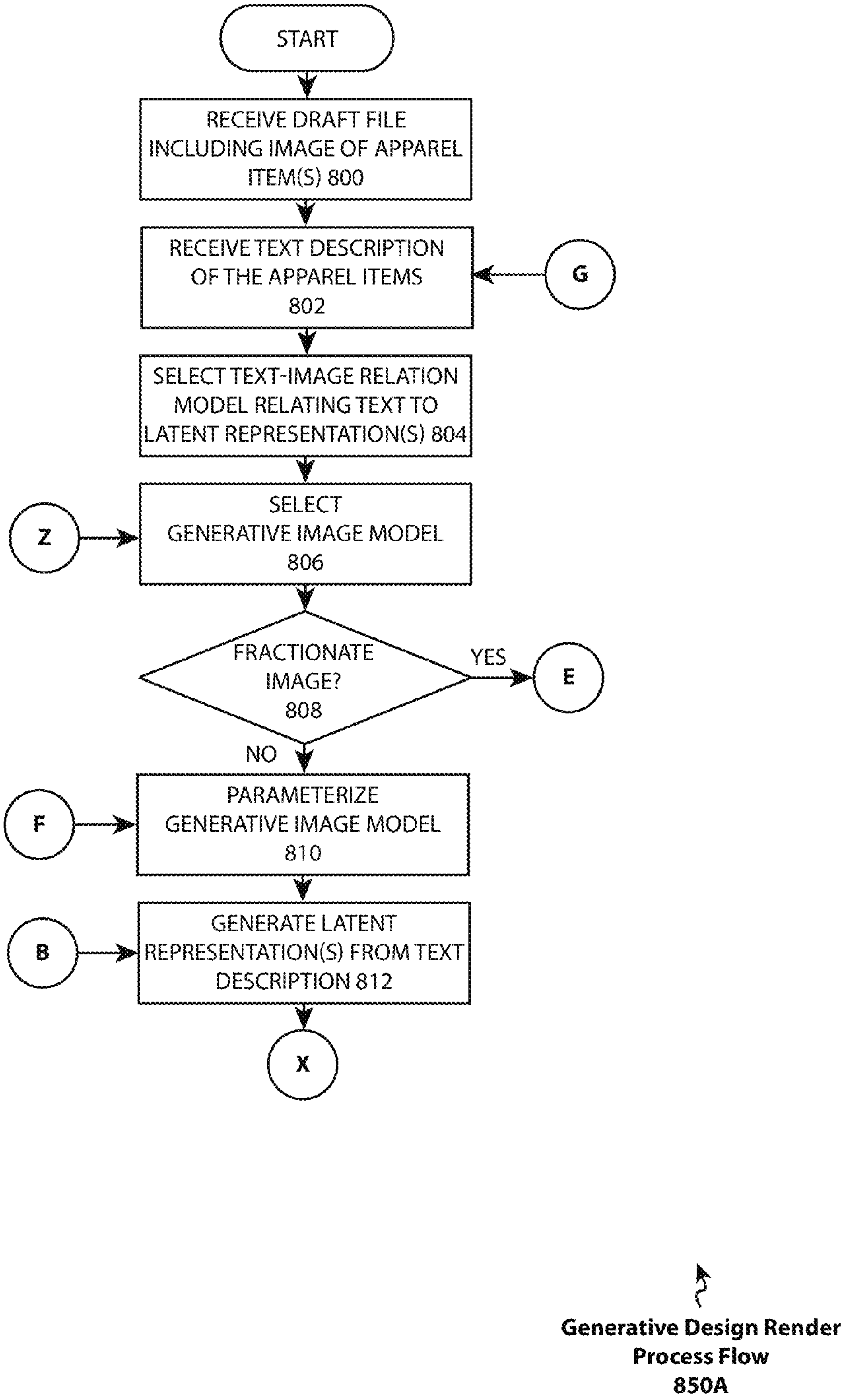
FIG. 8A illustrates a generative design render process flow, according to one or more embodiments.
Figure 8B:
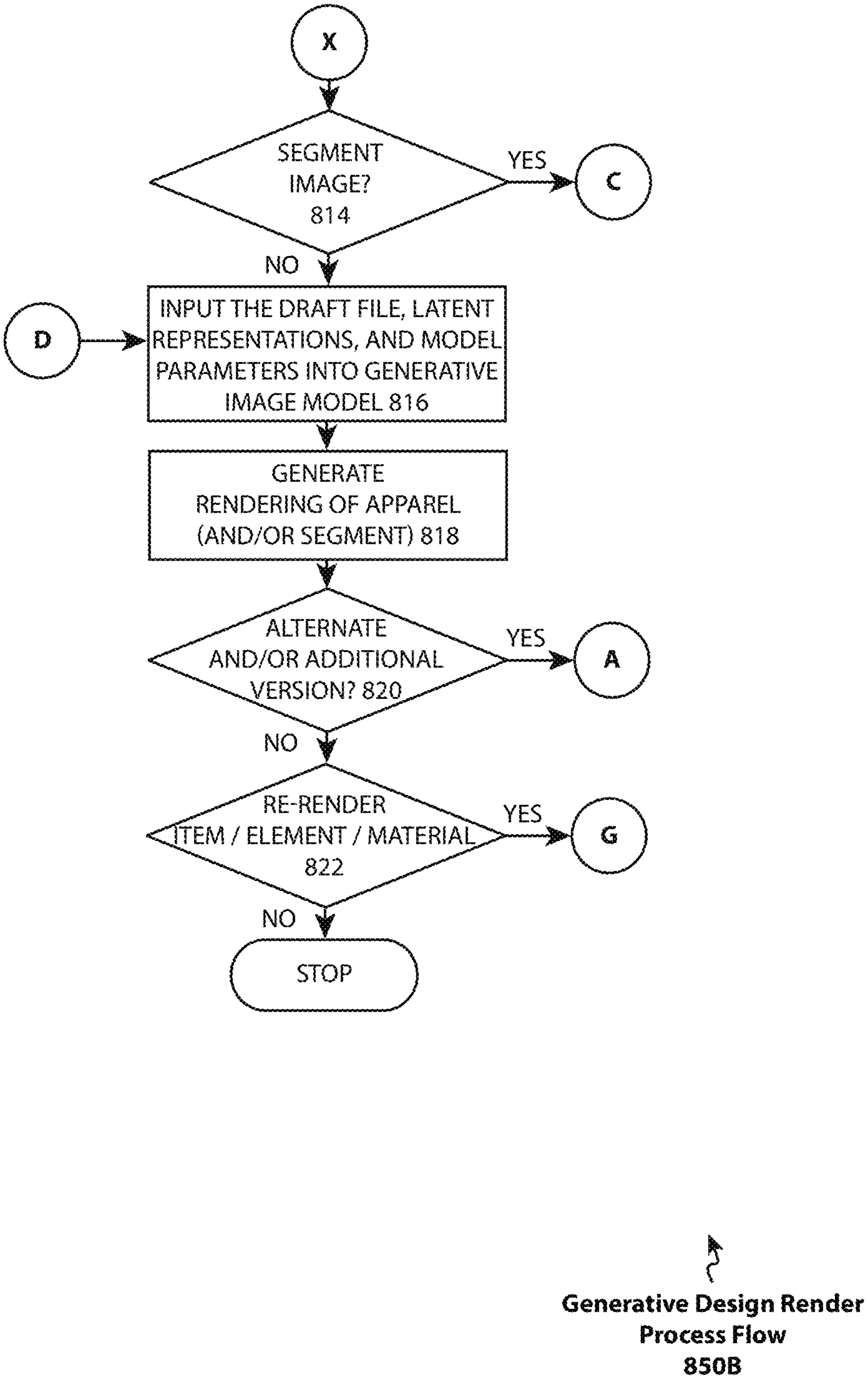
FIG. 8B illustrates a continuation of the generative design render process flow of FIG. 8A, according to one or more embodiments.

FIG. 8B illustrates a generative design render process flow 850B that may be a continuation of the process flow 850A of FIG. 8A, according to one or more embodiments. Operation 814 may determine whether the image (e.g., the draft file 102, the rendering file 104) should be segmented, for example into one or more recognized, bounded, and/or designated constituent parts. The constituents may be designed through a greyscale probability map (e.g., the probability the item is represented in various locations within the image) and/or a mask (e.g., which may be generated by establishing a probability threshold to create a clear delineation). Where segmentation is to occur, operation 814 may proceed along path 'Circle C' to the process flow of FIG. 10, and otherwise to operation 816.

Operation 816 may input the draft file 102 (and/or a previous rendering file 104), the latent representations 407, the model parameters 161, and/or other parameters into the generative image model 408. Operation 818 may then generate the rendering of the apparel item(s) included in the draft file 102 (and/or previous version of the rendering file 104). Alternatively, where a segment is being rendered during an iterative design process, as further described below, operation 818 may render the segment and/or advantageous transitions to the rest of the image. In one or more embodiments, operation 818 may result in creation and storage of one or more rendering files 104.

Operation 820 may determine whether an alternate and/or additional version of the rendering (e.g., the rendering file 104) should be produced. If an alternate or additional version of the rendering is to be produced, operation 820 may proceed along path 'Circle A' to the process flow of FIG. 9. If no alternate or additional version of the rendering is to be produced at the time of execution of operation 820, operation 820 may proceed to operation 822. Operation 822 may similarly determine whether to re-render an apparel item, an apparel element, and/or an apparel material, in which case operation 822 may proceed to operation 824. Operation 824 may proceed along path 'Circle G' to return to operation 802 of FIG. 8A, wherein each operations 802 through operation 822 may apply either to re-rendering the entire draft file 102 and/or just the selected segment. On a second iteration, it will be recognized that an even smaller constituent part (e.g., an apparel element, an apparel material within an apparel item or element) may be selected for re-rendering, etc.

If no re-render is to occur, operation 822 may end, optionally storing any data used in generation of the rendering for later reuse, modification, and/or tracking, for example through storage of the nodes 110 of the graph data structure 109.

Figure 9:
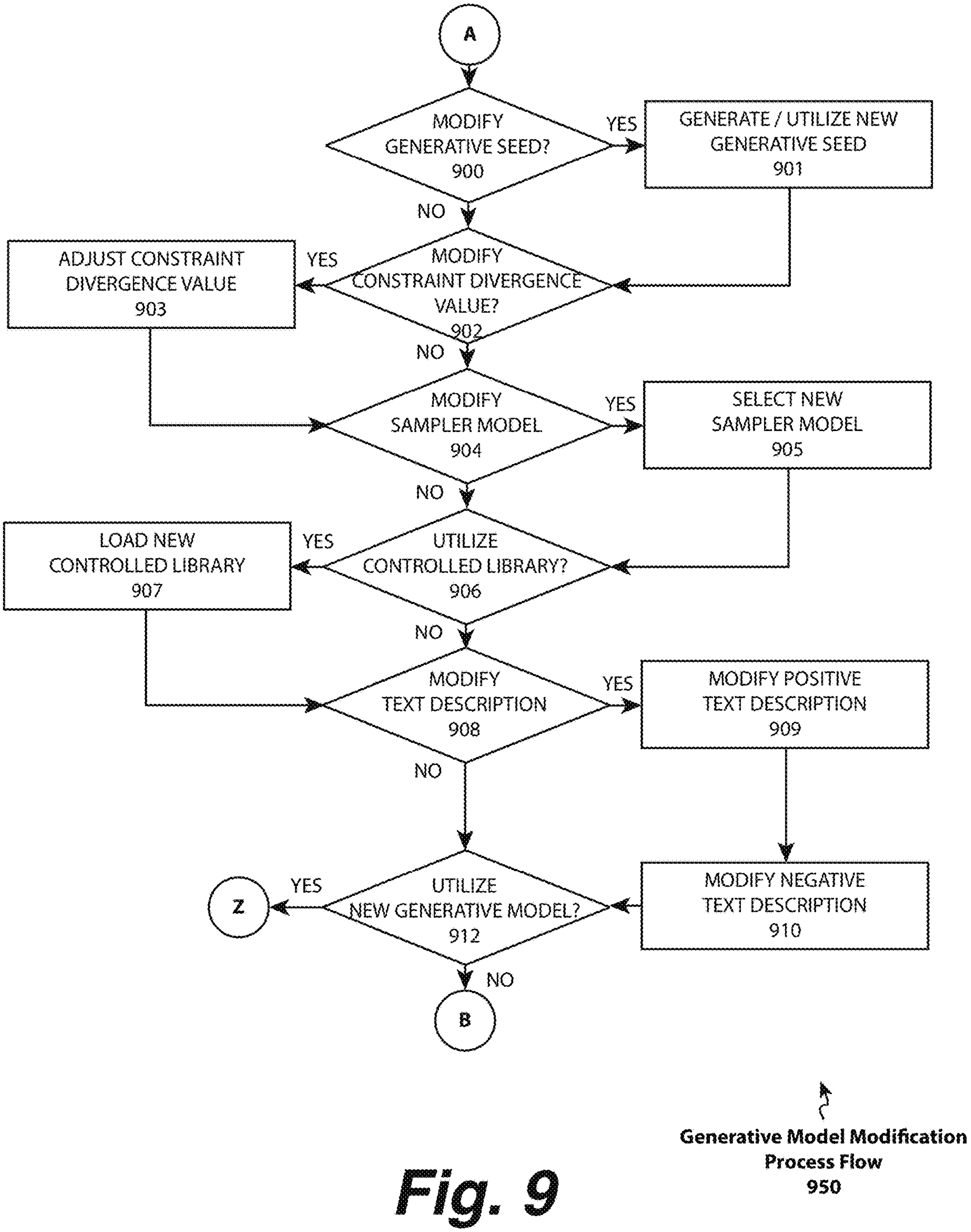
FIG. 9 illustrates a generative model modification process flow, according to one or more embodiments.

FIG. 9 illustrates a generative model modification process flow 950, according to one or more embodiments. The process flow 950 may initiate at operation 900, and/or may continue from a different process flow, for example along path 'Circle A' from operation 820 of FIG. 8B. Process flow 950 may be utilized, for example, to iteratively render, redesign, and/or modify the draft file 102 and/or the rendering file 104, according to one or more embodiments.

Operation 900 may determine whether to modify a generative seed (e.g., the generative seed 162). For example, the user 101 may want all other parameters to stay the same, but re-run the generative image model 408 with a different source of randomness and/or entropy. For some instances of the generative image model 408 this may yield significantly different results in the rendering file 104, whereas for other instances of the generative image model 408 this may yield only mildly different results. If the generative seed 162 is to be modified, operation 900 may proceed to operation 901 which may generate and/or utilize a new instance of the generative seed 162 (e.g., a generative seed 162B). Operation 901 may then proceed to operation 902. If no modification of the generative seed 162 is to occur, operation 900 may also proceed to operation 902.

Operation 902 determines whether to modify the constraint divergence value (e.g., the constraint divergence value 167). For example, the user 101 may desire for the generative image model 408 and the algorithms responsible for its application to execute and/or operate with a greater (or lesser) degree of freedom and "creativity". If the constraint divergence value 167 is to be modified, operation 902 may proceed to operation 903 which may adjust the constraint divergence value 167 (e.g., to a higher or lower value). Operation 903 may then proceed to operation 904. If no modification of the constraint divergence value 167 is to occur, operation 902 may also proceed to operation 904.

Operation 904 may determine whether to modify the sampler model (e.g., the sampler model referenced in the sampler model reference 165). For example, the user 101 may desire for the generative image model 408 to apply a different sampling method of the draft file 102, or data derived therefrom, the rendering file 104 then re-submitted for rendering, and/or segmentations thereof, which may affect the resulting rendering file 104. For example, the user 101 may decide to switch from a first instance of the sampler model (e.g., DPM++ 2M SDE) to a different version of the sampler model (e.g., Euler A) in order to produce different quality images or image variation depending on the need of the model employed. If the sampler model is to be modified, operation 904 may proceed to operation 905 which may select and/or receive a selection of an updated sampler model. Operation 905 may then proceed to operation 906. If no change to the sampler model is to occur, operation 904 may also proceed to operation 906.

Operation 906 may whether to utilize a new and/or different authorized library (e.g., one or more of the controlled libraries 506). For example, the user 101 may desire to utilize proprietary assets to increase the quality of an initial render, and/or switch which proprietary assets the user 101 is utilizing. Where new and/or different authorized assets are to be utilized, operation 906 may proceed to operation 907, which may load a new or additional controlled library 506 or portion thereof. For example, to render a particular apparel material in high definition, operation 907 may query and load data associated with a material UID 512 of a collection UID 507 of an apparel material profile. Operation 907 may then proceed to operation 908. If no new and/or additional controlled library 506 or portion thereof is to be utilized, operation 907 may also proceed to operation 908.

Operation 908 determines whether to modify the text description 134 (e.g., which may include either the positive description 136 and/or the negative description 138). In one or more embodiments, and depending on the text-image relation model 404, the text description 134 may have a large impact on the quality of output rendering file 104, and therefore a user 101 may wish to adjust, and iterate and/or "engineer", the text description 134. If the text description 134 is to be modified, operation 908 may proceed to operation 909 and operation 910 which may modify the text description 134, first potentially modifying the positive description 136 (operation 909) and then the negative description (operation 910), or vice versa. For example, the user 101 may add or remove text, rearrange text, and/or copy and paste new text. In one or more embodiments, operation 906 may load a text description (e.g., the description text 524), which the user 101 may then review, modify, and/or commit in operation 909 and operation 910. Operation 910 may then proceed to operation 910. If no modification text description 134 is to occur, operation 910 may also proceed to operation 912.

Operation 912 may determine if a different instance of the generative image model 408 is to be utilized with the modified input parameters. If a new generative image model 408 is to be utilized, operation 912 may proceed along path 'Circle Z' to operation 806 of FIG. 8A. If the same generative image model 408 is to be utilized, operation 912 may return to operation 812 of FIG. 8A along path 'Circle B'.

In one or more embodiments, and of the modifications, alternations, and/or edits to input parameters occurring in process flow 950 may be individually and "non-destructively" tracked through use of the graph data structure 109 and alternative nodes thereof. As just one example, execution of operation 905 may result in generation of an alternative image generation model node 160 (e.g., an image generation node 160B).

Figure 10:
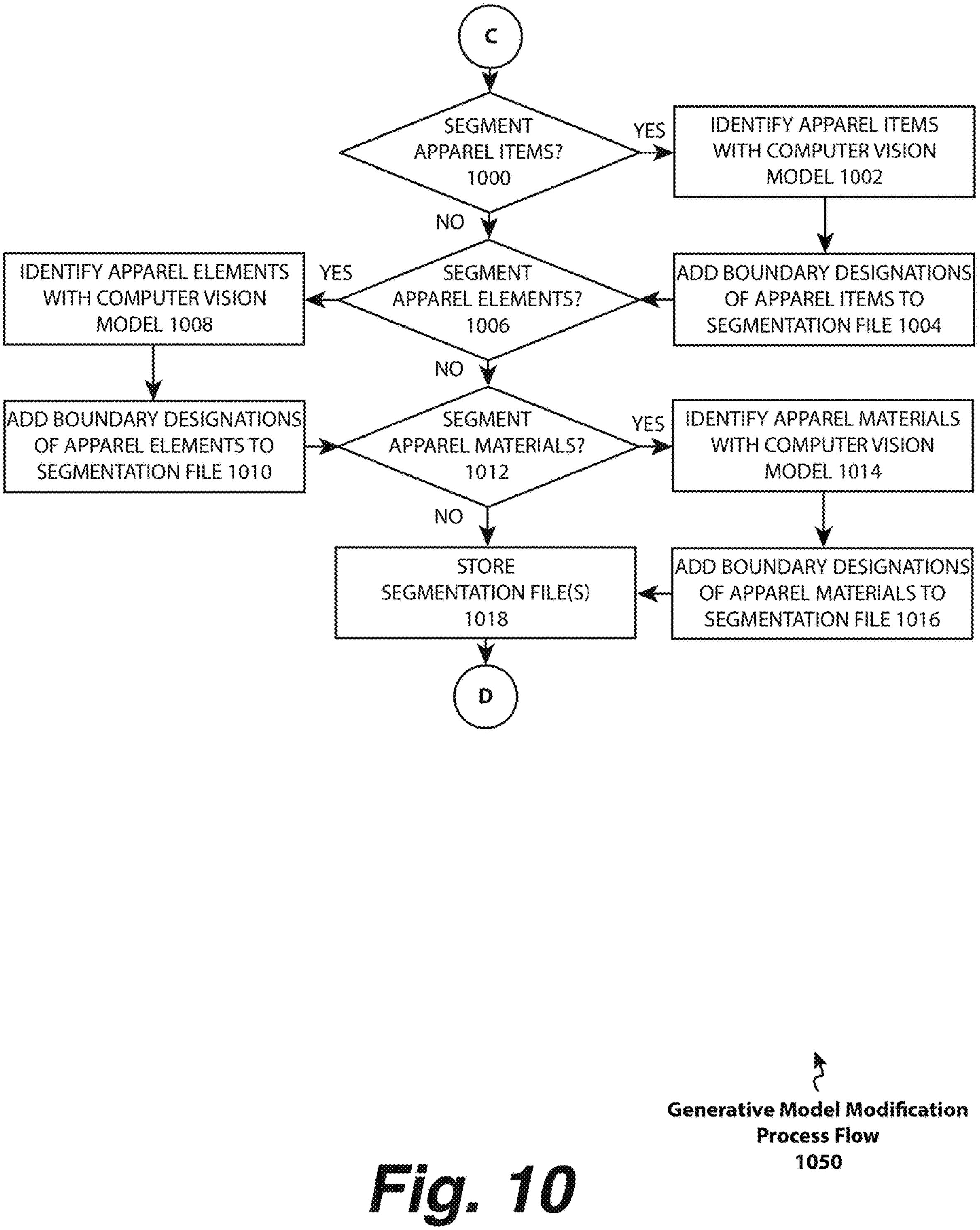
FIG. 10 illustrates an apparel segmentation process flow, according to one or more embodiments.

FIG. 10 illustrates an apparel segmentation process flow 1050, according to one or more embodiments. The process flow 1050 may initiate at operation 1000, or may continue along path 'Circle C' from operation 814 of process flow 850B. Operation 1000 determines whether one or more apparel items should be segmented. An apparel item may be a discrete piece of wearable clothing, such as a shirt, a jacket, scarf, cape, shawl, a pair of pants, a pair of shorts, a sock, a hat, and/or another item. If segmentation of an apparel item should occur, operation 1000 may proceed to operation 1002 which may identify one or more apparel items utilizing a computer vision model. The computer vision model may be trained on a training data set including a wide variety of apparel items, and/or may be a further specialized computer vision model for certain types of apparel items (e.g., formalwear, dresses, footwear, bathing suites). Operation 1002 may then proceed to operation 1004, which may add boundary designates (e.g., vectorized boundaries, raster outlines) to the apparel items within a segmentation file 334. Operation 1004 may then proceed to operation 1006.

Operation 1006 may determine whether apparel elements are to be segmented. If apparel elements are to be segmented, operation 1006 may proceed to operation 1008. It should be noted that segmentation may not segment apparel items, yet segment apparel elements, for example where operation 1000 proceeds to operation 1006. Operation 1006 may operate similar to operation 1002, but may identify apparel elements. Operation 1006 may utilize the same computer vision model as operation 1002, and/or a different computer vision model specialized to recognition of apparel elements. Operation 1008 may then proceed to operation 1010, which may, similar to operation 1004, bound designation of apparel elements to the segmentation file 334 (or a different instance of the segmentation file 334). Operation 1010 may then proceed to operation 1012.

Operation 1012 may determine whether apparel materials should be segmented. The determination may be made automatically (e.g., detection of more than one garment) and/or may be made manually based on input of the user 101. If apparel materials should be segmented, operation 1012 may proceed to operation 1014. Operation 1014 may identify apparel materials with a computer vision model.

The computer vision model may the same as employed in operation 1002 and/or operation 1008, or may be different. In one or more embodiments, the computer vision model of operation 1014 may be specially trained with material images training data. Operation 1014 may then proceed to operation 1016 which may bound designations of the apparel materials in the segmentation file 334 (and/or a different instance of the segmentation file 334). Operation 1016 may then proceed to operation 1018.

Operation 1018 may store the one or more segmentation files 334. As a result, the one or more segmentation files 334 will designate apparel items, apparel elements, and/or apparel materials, each of which may be bounded. Operation 1018 may then end, or proceed along path 'Circle D' to operation 816 of FIG. 8B.

In one or more embodiments, the boundaries may overlap. For example, the same type of material may be used by both a shirt and pants (e.g., a nylon track suit), such that the boundary designation for the apparel material surrounds both garments. However, in one or more other embodiments, and depending on an algorithm utilized to segment the image such as the draft file 102 and/or rendering file 104, apparel items, apparel elements, and apparel material may be hierarchically identified and/or designated. Such hierarchy may be explicitly and/or implicitly stored in the file, data structure, and/or computer memory. For example, a segmented apparel item may then be evaluated for components (e.g., apparel elements), but only within the boundaries of the segmented apparel item. Similarly, apparel materials may be determined for the apparel item, or, in the alternative, the apparel materials may be determined subsidiary to the apparel elements. Resulting layers of vector boundaries may be stored in ordered layers. In one or more other embodiments, the successive application of computer vision models trained in the recognition of increasingly specific and/or smaller scale recognition may naturally establish a hierarchy and/or other relationships between and among apparel items, apparel elements, and apparel materials. The hierarchy may be mapped, for example storing relations within the segmentation file 334. Although a computer vision model is shown and described in conjunction with operation 1002, operation 1008, and operation 1014, it will be recognized by one skilled in the art that additional algorithms and/or identification algorithms may be utilized to identifier the apparel items, apparel elements, and apparel materials, respectively.

Figure 11:
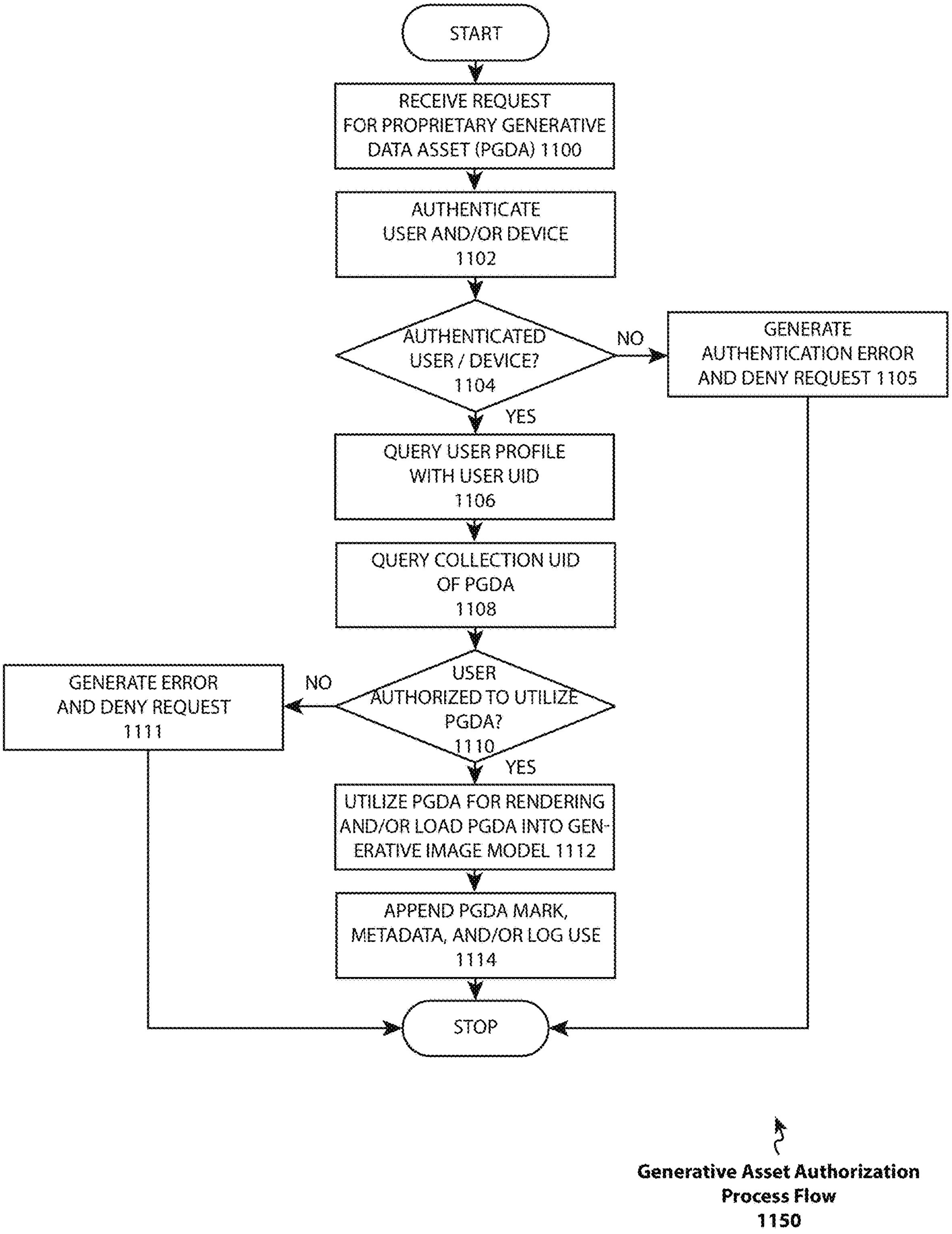
FIG. 11 illustrates a generative asset authorization process flow, according to one or more embodiments.

FIG. 11 illustrates a generative asset authorization process flow 1150, according to one or more embodiments. Operation 1100 may receive a request for a proprietary generative data asset, abbreviated herein as PGDA. The request for the PGDA may be received from a client device 200, for example during generation of and/or as a result of initiating the generation request 206. The proprietary generative data asset may include, for example, data or images with which visual consistency (or contrast) is to be maintained during generation of the rendering file 104. For example, a fashion brand may request that a design create a new outline, but render using existing patterns, style, and/or aesthetics of previous fashion lines to create continuity and/or consistency. In such case, the PGDA may include images, and/or latent representations, and/or adaptation models representing the previous apparel or fashion lines of the fashion brand. PGDA may also include proprietary profiles storing preset values for the model parameters 161. Other PGDA may include text-image relation models 404, generative image models 408, computer vision models, samplers, encoders, and/or other algorithms or models. In yet another example, PGDA may include data or models usable to render a real personality (e.g., a real celebrity) or AI personality (e.g., an AI generated influencer or synthetic personality) that may model the apparel as a subject, as may be authorized and/or approved to be rendered within the rendering file 104, according to one or more embodiments.

Operation 1102 may authenticate the user 101 and/or the device 200 from which the request for the PGDA was transmitted. Standard authentication techniques known in the art of computer science, including multifactor authentication, may be utilized to authenticate the user 101 and/or the device 200. In one or more embodiments, only certain instances of the device 200 (as may be verified through certificate and/or hardware token) may access and/or receive the PGDA, for example a workstation at a physical location, or a server running in a specific data center, e.g., for operational security purposes. Operation 1104 determines if authentication was successful, in which case operation 1104 may proceed to operation 1106. If the user 101 and/or the device 200 was not able to be authenticated, operation 1104 may proceed to operation 1105. Operation 1105 may generate an authentication error, and therefore deny the request for the PGDA.

Operation 1106 may query a user profile (e.g., the user profile 559) associated with the PGDA request. For example, the request for the PGDA may include a user UID (e.g., the user UID 551) which may be used to address the user profile 559. Operation 1108 may then query a collection UID of the PGDA, for example the collection UID 507 of the material image library 510, the collection UID 507 of the text description library 520, and/or the collection UID 507 of the tuning model library 530. Other types of PGDA may be similarly organized and stored in collections which may be addressed through a collection UID 507, including for example proprietary text-image relation models 404, generative image models 408, etc.

Operation 1110 may then determine if the user profile 559 (e.g., associated with the user 101 and/or device 200 generating the request for the PGDA) is authorized to utilize the PGDA. For example, data within the user profile 559 and/or reference by the user profile 559 may be compared with data within the collection profile and/or referenced by the collection profile. In one or more embodiments, operation 1110 may compare the user UID 551 to a permission database 540 to determine if the user UID 551 is associated with an access permission with respect to the collection UID 507 of the requested PGDA. If the user profile 559 is not authorized, operation 1110 may proceed to operation 1111 which may generate an error to deny the request. The error and/or the denial may be transmitted to the user 101 and/or the device 200. Operation 1111 may return to operation 1100 to generate a new and/or next authorization request, or may proceed to terminate.

If the user profile 559 is authorized to utilize the GPDA, operation 1110 may proceed to operation 1112. Operation 1112 may utilize the PGDA for rendering (e.g., generation of the rendering file 104) and/or load the PGDA into the generative image model 408 (where the PGDA is of a type to directly act as an input to the generative image model 408). Operation 1112 may then proceed to operation 1114.

Operation 1114 may append a PGDA mark within the image of the rendering file 104 and/or store metadata in the rendering file 104, and/or log use of the PGDA in a database. The logged use, in one or more embodiments, may occur in the graph data structure 109. Operation 1114 may append a mark or watermark to the rendering file 104, including without limitation a session number or tracking number. In one or more other embodiments, an "invisible" watermark or "hidden" data may be added, such that later copies of the image can be identified as originating from the user 101 and/or the user profile 559. One or more techniques known in the art of computer science and/or steganography may be utilized to mark the rendering file 104, for example to place imperceivable data that can be re-extracted in a JPEG image. This may assist in controlling the PGDA, constraining the unlimited use of generative AI models without permission to access and use PGDA, and/or may help identify and/or determine the origin of misappropriation or counterfeiting. Operation 1114 may then end.

It will be recognized by one skilled in the art that the process flow 1150 may be utilized to authorize multiple aspects of input generation and model section in the embodiments of FIG. 8A through FIG. 10, and FIG. 12. For instance, segmentation models may be PGDA subject to authorization (e.g., operation 1002 and operation 1004 of FIG. 10), the generative image model 408 (e.g., selected in operation 806), and/or the fractionation models of FIG. 12.

FIG. 12 illustrates a design fractionation process flow 1250, according to one or more embodiments. The process flow 1250 may initiate at operation 1200, and/or may continue along path 'Circle E' from operation 808 of FIG. 8A, according to one or more embodiments. Operation 1200 may determine whether to fractionate image linage within the image, for example within the draft file 102 and/or the rendering file 104 that may be submitted for re-rendering. Where image linage is to be fractionated from the image, operation 1200 may proceed to operation 1202 which may input the draft file 102 (and/or the rendering file 104 submitted for re-rendering) into a linage mapping model (e.g., the linage mapping model 622). The linage mapping model 622 may be configured to trace and/or determine lines that may form boundaries or breaks between portions of the image. The linage mapping model 622, for example, may include a Canny edge detection ControlNet. Another example of the linage mapping model 622 includes HED edge detection (soft edge) ControlNet. Operation 1204 may then output the line map file (e.g., the line map file 632). In one or more embodiments, two or more linage mapping models 1202 may be generated for different hardness of line or starkness of transition. For example, operation 1202 and operation 1204 may generate a "hard" line map file 632 and a "soft" line map file 632, either or both of which may be used as inputs to the generative image model 408. Operation 1204 may then proceed to operation 1206.

Operation 1206 may determine whether to fractionate the image (e.g., the draft file 102 and/or the rendering file 104) for depth, in which case operation 1206 may proceed to operation 1208. Operation 1208 inputs the draft file 102 (and/or the rendering file 104) into a depth mapping model 624. The depth mapping model 624 may be configured to trace and/or determine perceived depth and/or distance from an observation perspective, especially relative to boundaries or breaks between portions of the image and/or along surfaces illustrated at various distances from the perspective of an observer within the image. The depth mapping model 624, for example, may include Depth estimation map ControlNet. Another example of the depth mapping model 624 includes Normal map estimation ControlNet. Operation 1210 may then output the depth map file (e.g., the depth map file 634). Operation 1210 may then proceed to operation 1212.

Operation 1212 may determine whether to fractionate the image (e.g., the draft file 102 and/or the rendering file 104) with respect to color. If a color fractionation is to be generated, operation 1212 may proceed to operation 1214. Operation 1214 inputs the draft file 102 (and/or the rendering file 104) into a color mapping model 626. The color mapping model 626 may be configured to trace and/or determine perceived location(s) of the same color, even when resulting from shadowed or well-lit portions. The color mapping model 626, for example, may include T2IAdapter_Style transfer adapter by ARC Lab by Tencent PCG®. Another example of the linage mapping model 622 includes Line Art Realistic. Operation 1214 may then output the color map file (e.g., the color map file 636). Operation 1214 may then proceed to operation 1216. Operation 1218 may store the fragmentation map files 630, temporarily or for long-term storage within the computer memory, including for example in association with the graph data structure 109, according to one or more embodiments. Operation 1218 may then end, or may proceed along path 'Circle F' to return to operation 810 of FIG. 8A.

Figure 13:
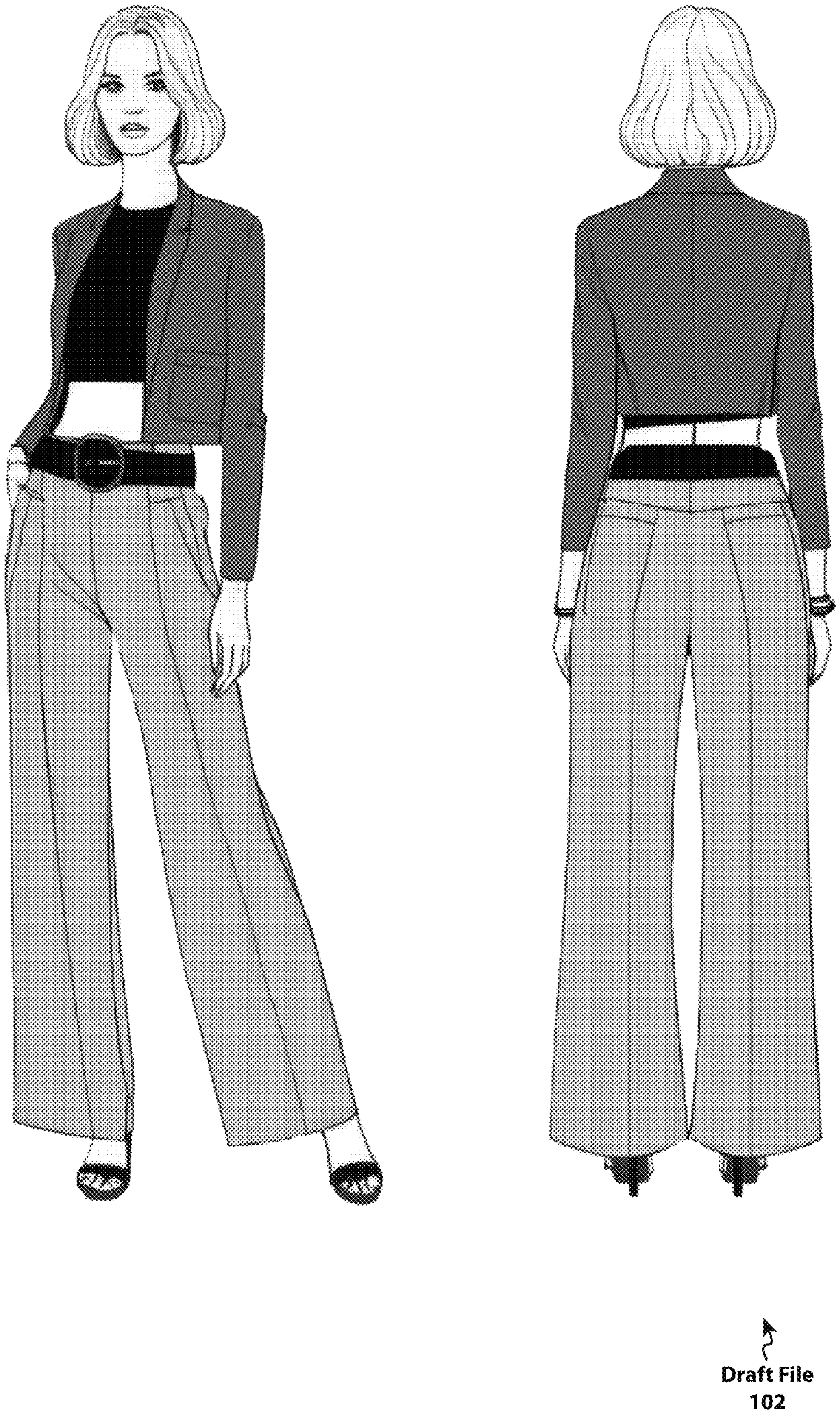
FIG. 13 illustrates an example sketch of apparel that when digitized may be stored as the draft file, according to one or more embodiments.

FIG. 13 illustrates an example sketch of apparel that when digitized may be stored as the draft file 102, according to one or more embodiments. The present example was hand-sketched by a human artist-designer using a mouse and keyboard in Adobe Illustrator. The draft file 102 was stored as a .png.

Figure 14:
FIG. 14 illustrates an example rendering file that was generated from the draft file of FIG. 13, according to one or more embodiments.

FIG. 14 illustrates an example rendering file 104 that was generated from the draft file 102 of FIG. 13, according to one or more embodiments. The rendering file 104 may assist the designer in numerous ways, for example helping the designer to prototype the sketched apparel, helping the designer to communicate to prototype manufacturers what the prototype should look like, helping sell the design to potential fashion brands, and/or gather feedback from manufacturers. The rendering file 104 may also help to gauge demand (e.g., if posted to internet platforms and/or social media), to drive presales if posted to e-commerce platforms or fundraising platforms, and/or may be useful for other distribution channels. The rendering file 104 illustrated in FIG. 14 may significantly speed the time required to visualize concepts, prototype, manufacture, and market apparel.

The rendering file 104 of FIG. 14 was generated through one or more of the present embodiments. First, the draft file 102 was fractionated into several fractionation map files 630, including two instances of the line map file 632 (e.g., a line map file 632A for soft lines, and a line map file 632B for hard lines) and a depth map file 634. A text description 134 was provided (e.g., by the user 101 describing their sketch and its constituent apparel items), along with a set of model parameters 161, as further shown and described in conjunction with the embodiment of FIG. 21. The text description 134 was provided to a text-image relation model 404, with the resulting outputs sent to the generative image model 408 as an input to the generative image model 408. Additional inputs to the generative image model 408 includes the draft file 102, the fractionation map files 630, and the model parameters 161, as further shown and described in conjunction with the embodiment of FIG. 21.

Figure 15A:
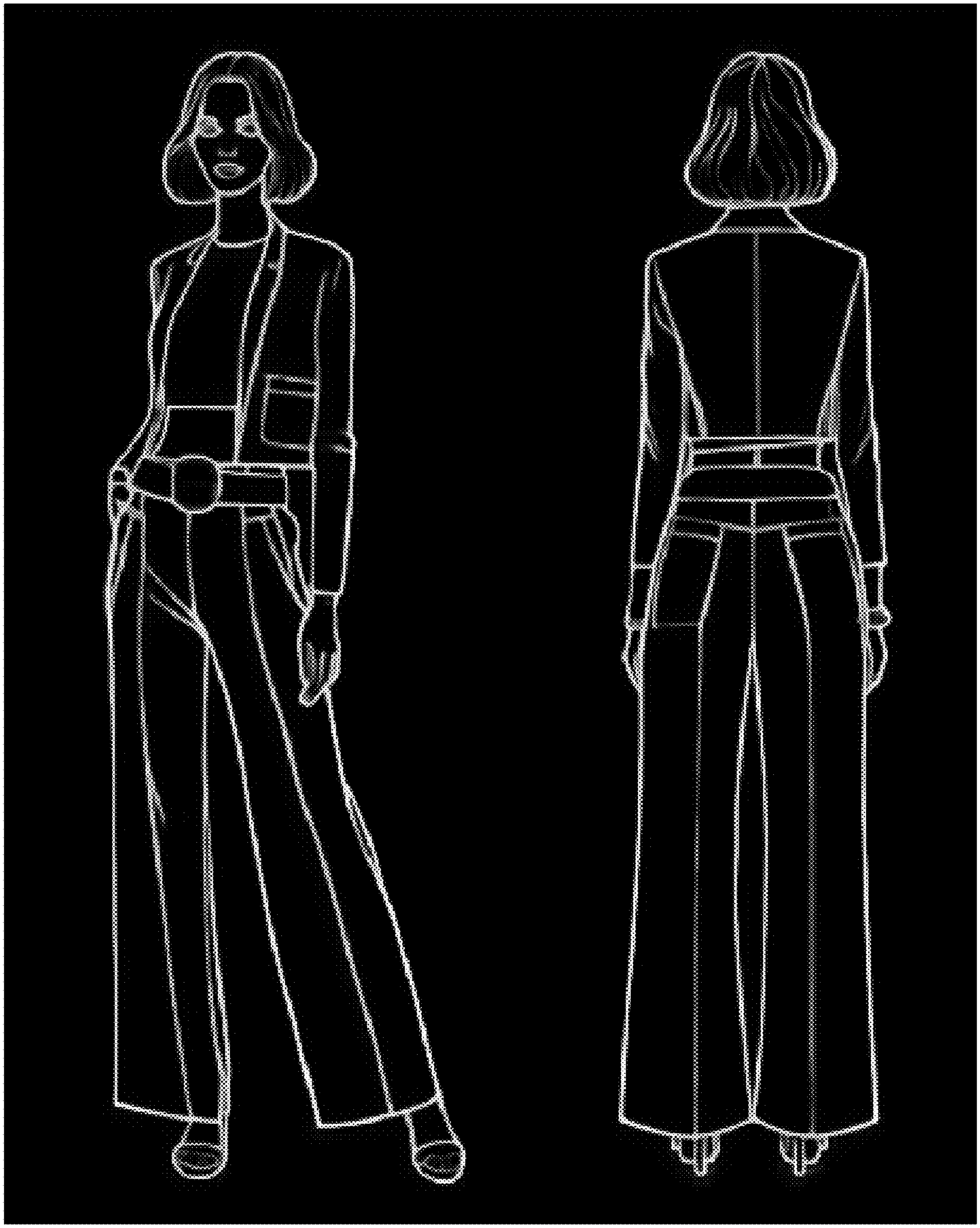
FIG. 15A illustrates an example line map file generated from a fractionation of the draft file of FIG. 13, and specifically a "soft edge" instance of the line map file, according to one or more embodiments.

FIG. 15A illustrates an example line map file 632 generated from a fractionation of the draft file of FIG. 13, and specifically a "soft edge" instance of the line map file 632A, according to one or more embodiments. The line map file 632A of FIG. 15A was generated utilized a HED edge detection (soft edge) ControlNet at a processor resolution of 2048px.

Figure 15B:
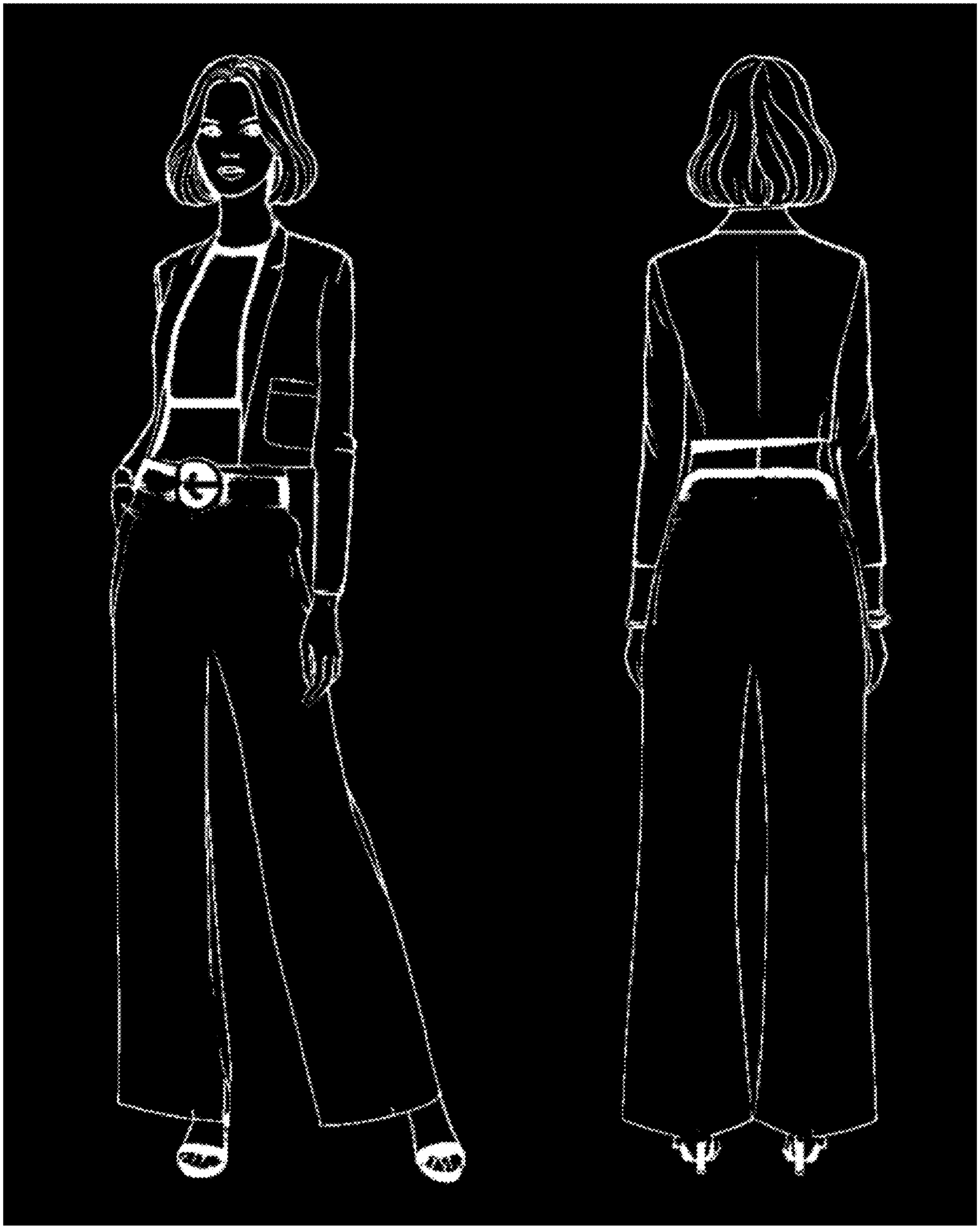
FIG. 15B illustrates another example line map file generated from a fractionation of the draft file of FIG. 13, and specifically a "hard edge" instance of the line map file, according to one or more embodiments.

FIG. 15B illustrates another example line map file 632 generated from a fractionation of the draft file of FIG. 13, and specifically a "hard edge" instance of the line map file 632B, according to one or more embodiments. The line map file 632A of FIG. 15B was generated with Canny edge detection map ControlNet at a preprocessor resolution of 2048px, a low threshold of 60 and high threshold of 100.

A soft edge detection provides some level of material detail, depth, and shape while still denoting separation of materials and planes. A canny edge detection or hard edge may primarily identify the boundaries of materials and shapes without providing any other visual information that the soft edge is capable of. Depending on whether one is used, the other is used, and/or a combination is utilized, particular patterns and shapes can be accentuated and the resulting images can drastically differ depending on the input.

Figure 16:
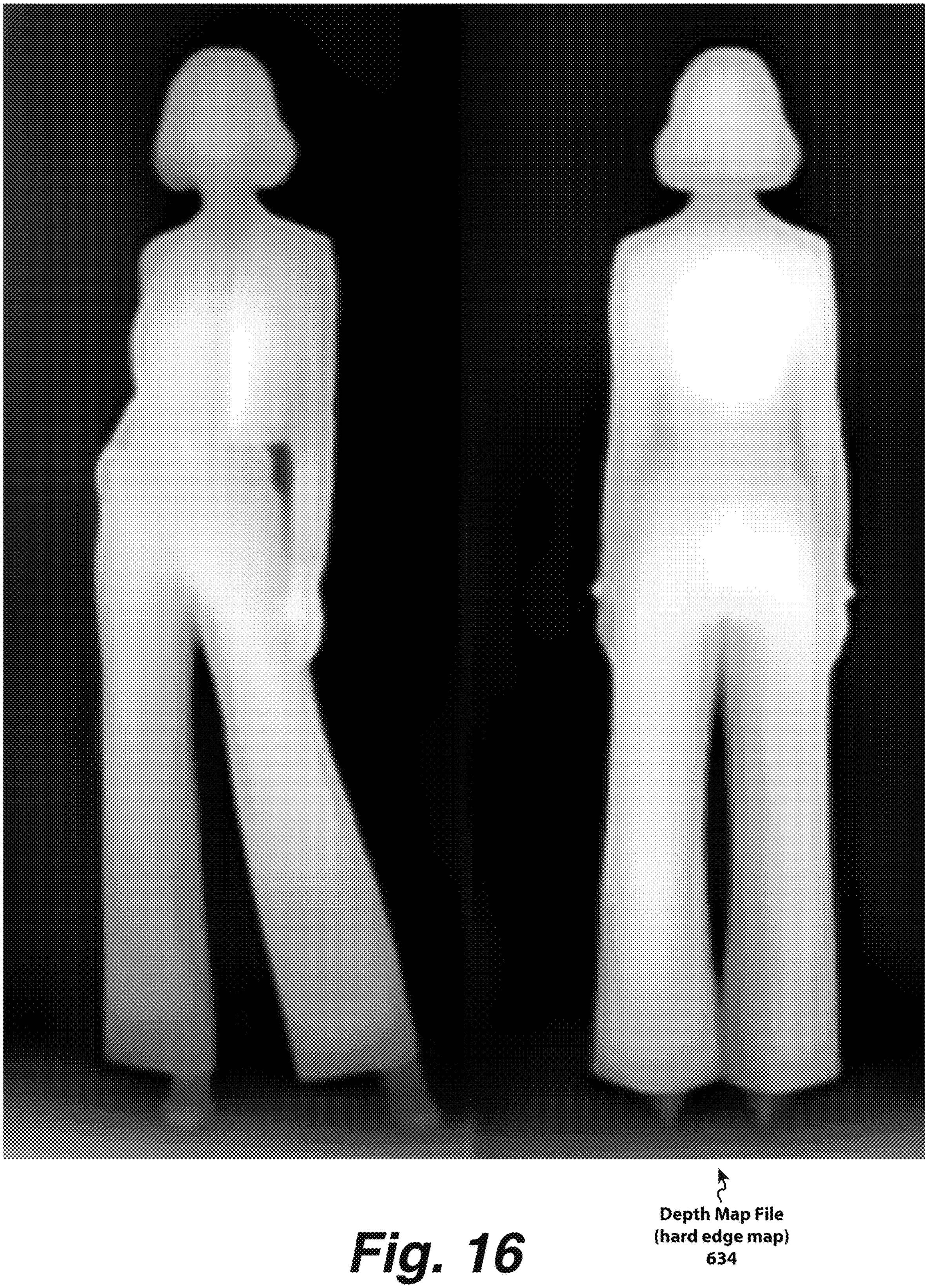
FIG. 16 illustrates an example of a depth map file generated from a fractionation of the draft file of FIG. 13, according to one or more embodiments.

FIG. 16 illustrates an example depth map file 634 generated from a fractionation of the draft file of FIG. 13, according to one or more embodiments. In the present example, the depth map file 634 may be a greyscale "heat-map", where light shades represent perceived nearer surfaces to a theoretical observer, and where dark shades represent perceived farther surfaces from a theoretical observer. In one or more embodiments, areas of the same shade may be approximately within the same perceived plane that is normal to the viewing direction of the theoretical observer of the image. The depth map file 634 of FIG. 16 was generated with Depth map estimation ControlNet and a Midas preprocessor resolution of 2048 px.

Figure 17:
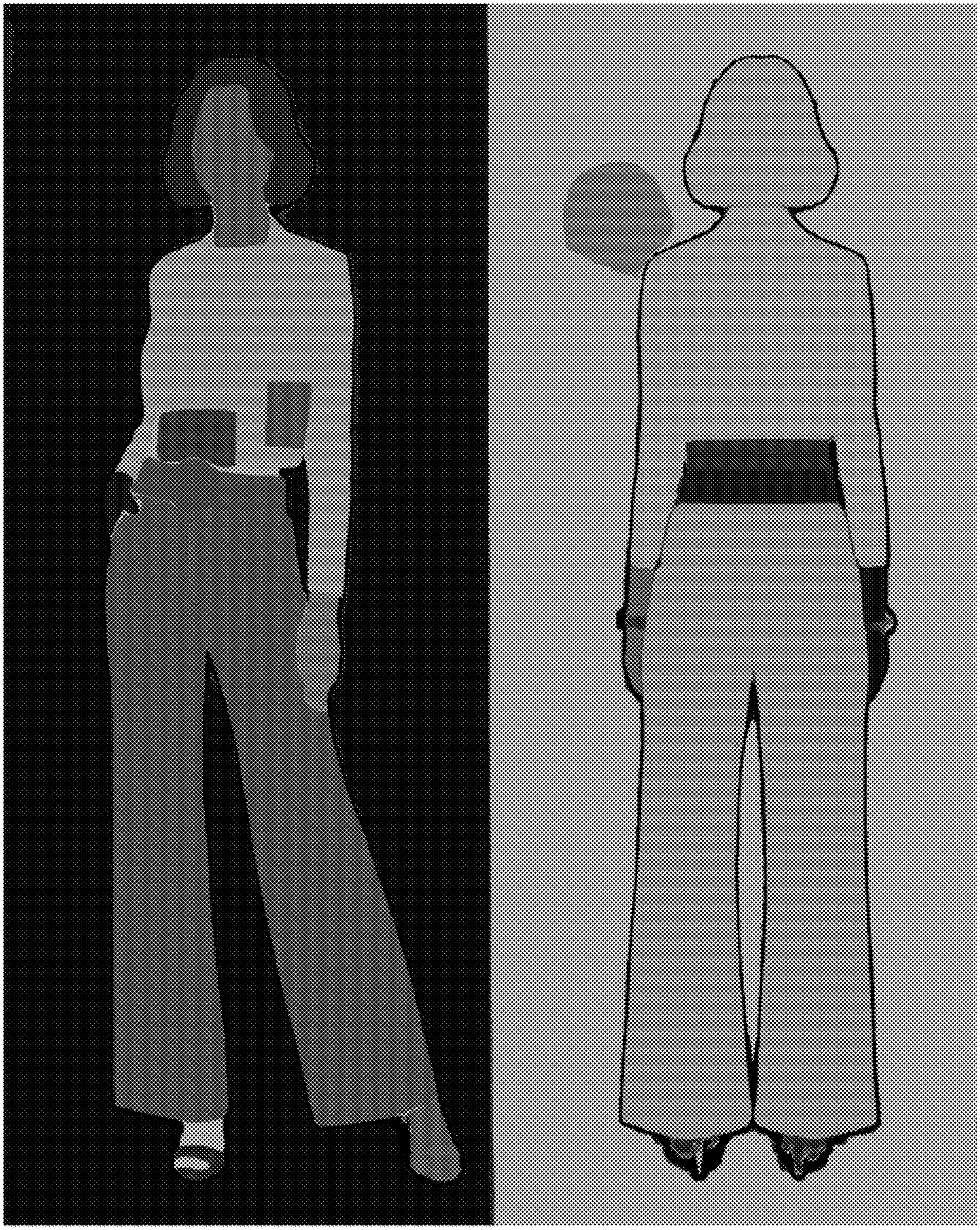
FIG. 17 illustrates an example color map file generated from a fractionation of the draft file of FIG. 13, according to one or more embodiments.

FIG. 17 illustrates an example color map file 636 generated from a fractionation of the draft file of FIG. 13, according to one or more embodiments. Although FIG. 17 may be reproduced in greyscale for printing, each shade may represent one of several colors identified within the color map file 636. Colors of similar saturation and/or hue may be group during identification, with additional compensation for darkened or lightened regions (e.g., a region of shadow, a region with direct light). Identification of the same color throughout an apparel item, apparel element, and/or apparel material may also assist in rendering correct shadows, shading, and/or lighting. For example, referencing the draft file 102 of FIG. 13, the color map file 636 identifying that the jacket and pants are each shown as uniform colors that can assist in accurate and consistent coloration of shadows cast by the wrinkles in each fabric. It should be noted that although the color map file 636 is shown for illustration purposes, the color map file 636 was not utilized as an input to the generative image model 408 in the present example.

Figure 18B:
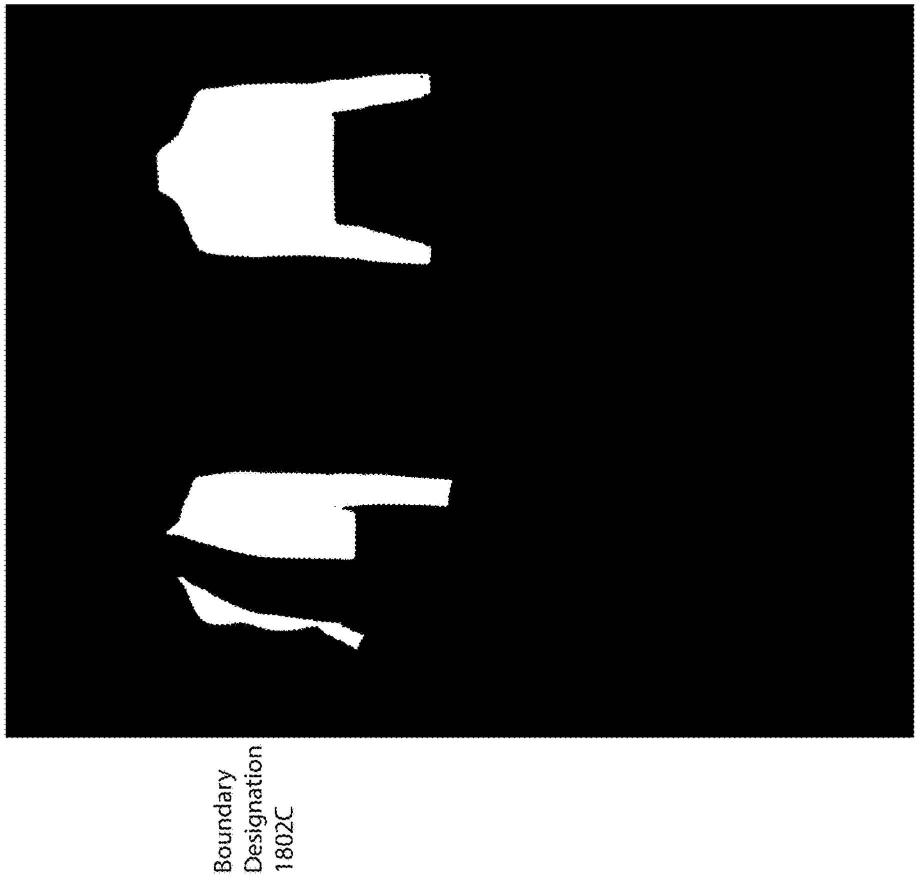
FIG. 18B illustrates a segmentation file of the segmentation of the jacket, and specifically implemented as a mask specifying boundaries of the segmentation that can be applied to select a portion of the rendering file, according to one or more embodiments.
Figure 18A:
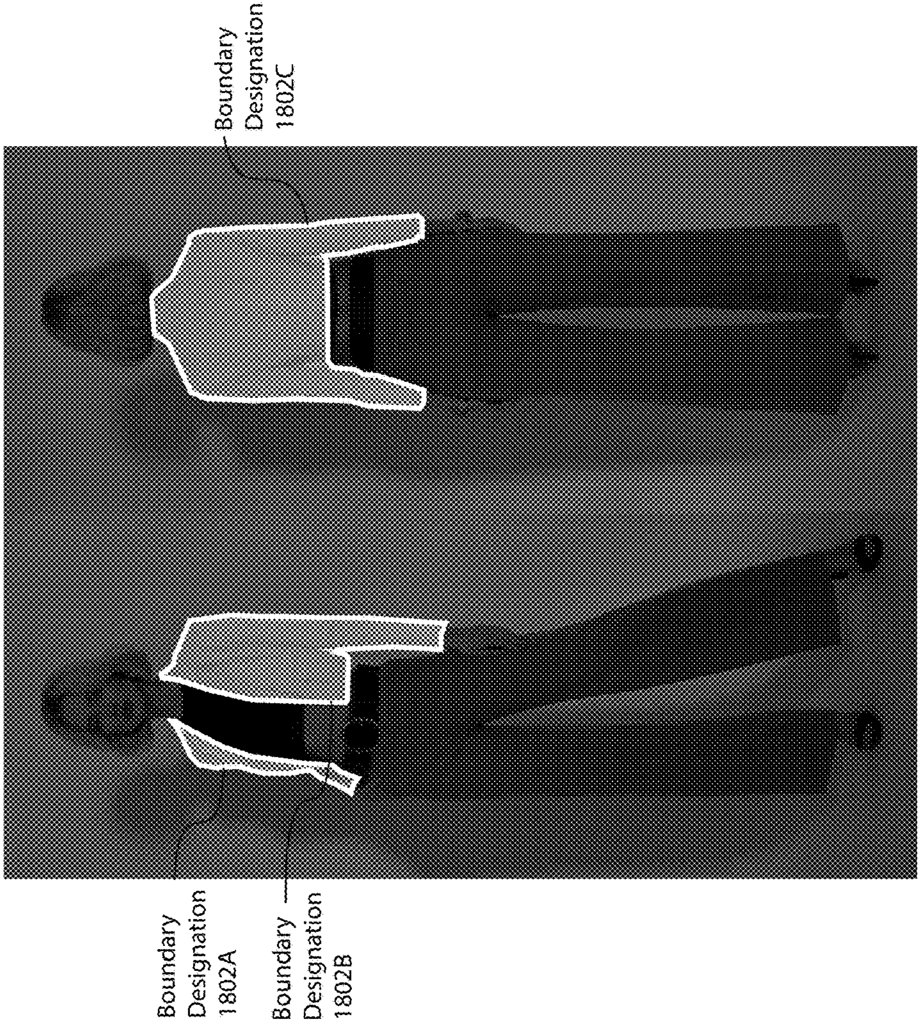
FIG. 18A illustrates an example apparel segmentation of the draft file of FIG. 13 and/or the rendering file of FIG. 14, and specifically illustrates identification of a jacket worn by the subject, according to one or more embodiments.

FIG. 18A illustrates an example apparel segmentation of the draft file 102 of FIG. 13 and/or the rendering file 104 of FIG. 14, and specifically illustrates identification of a jacket worn by the subject, according to one or more embodiments. FIG. 18A illustrates identification of the jacket worn by the subject, as may be identified through a trained computer vision model. FIG. 18A also visually illustrates the boundary designation 1802 for the jacket, specifically comprised of the boundary designation 1802A (a right-side of the jacket viewed from the front of the subject), the boundary designation 1802B (a left side of the jacket viewed from the front of the subject), and the boundary designation 1802C (the back of the jacket viewed from the back of the subject). Alternatively, or in addition, the user 101 may also manually specify the segmentation and boundary designations 1802. Similarly, the user 101 may adjust the boundaries after automated identification. Following identification, a segmentation file 334 may be stored, for example as shown and described in conjunction with the embodiment of FIG. 18B.

FIG. 18B illustrates a segmentation file 334 of the segmentation of the jacket (e.g., as an apparel item) worn by the subject, and specifically a segmentation file 334 including the boundary designations 1802 visually illustrated in FIG. 18A implemented and/or stored as a mask that can be applied to select a portion of the rendering file 104, according to one or more embodiments. The segmentation file 334 may be stored as a layer of data within the image (e.g., the rendering file 104), and/or as a separate file. The boundaries of the segmentation file 334 may be used to select a portion of the draft file 102 and/or the rendering file 104 to re-render, alter, generate an alternative version of, and/or apply data from a controlled library 506 to (e.g., a high-resolution fabric or fashion pattern, a custom prompt-engineered text description 134 for wedding dresses, etc.). The process to generate additional segmentation files 334 may continue for apparel items, and optionally apparel elements and apparel materials.

Figure 19:
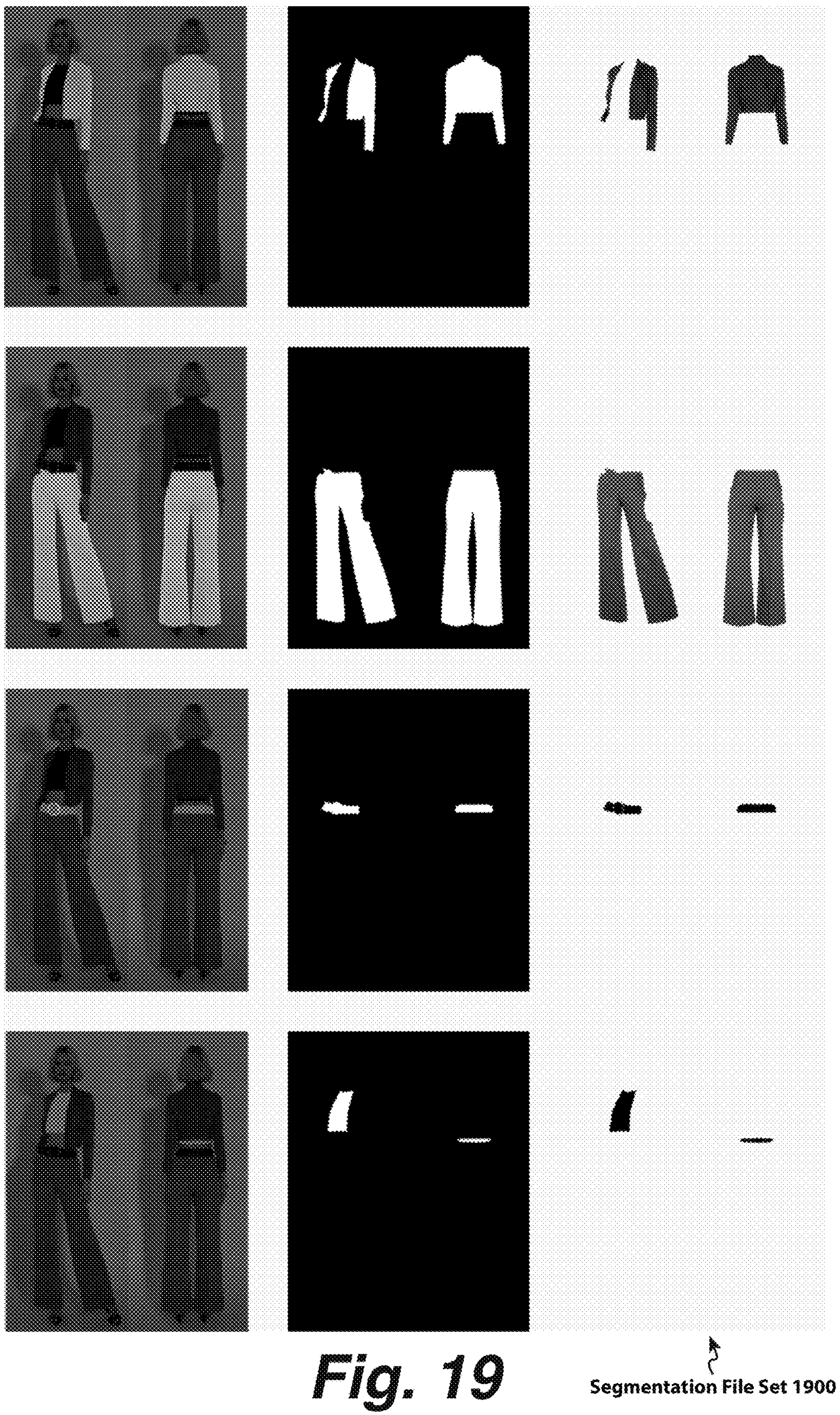
FIG. 19 illustrates a segmentation file set for the design of FIG. 13, for example segmenting the jacket, pants, belt, and shirt of the subject, according to one or more embodiments.

FIG. 19 illustrates a segmentation file set, for example demonstrating the continuing segmentation into the jacket, pants, belt, and shirt worn by the subject, according to one or more embodiments. As shown and described herein, multiple instances of the segmentation file 334 may define a boundary around an apparel item, an apparel element, and/or an apparel material.

Figure 20:
FIG. 20 illustrates an example rendering file that was generated as a re-rendering of the rending file of FIG. 14 in which the jacket was selected and its style and/or material changed by the user, according to one or more embodiments.

FIG. 20 illustrates an example rendering file 104B of FIG. 20 that was generated as a re-rendering of the rendering file 104A of FIG. 14 in which the jacket was selected and its style and/or material changed by the user, according to one or more embodiments. Specifically, and as further shown and described herein, the user 101 selected the jacket (e.g., as segmented in the segmentation file 334) of FIG. 18B and re-submitted the rendering file 104A for re-rendering, this time with a text description 134 matching only the intended style and/or text of the jacket (e.g., "maroon shag fur in vertical lines on the body and sleeves and horizontal lines on the collar"). In one or more alternative embodiments, the user 101 may select the material from the material image library 510.

Figure 21A:
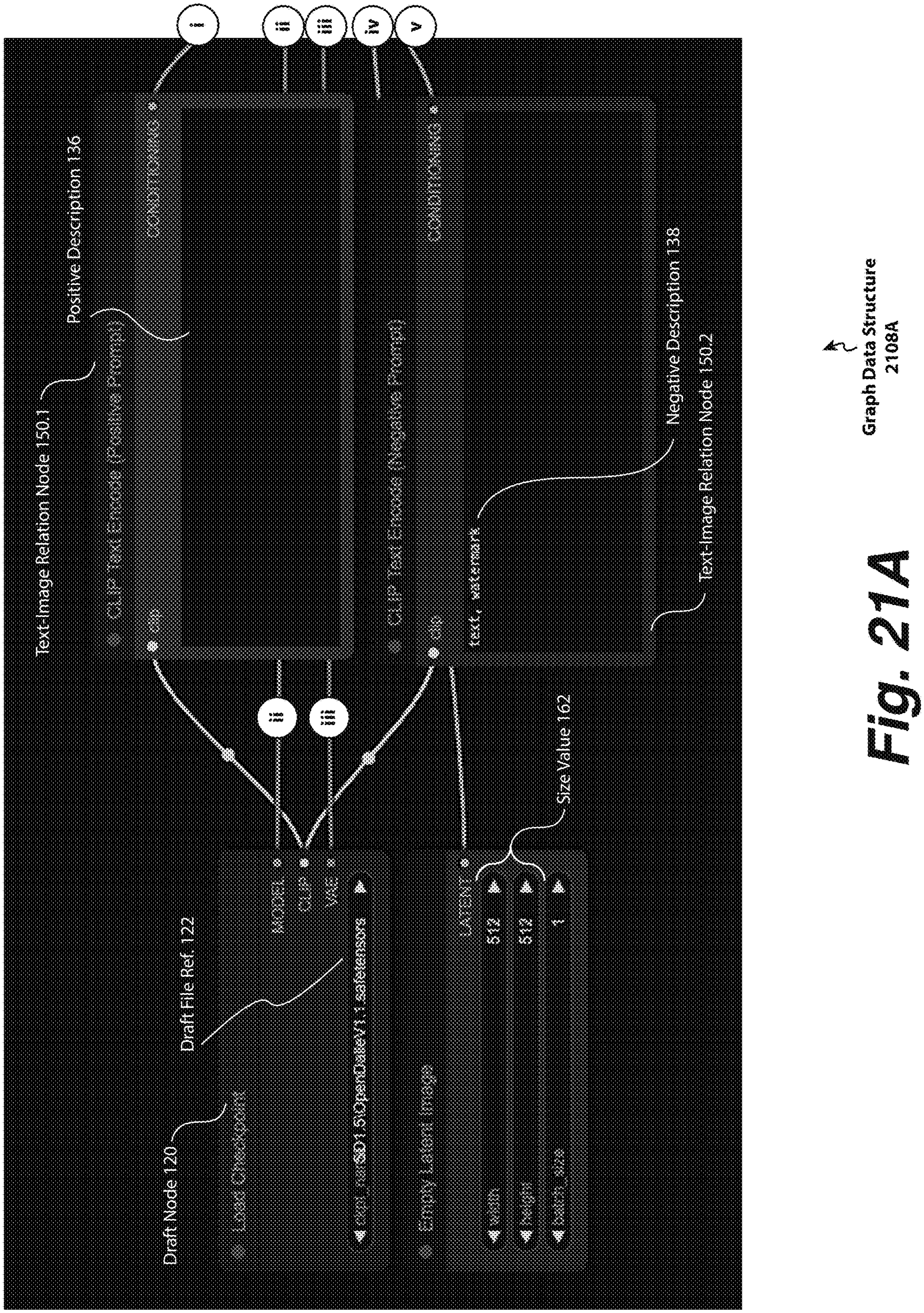
FIG. 21A illustrates the example graph data structure usable to generate the rendering file of FIG. 14, according to one or more embodiments.
Figure 21B:
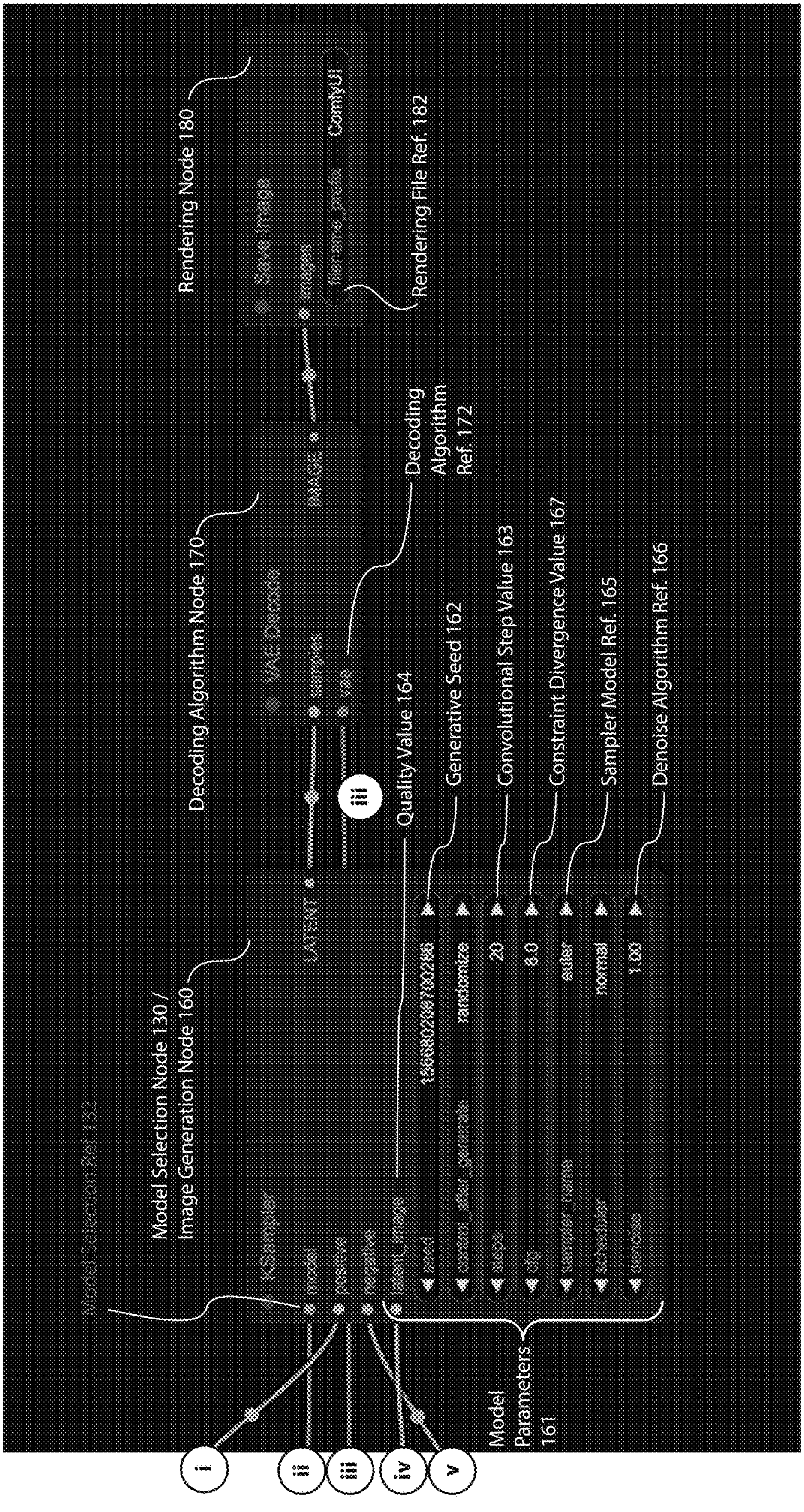
FIG. 21B illustrates a continuation of the draft data structure of FIG. 21A, according to one or more embodiments.

FIG. 21A and FIG. 12B illustrate an example instance of the graph data structure 109 of FIG. 1B, according to one or more embodiments. FIG. 21A illustrates a first portion of the graph data structure 109, referred to as the graph data structure 2108A, and FIG. 21B illustrates a second portion of the graph data structure 109, referred to as the graph data structure 2108B (collectively, the graph data structure 2108). The graph data structure 2108 was generated utilizing ComfyUI, a commercially available software tool. In some instances, nodes 110 share function, for example the model selection node 130 and the image generation node 160. Each of the nodes 110 draw references to one another through one or more node references 111, shown as curving connection lines, and where directionality moves from left to right. Connections along the node references 111 are shown utilizing encircled lower-case Roman numerals, and where certain connections may move behind (e.g., bypass) certain instances of the nodes 110. For example, the draft node 120 is connected to the decoding algorithm node 170 along path 'Circle iii'.

A data structure similar to the one shown in FIG. 21A and FIG. 21B were utilized in generating the rendering file 108 of FIG. 14. Although provided for clarity of illustration the graph data structure 2108 has been streamlined, the additional general components and parameters were utilized. The generative image model 408 included JuggernautXLv7.safetensors, in addition to one or more selected LoRAs. Several fractionizations were utilized, including for example ControlNet Canny (pre-processor: canny; model: diffusers_xl_canny_full.safetensors; weight: 0.4); ControlNet Softedge (pre-processor: softedge_pidinet, model: controlnet-sd-xl-1.0-softedge-dexined.safetensors; weight: 0.5). The generative seed was generated as a random number (e.g., 1262636918). The positive description 136 included the alphanumeric string: "RAW full-body photo (front view and back view) of a beautiful model (white woman: 1.2) staring at camera, wearing a crop-length, fitted cut blazer in (pantone nigara blue: 1.1) structured wool, notched lapel, single-breasted with two buttons, jetted pockets with flaps, paired with high-waisted, wide leg cut trousers in mustard yellow stretch cotton with belt loops, front pleats, and a black cropped tank top underneath. Accessorized with a black belt with a large circular buckle and open-toe black heeled sandals, standing in a (white studio background: 1.4), beautiful, super detailed, (highly detailed skin: 1.2), 8k uhd DSLR, soft lighting, high quality, film grain, Fujifilm XT3". The negative description 138 included the text". "ugly, disfigured, poor quality, low resolution." The text-image relation model 404 utilized was a CLIP using OpenClip model (ViT-G/14) and OpenAI's proprietary CLIP ViT-L. The constraint divergence value 167 (e.g., "cfg") was set to a value of '5'. The convolutional steps value 163 was set to a value of '50'. The size value 152 was be 816×1024 pixels. The sampler model (e.g., specified by the sampler model ref. 165) was DPM++2M SDE. The scheduler was Karras. The denoise value was set to a value of '1.0'.FIG. 22 illustrates another example of a draft file 102 of a flowing dress worn by a subject, according to one or more embodiments.

Figure 23:
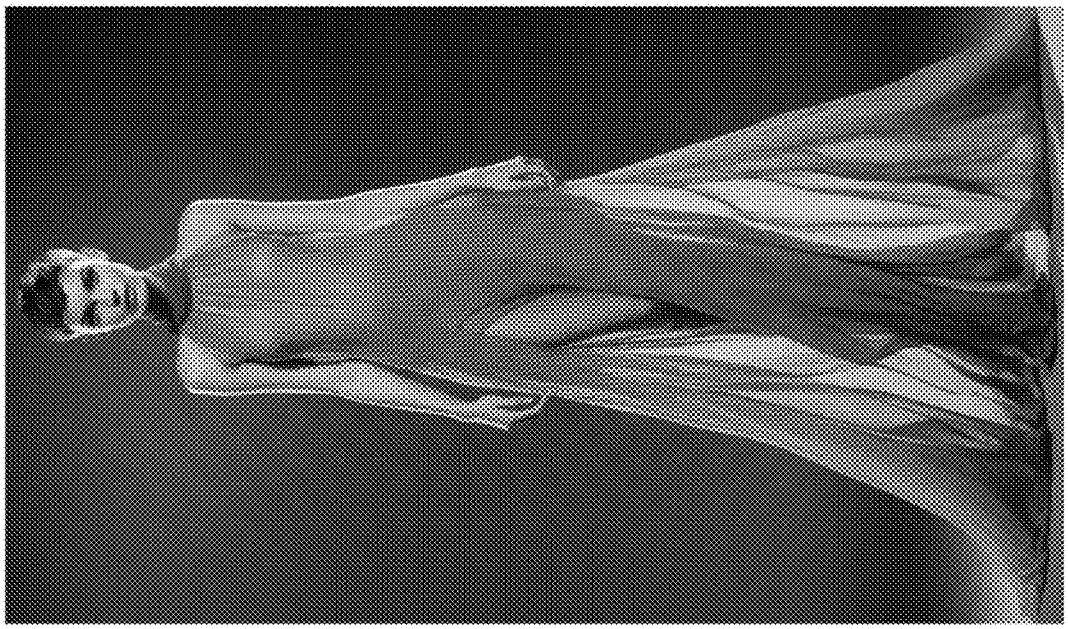
FIG. 23 illustrates another example a rendering file based on the draft file of FIG. 22, according to one or more embodiments.
Figure 22:
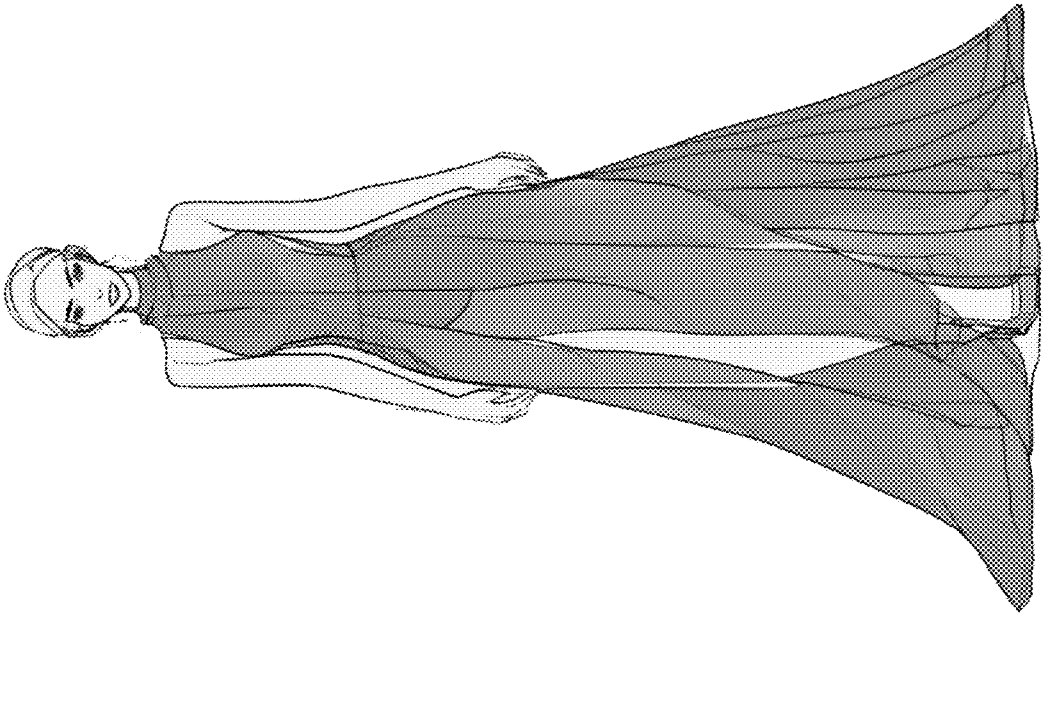
FIG. 22 illustrates another example of a draft file of a flowing dress worn by a subject, according to one or more embodiments.

FIG. 23 illustrates another example a rendering file 104 based on the draft file of FIG. 22, according to one or more embodiments. The draft file 102 of FIG. 22 used substantially similar inputs to the generative image model 408, except that a different text description 134 was provided appropriate to the style, materials (e.g., translucent fabric), and other distinct intended aspects of the orange dress. FIG. 13, FIG. 14, FIG. 22, and FIG. 23 are provided, in part, to illustrate the veracity with which the rendering of an initial sketch can adhere to the design of the artist/designer. The adherence can assist in proving copyrightability, derivation, contribution, and/or ownership.

Figure 24:
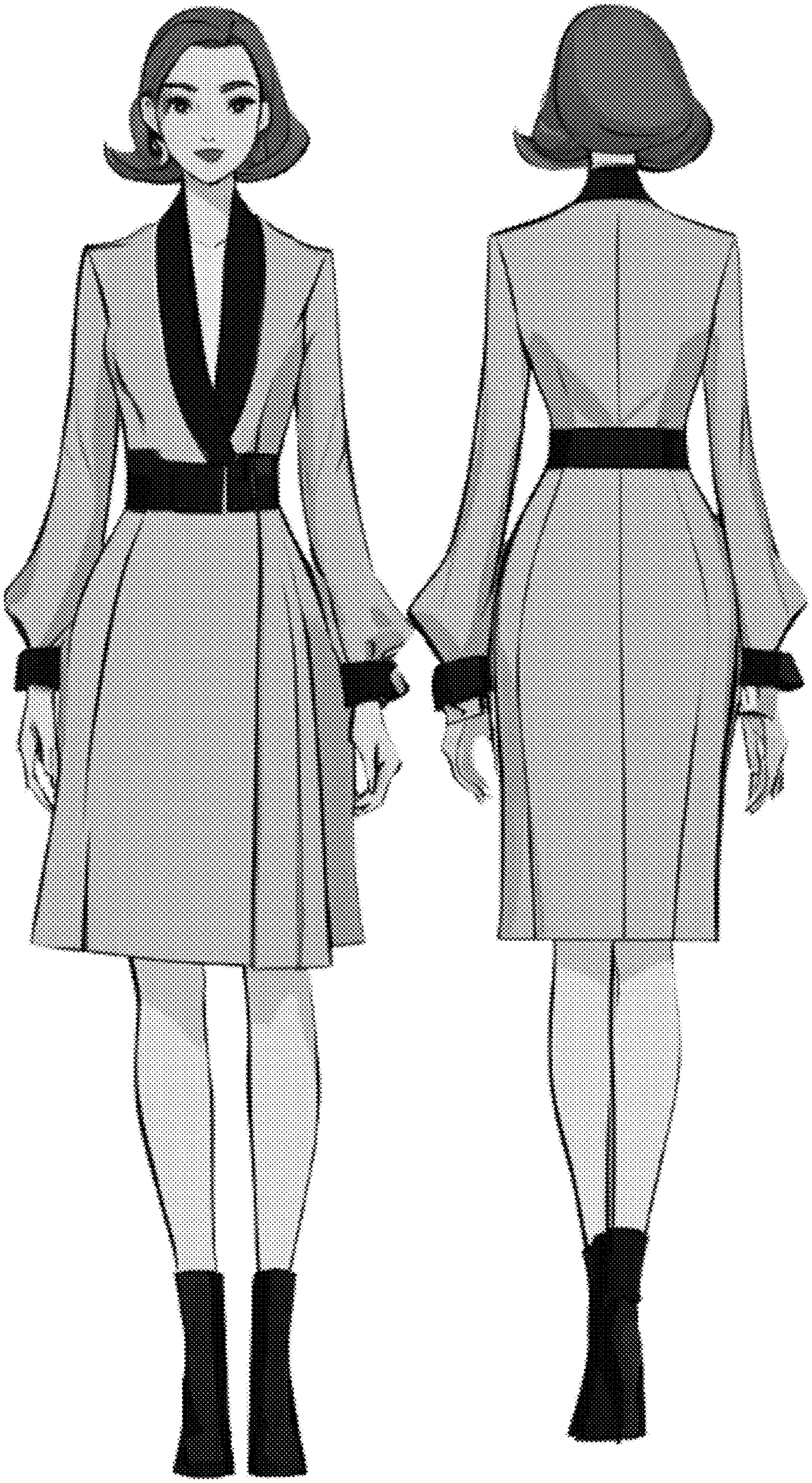
FIG. 24 illustrates yet another example of a draft file illustrating a sketch of woman's dress, according to one or more embodiments.

FIG. 24 illustrates yet another example of a draft file 102 illustrating a sketch of woman's dress, according to one or more embodiments.

Figure 25:
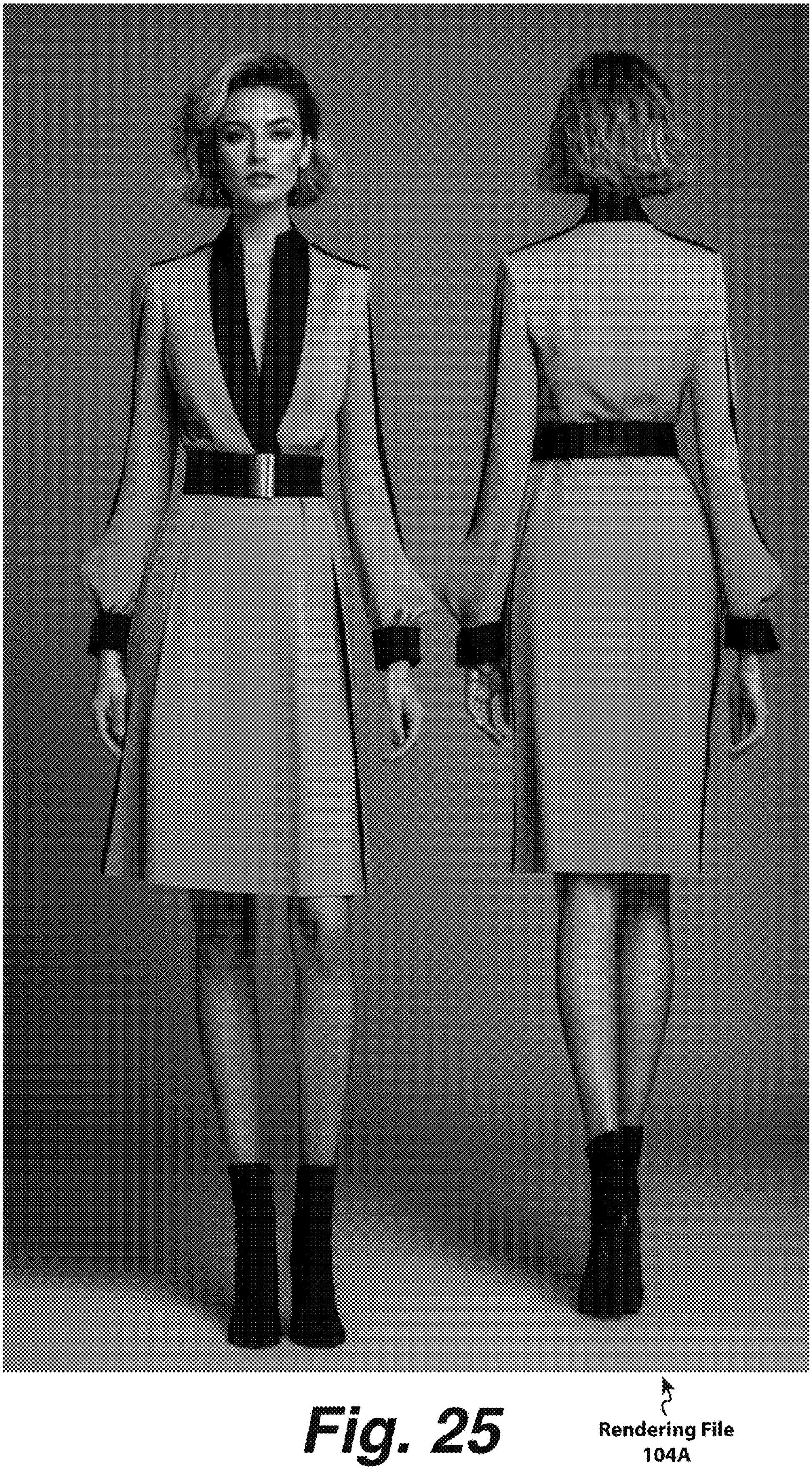
FIG. 25 illustrates the rendering file produced based on the draft file of FIG. 24, for instance usable for fashion line sales, printed publication marketing (e.g., a fashion magazine), and/or e-commerce marketing, according to one or more embodiments.

FIG. 25 illustrates a first rendering file 104A produced based on the draft file 102 of FIG. 24. As just one example, the rendering file 104 of FIG. 25 may be usable for fashion line sales and/or e-commerce marketing, according to one or more embodiments. For example, the user 101 may upload the rendering file 104 to the internet platform 106, according to one or more embodiments.

Figure 26:
FIG. 26 illustrates a second rendering file based on the draft file of FIG. 24 and/or the rendering file of FIG. 25, the second rendering usable as a lifestyle and/or editorial representation of the apparel designed in FIG. 24, according to one or more embodiments.

FIG. 26 illustrates a second rendering file 104A based on the draft file 102 of FIG. 24 and/or the rendering file 104A of FIG. 25. The second rendering file 104B of FIG. 26 may usable as a lifestyle and/or editorial representation of the apparel designed in FIG. 24, as is known in the art of fashion and advertising, according to one or more embodiments. The second rendering 104B of FIG. 26 may be rendered by changing significant parameters, text description 134, the text-image relation model 404, the model parameters 161, and/or the generative image model 408. For example, the rendering file 104B of FIG. 26 was produced using the following models, data, and values comprising the following: Sampler: DPM++2M SDE, Scheduler: Karras, CFG scale: 6.5, Seed: 3435027362, Size: 1024×1024, Model: crystalClearXL_ccxl, VAE: sdxl_vae.safetensors, Clip: OpenClip model (ViT-G/14) and OpenAI's CLIP ViT-L, Positive description: "RAW photo, a caucasian woman in a yellow pleated dress and jacket with a black collar, black and gold lined belt, avant designer uniform, durararara, armani, official product image, standing in a desert, (highly detailed skin: 1.2), 8k uhd, dslr, soft lighting, high quality, film grain, Fujifilm XT3", Negative description: "(deformed iris, deformed pupils, semi-realistic, cgi, 3d, render, sketch, cartoon, drawing, anime), black gloves, pockets".

In one or more embodiments, each of the alternative versions rendered may generate alternate instances of the nodes 110 to track and log parameter changes and use, for example as may be stored in the graph data structure 109, according to one or more embodiments.

In one or more embodiments, an advantage includes that a user 101 may retain comparative control over an original work of authorship (e.g., the fashion design sketched in the draft file 102) while receiving fast, low-cost assistance with photorealistic rendering.

In one or more embodiments, an advance includes logging prompts, parameters, and other inputs to prove that sufficient human control, creativity, and/or contribution occurred to meet threshold tests for copyrightability under United States or international law.

In one or more embodiments, an advantage includes decreased use of computing resources through structured and/or organized storage out model outputs that can be re-utilized if needed (e.g., to re-run a model to which such outputs are utilized as inputs), for example within the nodes 110 and/or the graph data structure 109.

In one or more embodiments, an advantage includes decreasing use of computing resources through selective iteration, e.g., apparel segmentation and boundary selection for re-rendering.

In one or more embodiments, an advantage includes that the designer may easy render certain raw materials which may represent materials for sale from suppliers and manufacturers, which may permit the designer to begin to evaluate production cost with photorealistic rendering without purchasing samples, building prototypes, etc.

In one or more embodiments, an advantage includes enabling a designer to easily render a draft file 102 to be consistent with the rest of a fashion line of the designer and/or a different designer, which may speed the design process where consistency is desired, increase consistency when collaborating, and creating consistency with fashion lines of potential fashion brands. Conversely, in one or more embodiments an advantage includes enabling a designer to easily render a draft file 102 to be contrasting with the rest of a fashion line of the design and/or a different designer, which may also speed the design process where contrast is desired. For example, the designer may want to ensure that their design looks and feels substantially different than that of a fashion brand that the designer used to design for to reinforce a clear distinction in work product and separate ownership of intellectual property.

Although the present embodiments have been described with reference to specific example embodiments, it will be evident that various modifications and changes may be made to these embodiments without departing from the broader spirit and scope of the various embodiments. For example, the various devices, engines, agent, routines, and modules described herein may be enabled and operated using hardware circuitry (e.g., CMOS based logic circuitry), firmware, software, or any combination of hardware, firmware, and software (e.g., embodied in a non-transitory machine-readable medium). For example, the various electrical structure and methods may be embodied using transistors, logic gates, and electrical circuits (e.g., application specific integrated circuitry (ASIC) and/or Digital Signal Processor (DSP) circuitry).

In addition, it will be appreciated that the various operations, processes, and methods disclosed herein may be embodied in a non-transitory machine-readable medium and/or a machine-accessible medium compatible with a data processing system (e.g., the client device 200, the coordination server 300, the generative server 400, the authorization server 500, and/or the fractionation server 600). Accordingly, the specification and drawings are to be regarded in an illustrative rather than a restrictive sense.

The structures in the figures such as the engines, routines, and modules may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the preceding disclosure.

Embodiments of the invention are discussed above with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures.

From reading the present disclosure, other variations and modifications will be apparent to persons skilled in the art. Such variations and modifications may involve equivalent and other features which are already known in the art, and which may be used instead of or in addition to features already described herein.

Although claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any claim and whether or not it mitigates any or all of the same technical problems.

Features which are described in the context of separate embodiments also may be provided in combination in a single embodiment. Conversely, various features which are, for brevity, described in the context of a single embodiment, also may be provided separately or in any suitable subcombination. The applicants hereby give notice that new claims may be formulated to such features and/or combinations of such features during the prosecution of the present application or of any further application derived therefrom.

References to "one embodiment," "an embodiment," "example embodiment," "various embodiments," "one or more embodiments," etc., may indicate that the embodiment (s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least one or more embodiments of the invention" includes the stated particular feature, structure, or characteristic.

The enumerated listing of items does not imply that any or all of the items are mutually exclusive, unless expressly specified otherwise.

It is understood that the use of a specific component, device and/or parameter names are for example only and not meant to imply any limitations on the invention. The invention may thus be implemented with different nomenclature and/or terminology utilized to describe the mechanisms, units, structures, components, devices, parameters and/or elements herein, without limitation. Each term utilized herein is to be given its broadest interpretation given the context in which that term is utilized.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; a smartphone, application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, one or more embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments also may be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions also may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

Embodiments of the invention also may be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The term "processor" may refer to any device or portion of a device that processes electronic data from registers and/or memory to transform that electronic data into other electronic data that may be stored in registers and/or memory. A "computing platform" may comprise one or more processors.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of implementing the generative model control network 100, or portions thereof, according to the present invention will be apparent to those skilled in the art. Various aspects of the invention have been described above by way of illustration, and the specific embodiments disclosed are not intended to limit the invention to the particular forms disclosed. The particular implementation of the generative model control network 100, or portions thereof, may vary depending upon the particular context or application. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for rapidly digitally rendering apparel designs, comprising:

receiving a draft file of a first image comprising a sketch of one or more apparel items, receiving a text description comprising a description of the one or more apparel items, wherein the text description comprises a positive description of one or more attributes to be present in the one or more apparel items and a negative description of one or more attributes to be excluded from the one or more apparel items;

selecting a text-image relation model configured to relate the text description to one or more latent representations of the text-image relation model;

selecting a generative image model configured to generate an output image constrained by both the first image of the one or more apparel items and a first set of latent representations that includes at least one of the one or more latent representations of the text-image relation model;

parameterizing the generative image model with a set of model parameters comprising at least one of (i) a convolution step value, (ii) a constraint divergence value, (iii) a quality value of the output image; (iv) a size value of the output image; (v) a generative seed, (vi) a sampler model, and (vii) a decoding algorithm, and (viii) a denoise algorithm;

outputting the first set of latent representations from the text-image relation model;

inputting into the generative image model a set of inputs of the generative image model comprising (i) the draft file comprising the first image of the one or more apparel items, (ii) the first set of latent representations of the text-image relation model, and (iii) the set of model parameters;

generating a first rendering file comprising a second image of the one or more apparel items modified by the text description to allow for at least one of rapid visualization, prototyping, and construction of the one or more apparel items;

inputting at least one of the draft file and the first rendering file into a computer vision model trained with a first set of training images comprising data distinguishing apparel items;

generating a segmentation file comprising one or more boundary designations of the one or more apparel items;

receiving a selection of a boundary designation of the one or more boundary designations of the one or more apparel items to select an apparel item bounded by the boundary designation;

receiving a new text description comprising a description of the apparel item bounded by the boundary designation;

outputting a second set of latent representations from at least one of the text-image relation model and a different text-image relation model based on the new text description;

inputting into the generative image model at least a portion of the first rendering file within the boundary designation, the second set of latent representations of the text-image relation model, and a different set of model parameters; and generating a second rendering file re-rendering the apparel item bounded by the boundary designation.

2. The method of claim 1, further comprising:

generating a second set of model parameters, wherein the second set of model parameters differs from the set of model parameters in at least one of: the constraint divergence value, the generative seed, the text description, the positive description, the negative description, and the sampler model;

generating a second set of latent representations of the one or more latent representations of the text-image relation model based on reduced constraint in the of the text-image relation model;

generating an alternative rendering file comprising a third image of the one or more apparel items;

transmitting the first rendering file and the alternative rendering file to a user;

receiving a preference selection from the user for the alternative rendering file; and storing the second set of model parameters and optionally locking the generative seed.

3. The method of claim 1, further comprising:

generating a graph data structure comprising:

a model selection node comprising attributes and associated values specifying a directed edge from the model selection node to an image generation model node, a directed edge from the model selection node to a text-image relation node, and a directed edge from the model selection node to a decoding algorithm node;

the text-image relation node comprising attributes and associated values specifying a directed edge from the model selection node to the image generation model node and storing at least one of (i) the positive description of the one or more apparel items and a directed edge to the generative image model, and (ii) the negative description of the one or more apparel items;

a base parameterization node comprising attributes and associated values storing the size value of the output image and at least one of a directed edge from the base parameterization node to the image generation model node and from the image generation model node to the base parameterization node; and the image generation model node, comprising attributes and values storing the set of model parameters and a directed edge from the image generation model node to the decoding algorithm node.

4. The method of claim 1, wherein the computer vision model further trained with a second set of training images comprising data designating apparel elements of apparel items, the method further comprising:

generating a second segmentation comprising a second set of one or more boundary designations of one or more apparel elements of each of the one or more apparel items, wherein the segmentation file further comprising one or more boundary designations of one or more material elements.

5. The method of claim 4, the method further comprising:

receiving a selection of a different boundary designation of one or more boundary designations of the one or more material elements;

selecting a material value associated with an apparel material;

loading at least one of (i) a different text description comprising a description of the apparel material, (ii) a third set of latent representations based on the text description of the apparel material that is output from at least one of the text-image relation model and the different text-image relation model, and (iii) one or more material images of a material image library; and generating a third rendering file re-rendering the apparel material bounded by the different boundary designation.

6. The method of claim 1, further comprising:

inputting at least one of the draft file and the first rendering file into a computer vision model trained with a set of training images comprising data designating a material value associated with at least one of an apparel item and an apparel element.

7. The method of claim 1, further comprising:

authenticating at least one of a generative user and a device of the generative user; and determining the generative user is authorized to access at least one of (i) two or more image files each comprising one or more apparel elements; (ii) the text description of the one or more apparel items; and (iii) an adaptation tuning model comprising a model trained on the two or more image files each comprising the one or more apparel elements, wherein inputs to the generative image model further comprising the adaptation tuning model.

8. The method of claim 6, further comprising:

inputting the draft file into a linage mapping model outputting a line map file of at least one of material-material boundaries of the one or more apparel items, material-skin transition boundaries, and material-background boundaries of the one or more apparel items;

inputting the draft file into a depth mapping model outputting a depth map file designating a perceived depth of at least one of (i) a first apparel item of the one or more apparel items relative to a second apparel item of the one or more apparel items; and (ii) a first material of the one or more apparel items relative to a second material of the one or more apparel items; and inputting the draft file into a color mapping model outputting a color map file designating a color of at least one of (i) the first apparel item relative to the second apparel item; and (ii) the first material relative to the second material, wherein the set of inputs of the generative image model further comprising at least one of the line map file, the depth map file, and the color map file.

9. A device for rapid apparel prototyping and design visualization, the device comprising:

a computer comprising:

one or more processors;

a memory;

draft receipt agent comprising computer readable instructions that when executed receive a draft file of a first image comprising a sketch of one or more apparel items;

a description module comprising computer readable instructions that when executed receive a text description comprising a description of the one or more apparel items, wherein the text description comprises a positive description of one or more attributes to be present in the one or more apparel items and a negative description of one or more attributes to be excluded from the one or more apparel items;

a generative model selection routine comprising computer readable instructions that when executed select generative image model configured to generate an output image constrained by both the first image of the one or more apparel items and a first set of latent representations that includes at least one of one or more latent representations of a text-image relation model;

a model parameterization subroutine comprising computer readable instructions that when executed:

select the text-image relation model configured to relate the text description to the one or more latent representations of the text-image relation model, and parameterize the generative image model with a set of model parameters comprising at least one of (i) a convolution step value, (ii) a constraint divergence value, (iii) a quality value of the output image; (iv) a size value of the output image; (v) a generative seed, (vi) a sampler model, (vii) a decoding algorithm, and (viii) a denoise algorithm;

a latent image storage routine comprising computer readable instructions that when executed store the first set of latent representations from the text-image relation model;

a generative model execution engine comprising computer readable instructions that when executed input:

into the generative image model a set of inputs of the generative image model comprising (i) the draft file comprising the first image of the one or more apparel items, (ii) the first set of latent representations of the text-image relation model, and (iii) the set of model parameters, and generate a first rendering file comprising a second image of the one or more apparel items modified by the text description to allow for at least one of rapid visualization, prototyping, and construction of the one or more apparel items;

an apparel segmentation engine comprising computer readable instructions that when executed:

input at least one of the draft file and the first rendering file into a computer vision model trained with a first set of training images comprising data distinguishing apparel items, and generate a segmentation file comprising one or more boundary designations of the one or more apparel items; and an apparel rendering routine comprising computer readable instructions that when executed:

receive a selection of a boundary designation of the one or more boundary designations of the one or more apparel items to select an apparel item bounded by the boundary designation, receive a new text description comprising a description of the apparel item bounded by the boundary designation, request a second set of latent representations from at least one of the text-image relation model and a different text-image relation model based on the new text description, input into the generative image model at least a portion of the first rendering file within the boundary designation, the second set of latent representations of the text-image relation model, and a different set of model parameters; and wherein the generative model execution engine further comprising computer readable instructions that when executed:

generate a second rendering file re-rendering the apparel item bounded by the boundary designation.

10. The device of claim 9, further comprising:

a generative divergence engine comprising computer readable instructions that when executed:

generate second set of model parameters, wherein the second set of model parameters differs from the set of model parameters in at least one of: the constraint divergence value, the generative seed, the text description, the positive description, the negative description, and the sampler model, initiate a first request for generating a second set of latent representations of the one or more latent representations of the text-image relation model based on reduced constraint in the of the text-image relation model, and initiate a second request for generating an alternative rendering file comprising a third image of the one or more apparel items;

a rendering delivery subroutine comprising computer readable instructions that when executed transmit the rendering file and the alternative rendering file to a user;

wherein the generative divergence engine further comprising computer readable instructions that when executed receive a preference selection from the user for the alternative rendering file; and a generative tracking subroutine comprising computer readable instructions that when executed store the second set of model parameters and optionally lock the generative seed.

11. The device of claim 9, further comprising:

a generative structuring engine comprising computer readable instructions that when executed:

generate a graph data structure comprising:

a model selection node comprising attributes and associated values specifying a directed edge from the model selection node to an image generation model node, a directed edge from the model selection node to a text-image relation node, and a directed edge from the model selection node to a decoding algorithm node;

the text-image relation node comprising attributes and associated values specifying a directed edge from the text-image relation node to the image generation model node and storing a directed edge to the generative image model at least one of (i) the positive description of the one or more apparel items, and (ii) the negative description of the one or more apparel items;

a base parameterization node comprising attributes and associated values storing the size value of the output image and at least one of a directed edge from the base parameterization node to the image generation model node and from the image generation model node to the base parameterization node; and the image generation model node, comprising attributes and values storing the set of model parameters and a directed edge from the image generation model node to the decoding algorithm node.

12. The device of claim 9, wherein the computer vision model further trained with a second set of training images comprising data designating apparel elements of apparel items, the device further comprising:

computer readable instructions that when executed a second segmentation comprising a second set of one or more boundary designations of one or more apparel elements of each of the one or more apparel items, wherein the segmentation file further comprising one or more boundary designations of one or more material elements.

13. The device of claim 12, the device further comprising:

a material rendering routine comprising computer readable instructions that when executed:

receive selection of a different boundary designation of one or more boundary designations of the one or more material elements;

receive a selection of a material value associated with an apparel material;

load at least one of (i) a different text description comprising a description of the apparel material, (ii) a third set of latent representations based on the text description of the apparel material that is output from at least one of the text-image relation model and the different text-image relation model, and (iii) one or more material images of a material image library; and initiate generation of a third rendering file re-rendering the apparel material bounded by the different boundary designation.

14. The device of claim 9, further comprising:

a material identification routine comprising computer readable instructions that when executed input at least one of the draft file and the first rendering file into a computer vision model trained with a set of training images comprising data designating a material value associated with at least one of an apparel item and an apparel element.

15. The device of claim 9, further comprising:

a model specialization control engine, comprising:

an authentication routine comprising computer readable instructions that when executed authenticate at least one of a generative user and a device of the generative user; and an authorization routine comprising computer readable instructions that when executed determine the generative user is authorized to access at least one of (i) two or more image files each comprising one or more apparel elements; (ii) the text description of the one or more apparel items; and (iii) an adaptation tuning model comprising a model trained on the two or more image files each comprising the one or more apparel elements, wherein inputs to the generative image model further comprising the adaptation tuning model.

16. The device of claim 14, further comprising:

a fractionation engine comprising:

a linage mapping routine comprising computer readable instructions that when executed input the draft file into a linage mapping model outputting a line map file of at least one of material-material boundaries of the one or more apparel items, material-skin transition boundaries, and material-background boundaries of the one or more apparel items;

a depth mapping routine comprising computer readable instructions that when executed input the draft file into a depth mapping model outputting a depth map file designating a perceived depth of at least one of (i) a first apparel item of the one or more apparel items relative to a second apparel item of the one or more apparel items; and (ii) a first material of the one or more apparel items relative to a second material of the one or more apparel items; and a color mapping routine inputting the draft file into a color mapping model outputting a color map file designating a color of at least one of (i) the first apparel item relative to the second apparel item; and (ii) the first material relative to the second material, wherein the set of inputs of the generative image model further comprising at least one of the line map file, the depth map file, and the color map file.

17. A system for rapid apparel prototyping and design visualization, the system comprising:

a coordination server comprising:

a processor of the coordination server;

a memory of the coordination server;

a draft receipt agent comprising computer readable instructions that when executed receive a draft file of a first image comprising a sketch of one or more apparel items;

a description module comprising computer readable instructions that when executed receive a text description comprising a description of the one or more apparel items, wherein the text description comprises a positive description of one or more attributes to be present in the one or more apparel items and a negative description of one or more attributes to be excluded from the one or more apparel items;

a generative model selection routine comprising computer readable instructions that when executed select generative image model configured to generate an output image constrained by both the first image of the one or more apparel items and a first set of latent representations that includes at least one of one or more latent representations of a text-image relation model;

a model parameterization subroutine comprising computer readable instructions that when executed:

select the text-image relation model configured to relate the text description to the one or more latent representations of the text-image relation model, and parameterize the generative image model with a set of model parameters comprising at least one of (i) a convolution step value, (ii) a constraint divergence value, (iii) a quality value of the output image; (iv) a size value of the output image; (v) a generative seed, (vi) a sampler model, (vii) a decoding algorithm, and (viii) a denoise algorithm;

a generative divergence engine comprising computer readable instructions that when executed:

generate second set of model parameters, wherein the second set of model parameters differs from the set of model parameters in at least one of: the constraint divergence value, the generative seed, the text description, the positive description, the negative description, and the sampler model, initiate a first request for generating a second set of latent representations of the one or more latent representations of the text-image relation model based on reduced constraint in the of the text-image relation model, and initiate a second request for generating an alternative rendering file comprising a third image of the one or more apparel items;

a rendering delivery subroutine comprising computer readable instructions that when executed transmit a first rendering file and the alternative rendering file to a user, wherein the generative divergence engine further comprising computer readable instructions that when executed receive a preference selection from the user for the alternative rendering file;

a generative tracking subroutine comprising computer readable instructions that when executed store the second set of model parameters and optionally lock the generative seed;

a generative structuring engine comprising computer readable instructions that when executed:

generate a graph data structure comprising:

a model selection node comprising attributes and associated values specifying a directed edge from the model selection node to an image generation model node, a directed edge from the model selection node to a text-image relation node, and a directed edge from the model selection node to a decoding algorithm node;

the text-image relation node comprising attributes and associated values specifying a directed edge from the text-image relation node to the image generation model node and storing a directed edge to the generative image model at least one of (i) the positive description of the one or more apparel items, and (ii) the negative description of the one or more apparel items;

a base parameterization node comprising attributes and associated values storing the size value of the output image and at least one of a directed edge from the base parameterization node to the image generation model node and from the image generation model node to the base parameterization node; and the image generation model node, comprising attributes and values storing the set of model parameters and a directed edge from the image generation model node to the decoding algorithm node;

an apparel segmentation engine comprising computer readable instructions that when executed:

input at least one of the draft file and the first rendering file into a computer vision model trained with a first set of training images comprising data distinguishing apparel items, and generate a segmentation file comprising one or more boundary designations of the one or more apparel items;

an apparel rendering routine comprising computer readable instructions that when executed:

receive a selection of a boundary designation of the one or more boundary designations of the one or more apparel items to select an apparel item bounded by the boundary designation, receive a new text description comprising a description of the apparel item bounded by the boundary designation, request a second set of latent representations from at least one of the text-image relation model and a different text-image relation model based on the new text description, and input into the generative image model at least a portion of the first rendering file within the boundary designation, the second set of latent representations of the text-image relation model, and a different set of model parameters, a material identification routine comprising computer readable instructions that when executed input at least one of the draft file and the first rendering file into a computer vision model trained with a set of training images comprising data designating a material value associated with at least one of an apparel item and an apparel element;

the system further comprising a generative server comprising:

a processor of the generative server;

a memory of the generative server; and a latent image storage routine comprising computer readable instructions that when executed store the first set of latent representations from the text-image relation model; and a generative model execution engine comprising computer readable instructions that when executed:

input into the generative image model a set of inputs of the generative image model comprising (i) the draft file comprising the first image of the one or more apparel items, (ii) the first set of latent representations of the text-image relation model, and (iii) the set of model parameters, and generate the first rendering file, wherein the first rendering file comprising a second image of the one or more apparel items modified by the text description to allow for at least one of rapid visualization, prototyping, and construction of the one or more apparel items;

generate a second rendering file re-rendering the apparel item bounded by the boundary designation; and the system further comprising a network communicatively coupling the coordination server and the generative server.

18. The system of claim 17, further comprising:

an authorization server comprising:

a processor of the authorization server;

a memory of the authorization server; and a model specialization control engine, comprising:

an authentication routine comprising computer readable instructions that when executed authenticate at least one of a generative user and a device of the generative user, and an authorization routine comprising computer readable instructions that when executed determine the generative user is authorized to access at least one of (i) two or more image files each comprising one or more apparel elements; (ii) the text description of the one or more apparel items; and (iii) an adaptation tuning model comprising a model trained on the two or more image files each comprising the one or more apparel elements, wherein inputs to the generative image model further comprising the adaptation tuning model.

19. The system of claim 18, wherein the computer vision model further trained with a second set of training images comprising data designating apparel elements of apparel items, and wherein the apparel segmentation engine further including computer readable instructions that when executed generate a second segmentation comprising a second set of one or more boundary designations of one or more apparel elements of each of the one or more apparel items, and wherein the segmentation file further comprising one or more boundary designations of one or more material elements, wherein the device further comprising:

a material rendering routine comprising computer readable instructions that when executed:

receive selection of a different boundary designation of one or more boundary designations of one or more material elements;

receive a selection of a material value associated with an apparel material;

load at least one of (i) a different text description comprising a description of the apparel material, (ii) a third set of latent representations based on the text description of the apparel material that is output from at least one of the text-image relation model and the different text-image relation model, and (iii) one or more material images of a material image library; and initiate generation of a third rendering file re-rendering the apparel material bounded by the different boundary designation.

20. The system of claim 19, further comprising:

a fractionation server comprising:

a processor of the fractionation server;

a memory of the fractionation server; and a fractionation engine comprising:

a linage mapping routine comprising computer readable instructions that when executed input the draft file into a linage mapping model outputting a line map file of at least one of material-material boundaries of the one or more apparel items, material-skin transition boundaries, and material-background boundaries of the one or more apparel items;

a depth mapping routine comprising computer readable instructions that when executed input the draft file into a depth mapping model outputting a depth map file designating a perceived depth of at least one of (i) a first apparel item of the one or more apparel items relative to a second apparel item of the one or more apparel items; and (ii) a first material of the one or more apparel items relative to a second material of the one or more apparel items; and a color mapping routine inputting the draft file into a color mapping model outputting a color map file designating a color of at least one of (i) the first apparel item relative to the second apparel item; and (ii) the first material relative to the second material, wherein the set of inputs of the generative image model further comprising at least one of the line map file, the depth map file, and the color map file.

* * * * *